(12) United States Patent
Shiba et al.

(10) Patent No.: US 6,758,301 B2
(45) Date of Patent: Jul. 6, 2004

(54) TRACTOR

(76) Inventors: Kenji Shiba, 2-18-1, Inadera, Amagasaki-shi, Hyogo (JP), 661-0981; Toshikazu Matsubayashi, 2-18-1, Inadera, Amagasaki-shi, Hyogo (JP), 661-0981; Yasuhiro Ikegami, 2-18-1, Inadera, Amagasaki-shi, Hyogo (JP), 661-0981; Toshio Tsuda, 2-18-1, Inadera, Amagasaki-shi, Hyogo (JP), 661-0981; Toshihiko Ibe, 2-18-1, Inadera, Amagasaki-shi, Hyogo (JP), 661-0981; Takashi Goto, 2-18-1, Inadera, Amagasaki-shi, Hyogo (JP), 661-0981

( * ) Notice: Subject to any disclaimer, the term of this patent is extended or adjusted under 35 U.S.C. 154(b) by 117 days.

(21) Appl. No.: 09/951,529

(22) Filed: Sep. 14, 2001

(65) Prior Publication Data
US 2002/0043057 A1 Apr. 18, 2002

(30) Foreign Application Priority Data

| Sep. 14, 2000 | (JP) | 2000-279543 |
| Sep. 22, 2000 | (JP) | 2000-287836 |
| Oct. 13, 2000 | (JP) | 2000-313282 |
| Nov. 16, 2000 | (JP) | 2000-349847 |
| Feb. 1, 2001 | (JP) | 2001-025236 |
| Jun. 27, 2001 | (JP) | 2001-195451 |
| Jul. 4, 2001 | (JP) | 2001-203917 |
| Jul. 13, 2001 | (JP) | 2001-214264 |

(51) Int. Cl.$^7$ ............................................. B60K 17/22
(52) U.S. Cl. ...................... 180/383; 180/291; 180/337; 74/574; 464/92
(58) Field of Search ................................ 180/292, 291, 180/283, 312, 337; 74/572, 574; 464/92, 93

(56) References Cited

U.S. PATENT DOCUMENTS

| 3,500,659 A | * | 3/1970 | Martin ........................ 464/93 |
| 3,841,425 A | * | 10/1974 | Harkness ................... 180/53.1 |
| 4,141,424 A | * | 2/1979 | Murayama et al. ........ 180/53.2 |
| 4,147,225 A | * | 4/1979 | Mazziotti et al. ........... 180/247 |
| 4,464,947 A | * | 8/1984 | Windsor-Smith et al. ..... 74/329 |
| 4,738,459 A | * | 4/1988 | Nakamura et al. .......... 180/409 |
| 4,804,056 A | * | 2/1989 | Toshikuni et al. .......... 180/339 |
| 4,834,041 A | * | 5/1989 | Valev ..................... 123/198 E |
| 4,938,085 A | * | 7/1990 | Suzuki et al. ................ 74/15.2 |
| 6,117,016 A | * | 9/2000 | Nett et al. ..................... 464/87 |

FOREIGN PATENT DOCUMENTS

| JP | 01078925 A | * | 3/1989 | ........... B60K/17/04 |
| JP | 03038475 A | * | 2/1991 | ........... B62D/49/00 |
| JP | 2001301479 A | * | 10/2001 | ........... B60K/17/06 |

* cited by examiner

Primary Examiner—David Dunn
(74) Attorney, Agent, or Firm—Sterne, Kessler, Goldstein & Fox P.L.L.C.

(57) ABSTRACT

A tractor comprising a vehicle frame, an engine including a flywheel, a first vibration isolator through which the engine is supported by the vehicle frame, and a transmission including an input shaft and a housing, wherein the input shaft is disposed at an upper portion of the housing and lower than a rotary axis of the flywheel. A pair of first and second universal joints are interposed between the flywheel and the input shaft. The first universal joint being nearer to the flywheel than the second universal joint. A second vibration is isolator interposed at least either between the flywheel and the first universal joint or between the input shaft and second universal joint.

21 Claims, 41 Drawing Sheets

TRACTOR

BACKGROUND OF THE INVENTION

1. Field of the Invention

The present invention relates to a tractor. Particularly, it relates to a power train system, an attachment lifting system, and a traveling control system in a tractor.

2. Background Art

According to the most popular conventional layout in tractors, a frame at a front portion of a tractor supports an engine. Behind the engine the frame supports a transmission. A seat is arranged above the transmission. The power of the engine is transferred to the transmission in order to drive the rear wheels. Many popular rising tractors employ this layout because it is advantageous in securing a compact arrangement of a power source and power train.

In such a tractor, the seat may be lowered as much as possible for getting on and off and for lowering the center of gravity, while the seat is necessarily disposed above the transmission. However, when the transmission is entirely lowered, an input shaft of the transmission becomes lower than an output shaft of the engine. The vertical difference between the output shaft of the engine and the input shaft of the transmission complicates the power train part between the engine and the transmission. Furthermore, this power train part between the engine and the transmission, which is disposed between the feet of an operator, must be compact and laterally narrow so as to secure a sufficient foot space for the operator. If the seat can be lowered, there arises the problem that the operator is liable to feel a strong vibration from the engine.

Next, the above-mentioned tractor usually comprises a hydraulic lift device disposed at the rear end of the tractor for raising and lowering working attachments. A hydraulic pump for feeding pressure-oil to the hydraulic lift device is conventionally provided on the transmission. The power for driving the hydraulic pump is taken out from the driving power in the transmission.

A certain amount of oil discharged by the hydraulic pump must be secured for lifting the working attachment. Therefore, the driving power for the hydraulic pump must be taken out from the upstream of transmission gears and clutches in the transmission. The transmission for driving the rear drive wheels and a rear-PTO shaft is provided at the front portion thereof with an input shaft for receiving power from the engine before the transmission. Thus, for simplifying a drive train to the hydraulic pump, the hydraulic pump is desired to be as near as possible to the input shaft at the front end of the tractor. However, for shortening oil piping between the hydraulic lift device as an oil source and the hydraulic pump and for reducing the loss of hydraulic pressure loss, the hydraulic pump is desired to be near the hydraulic lift device on the rear end of the tractor. Consequently, there are two requests contradictory to each other about the arrangement of the hydraulic pump for lifting the rear working attachment.

Furthermore, as being well-known, some of the tractors, e.g., agricultural tractors, have continuously variable transmissions, whose speed reduction ratio is varied by a speed-change operation tool such as a lever or a pedal to be operated by an operator sitting on the seat. It would be convenient for an operator getting off the tractor to operate such a speed-change operation tool to vary the speed reduction ratio of the continuously variable transmission while handling a steering wheel, for example, when the tractor must travel on a steep slope where it may be unbalanced. If the speed-change operation tool is a pedal, it is out of the question while the operator is off the tractor. A lever as the speed-change operation tool is conventionally provided beside the seat, where the operator sitting on the seat can easily handle the lever and the interlock system between the lever and the transmission can be simplified. However, it is difficult to be operated by an operator standing beside the tractor.

If the speed-change operation lever is disposed on a side of a dashboard, an operator standing beside the tractor can easily operate the lever while handling the steering wheel. However, such a speed-change operation lever is arranged from the continuously variable transmission which is longitudinally intermediately disposed in the power train between the engine and the rear drive wheels. Thus, the problem arises how the linkage between the lever and the transmission is arranged compactly without complexity. Furthermore, this linkage must be disposed so as to be prevented from hindering a steering device for turning steerable wheels according to the operation of the steering wheel.

BRIEF SUMMARY OF THE INVENTION

A tractor according to the present invention comprises a vehicle frame, an engine including a flywheel, and a first vibration isolator through which the engine is supported by the vehicle frame, a transmission including an input shaft and a housing, wherein the input shaft is disposed at an upper portion of the housing and lower than a rotary axis of the flywheel. A pair of first and second universal joints are interposed between the flywheel and the input shaft, the first universal joint being nearer to the flywheel than the second universal joint. A second vibration isolator is interposed at least either between the flywheel and the first universal joint or between the input shaft and second universal joint.

Consequently, the transmission can be entirely disposed at a low position in the tractor, thereby desirably lowering a seat to be disposed above the transmission so as to ease an operator to get on and off the tractor. Also, the center of the weight of the tractor can be lowered so as to balance the tractor suitably, thereby stabilizing the tractor in traveling.

The driving connection between the flywheel of the engine and the input shaft of the transmission using the universal joints is simple and economical compared to using bevel gears or the like. Also, this driving connection system, disposed between the feet of an operator sitting on the seat, is compact so as to secure a sufficient and comfortable foot space for the operator.

Although the operator sitting on the lowered seat is close to the engine the first vibration isolator supporting the engine comfortably restricts the engine vibration to be transmitted to the seat.

The second vibration isolator, which is preferably interposed between the flywheel and the first universal joint, efficiently reduces a torque variation caused in the flywheel of the engine before the torque variation is transmitted to the transmission, thereby reducing the sound generated between gears in the transmission by the torque variation.

The second vibration isolator is disposed so as to make the primary and final transmission ends thereof coaxial with each other.

In addition, a hydrostatic transmission is encased in a transmissing housing with a distributing drive gear whose input shaft is provided thereon. A main PTO drive shaft is disposed in the transmission housing so as to be offset from the input shaft, and a PTO clutch is provided on the main PTO drive shaft so as to engage or disengage the main PTO drive shaft with a PTO shaft. A primary gear of the PTO clutch meshes with the distributing drive gear on one side of the distributing drive gear. A hydraulic pump other than the hydrostatic transmission is provided outside the housing. A gear for driving the hydraulic pump meshes with the distributing drive gear on the other side of the distributing drive gear.

The output gear provided on the input shaft shares the power between the hydraulic pump and the PTO drive train. Thus, a constant amount of oil discharged from the hydraulic pump is held while the constant rotation of the engine is performed.

The output gear together with the hydraulic pump connected to it can approach the rear end of the tractor so as to shorten oil piping between the hydraulic lift device and the hydraulic pump.

The opposite arrangement of the primary gear of the PTO clutch and the gear for driving the hydraulic pump with respect to the output gear simplifies the drive train to the hydraulic pump. Meanwhile the drive train is prevented from hindering the PTO clutch on the PTO drive train, thereby contributing to the compactness of the tractor.

The PTO transmission shaft drivingly connecting the PTO drive main shaft with the PTO shaft through gears is disposed coaxially with the input shaft of the transmission, thereby enabling the lateral and vertical width of the transmission to be reduced. Consequently, the tractor can be laterally compact and provided with a sufficient minimum clearance above ground.

The tractor according to the present invention comprises a continuously variable transmission including a control arm for changing a speed reduction ratio in the continuously variable transmission. A steering wheel shaft is relatively rotatably held in the steering column in a dashboard. A steering wheel is fixed onto a top of a steering wheel shaft so as to be disposed above the dashboard. A substantially vertical speed-change operation shaft, which interlocks with the control arm and is rotatable around an axis thereof, is disposed beside the steering column in one of left and right sides of the tractor. The dashboard is provided at a lateral side surface thereof with an opening. A speed-change lever having a base portion and a grip portion opposite to each other is passed in a lateral direction of the tractor through the opening of the dashboard so as to project the grip portion laterally outward from the dashboard. The base portion of the speed-change operation shaft is connected to the speed-change lever in the dashboard.

An operator beside the dashboard of the tractor can walk along side the tractor while handling the grip portion of the speed-change lever and the steering wheel. The vertical speed-change operation shaft, constituting a speed-change control device and the steering column are compactly disposed so as to secure a large free space for other parts in their vicinity while they being prevented from hindering each other. By suitably locating the top of the speed-change operation shaft, the height of the speed-change lever can be located at an optimal position for being handled by the operator beside the tractor.

Furthermore, a bottom portion of said steering column is disposed above a transmission shaft interposed between an engine and the continuously variable transmission. A steering system including an input shaft is interposed between the steering wheel shaft and steerable wheels so as to laterally turn the steerable wheels according to the handling of the steering wheel. The steering system is disposed in the other of left and right sides of the tractor laterally opposite to the speed-change operation shaft. A flexible joint connects a bottom portion of the steering wheel shaft to the input shaft of the steering system.

While the transmission shaft is disposed just under the bottom portion of the steering column, the input shaft of the steering system, connected to the bottom portion of the steering wheel column through the flexible joint, can be slanted, thereby being prevented from hindering the transmission shaft. The speed-change operation lever and the steering system are compactly disposed laterally opposite to each other. Thus, all the drive train between the engine and the continuously variable transmission, the steering system and the speed-change control device can be easily disposed compactly in a restricted space, e.g., in the dashboard.

Furthermore, the tractor is provided with a neutral pedal and an interlocking mechanism that forcedly puts the continuously variable transmission into neutral and disengages the PTO clutch according to treading of the neutral pedal.

An operator can select either the speed-change lever or the neutral pedal to be operated for stopping the tractor. The neutral pedal is available for an operator's operation of the tractor because only one tread thereof disengages the PTO clutch.

Furthermore, if the continuously variable transmission is a hydrostatic transmission (hereinafter referred to as an "HST"), a closed fluid circuit thereof is bypassed by the treading of the neutral pedal.

An HST is advantageous in its smoothly continuous variation of output rotational speed and direction by operation of only the speed-change without a complex linkage. The HST is also advantageous in its braking function when it is set to neutral, thereby enabling a vehicle (the tractor) to stop without a mechanical brake. However, the neutral position of the HST is difficult to adjust. An error is liable to be generated in the neutral setting of the HST or in the linkage between the speed-change lever and the control arm. Such an error causes a vehicle to travel slowly while the speed-change lever is set at the neutral position. The above bypass construction in the HST solves this problem. That is, by treading the neutral pedal, the closed fluid circuit of the HST is bypassed so as to cancel the drive of the HST, thereby stopping the tractor.

The base portion of the speed-change lever and the top of the speed-change operation shaft are connected through a flexible joint. A guide slot for forward drive and a guide slot for backward drive are joined to each other so as to be cranked, thereby constituting the opening of the dashboard.

Accordingly, the speed-change lever, when it is shifted through the cranked opening between its forward drive position and its backward drive position, must be once located in a vertical slot and moved vertically. Even if the operator unexpectedly touches the speed-change lever, the worst situation that the traveling direction of the tractor will not accidentally reverse. The operational direction of the speed-change lever for forward and backward driving can be learned so as to facilitate the operation of the tractor. The flexible joint interposed between the base portion of the speed-change lever and the top of the speed-change operation shaft is disposed in the dashboard so as to be protected from dust or the like, thereby being secured in its durability.

A fuel tank is disposed in the dashboard before the steering column. The fuel tank is provided at its upper portion with a recess through which the speed-change operation shaft is allowed to pass.

The arrangement of the fuel tank in the dashboard contributes to the compactness of the tractor. The space below the speed-change lever can be applied for the fuel tank, thereby securing the required volume of the fuel tank while preventing the fuel tank from hindering the speed-change lever.

Other and further objects, features and advantages of the present invention will become more apparent upon a reading of the following detailed description and drawings.

BRIEF DESCRIPTION OF THE DRAWINGS/FIGURES

FIG. 33(*b*) is a sectional plan view of the same, showing the situation where the wire pulls the arm so as to release the lift arms from the friction device.

DETAILED DESCRIPTION OF THE INVENTION

Figure 1:
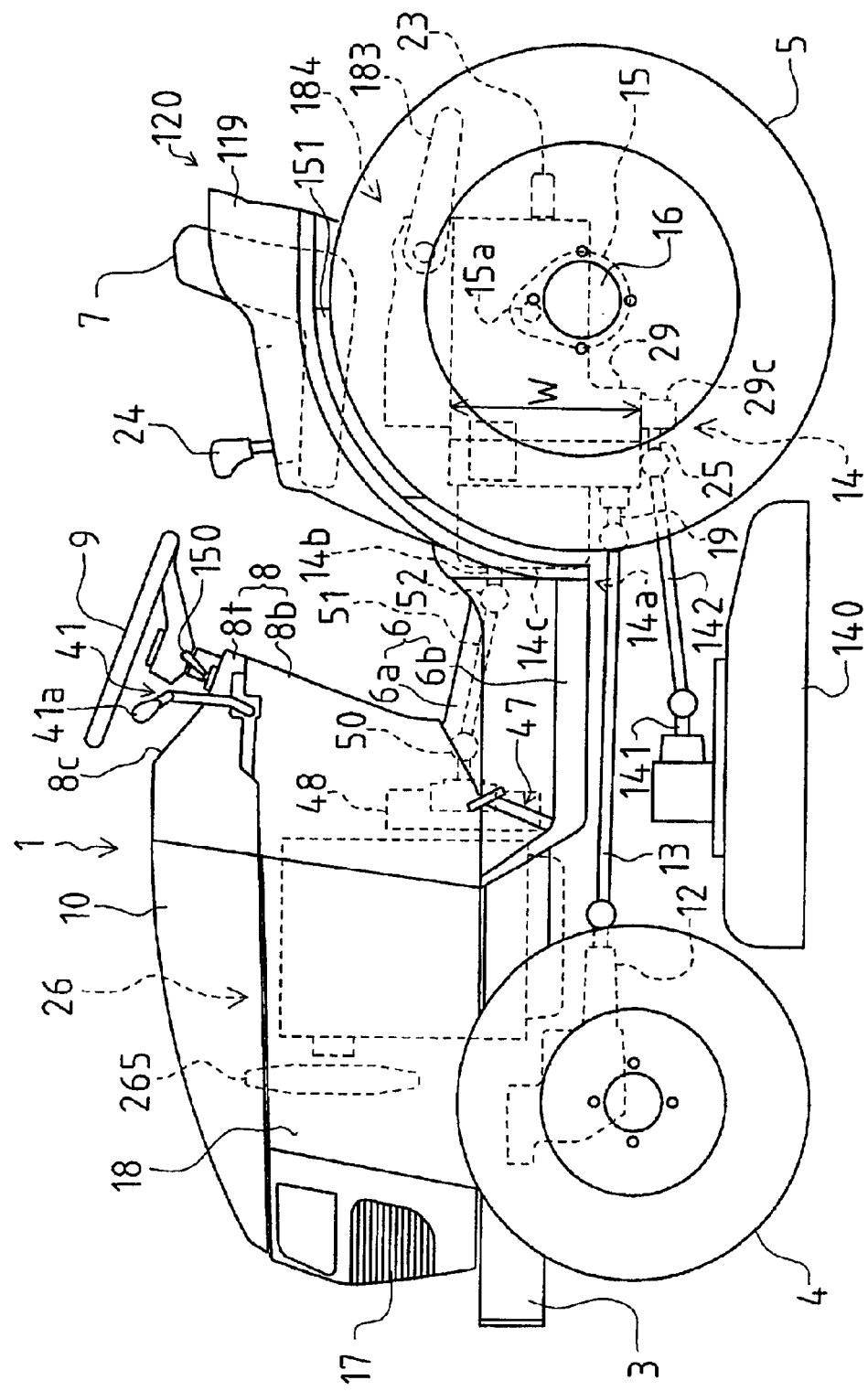
FIG. 1 is an entire side view of an agricultural tractor having an engine and a transmission according to the present invention.

Referring to FIG. 1, an agricultural tractor 1 will be generally described. Left and right side frames 3 are extended longitudinally of tractor 1. A transmission 14 is disposed at a longitudinally intermediate portion of tractor 1. Transmission 14 comprises a transmission housing 29 and an HST housing 14c fixed onto a front end surface of transmission housing 29. Hereinafter, this entire transmission housing structure is referred to as "a transmission housing structure". Rear ends of side frames 3 are attached to a front surface of transmission housing 29 of transmission 14. Rear axle casings 15 are provided on left and right side surfaces of a rear portion of transmission housing 29, respectively.

Tractor 1 can be provided on its rear end with a rear working attachment such as a cultivator. A rear-PTO shaft 23 projects rearward from the rear end of transmission housing 29 so as to drive the rear working attachment.

A (mid-mount) mower 140 is suspended from a mid bottom portion of tractor 1. A mid-PTO shaft 25 for driving mower 140 is forwardly-protrusively supported by a bottom cover 29c provided onto the bottom surface of transmission housing 29. Mower 140 is provided at the top thereof with an input shaft 141. Input shaft 141 is connected to mid-PTO shaft 25 through a transmission shaft 142 and universal joints.

A front axle casing 12 is supported below the front portions of side frames 3. Front wheels 4 serving as steerable wheels are disposed on left and right side ends of front axle casing 12, respectively. Left and right rear axle casings 15 support respective rear axles 16. A rear wheel 5 is mounted onto an outer end of each rear axle 15. Differential output shafts 15a project from left and right side surfaces of transmission housing 29 so as to interlock with respective rear axles 16.

A hydraulic lift device 184 including lift arms 183 is mounted on the top of the rear portion of transmission housing 29 so as to raise and lower the rear working attachment.

A cover 6 is mounted so as to cover rearward portions of side frames 3. Cover 6 is formed by blow molding of synthetic resin. Cover 6 comprises a center cover portion 6a that looks like an arch when sectionally viewed in rear. Also, cover 6 integrally forms step portions 6b spread from left and right edges of center cover portion 6a, respectively. A fender 120 is extended backward continuously from a rear end of cover 6 over front and upper portions of both rear wheels 5 to prevent rear wheels 5 from splashing an operator with mud or soil.

A seat 7 is disposed above transmission housing 29 of transmission 14. A dashboard 8 is erected over longitudinally intermediate portions of side frames 3. On an upper portion of dashboard 8 are disposed an instrument panel 8c and a steering wheel 9 for turning front wheels 4.

A speed-change lever 41 is longitudinally rotatably supported in dashboard 8 and its grip portion 41a laterally projects from one of left and right sides of dashboard 8. Speed-change lever 41 is interlockingly connected to a control arm 14d (not shown in FIG. 1) of transmission 14 through a linkage, as discussed later.

A neutral pedal 47 is pivotally disposed above left step portion 6b. Neutral pedal 47 is interlockingly connected with transmission 14 so that transmission 14 is brought into neutral by treading neutral pedal 47. Neutral pedal 47 is also interlockingly connected to a later-discussed PTO clutch 69 (not shown in FIG. 1) so as to disengage PTO clutch 69.

In transmission housing 29 of transmission 14 are disposed a differential gear unit 261 (not shown in FIG. 1) and a sub speed-change gear mechanism 43 (not shown in FIG. 1). Differential gear unit 261 differentially connects left and right differential output shafts 15a with each other. Sub speed-change gear mechanism 43, which transmits power to differential gear unit 261, is shifted by operating a sub speed-change lever 24 disposed beside seat 7. Transmission 14 also comprises clutches for rear-PTO shaft 23 and mid-PTO shaft 25. The construction of transmission 14 will be detailed later.

Power of engine 26 is input to transmission 14 and transferred to left and right rear axles 16 in respective rear axle casings 15 through left and right differential output shafts 15a, thereby driving rear wheels 5. A front-PTO shaft 19 supported at the front portion of transmission 14 is rotated synchronously with differential output shafts 15a. The rotation of front-PTO shaft 19 is transferred to front axle casing 12 through a propeller shaft 13 and universal joints so as to drive left and right front wheels 4.

The power of engine 26 is also transferred to rear-PTO shaft 23 so as to drive the rear working attachment provided onto the rear end of tractor 1. Furthermore, the power of engine 26 is transferred to mid-PTO shaft 25 so as to drive mower 140 disposed at the mid bottom portion of tractor 1.

Figure 2:
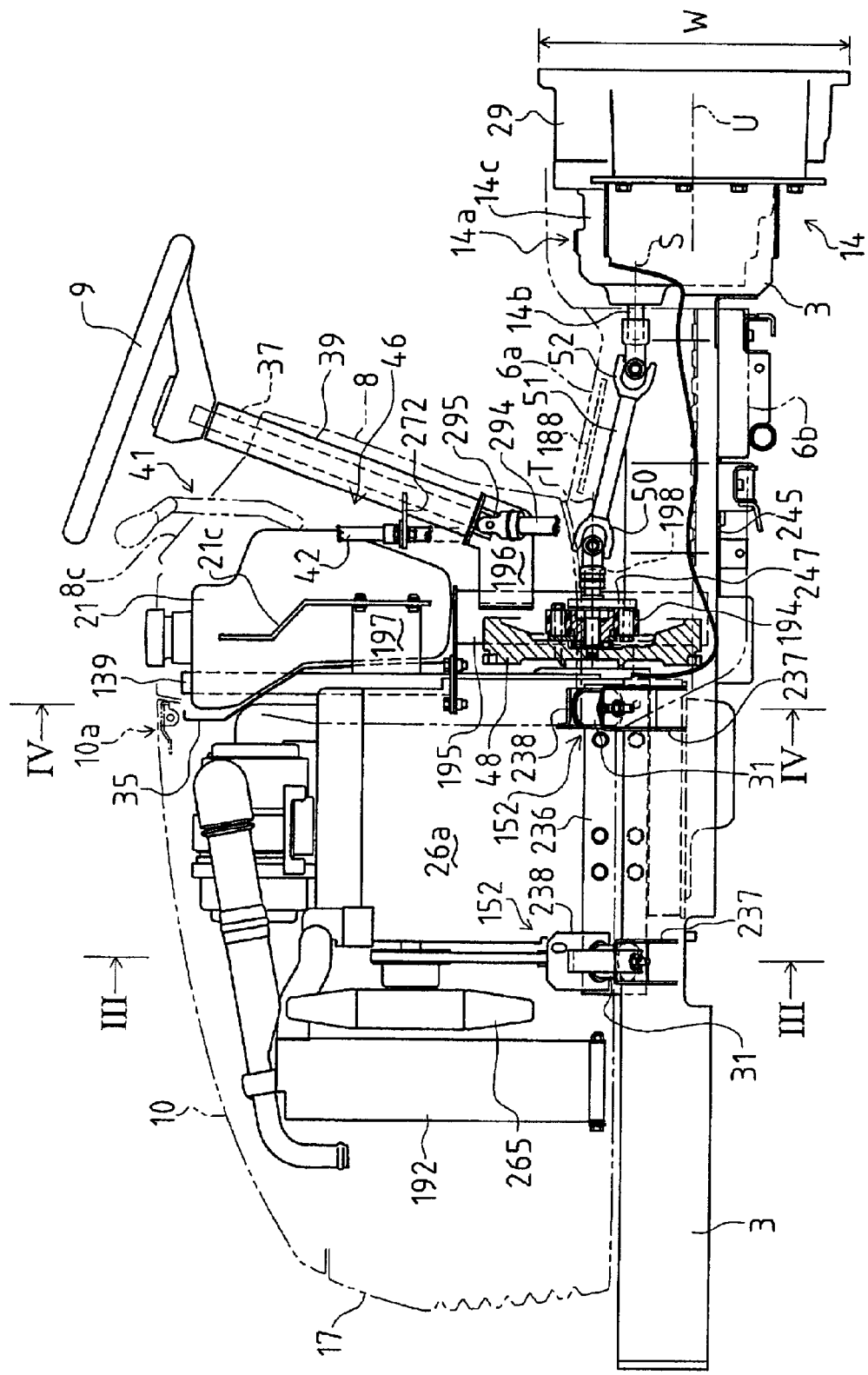
FIG. 2 is an enlarged side view of an engine supporting system with vibration isolators and a power connection system between a flywheel of the engine and an input shaft of the transmission in the same tractor.
Figure 3:
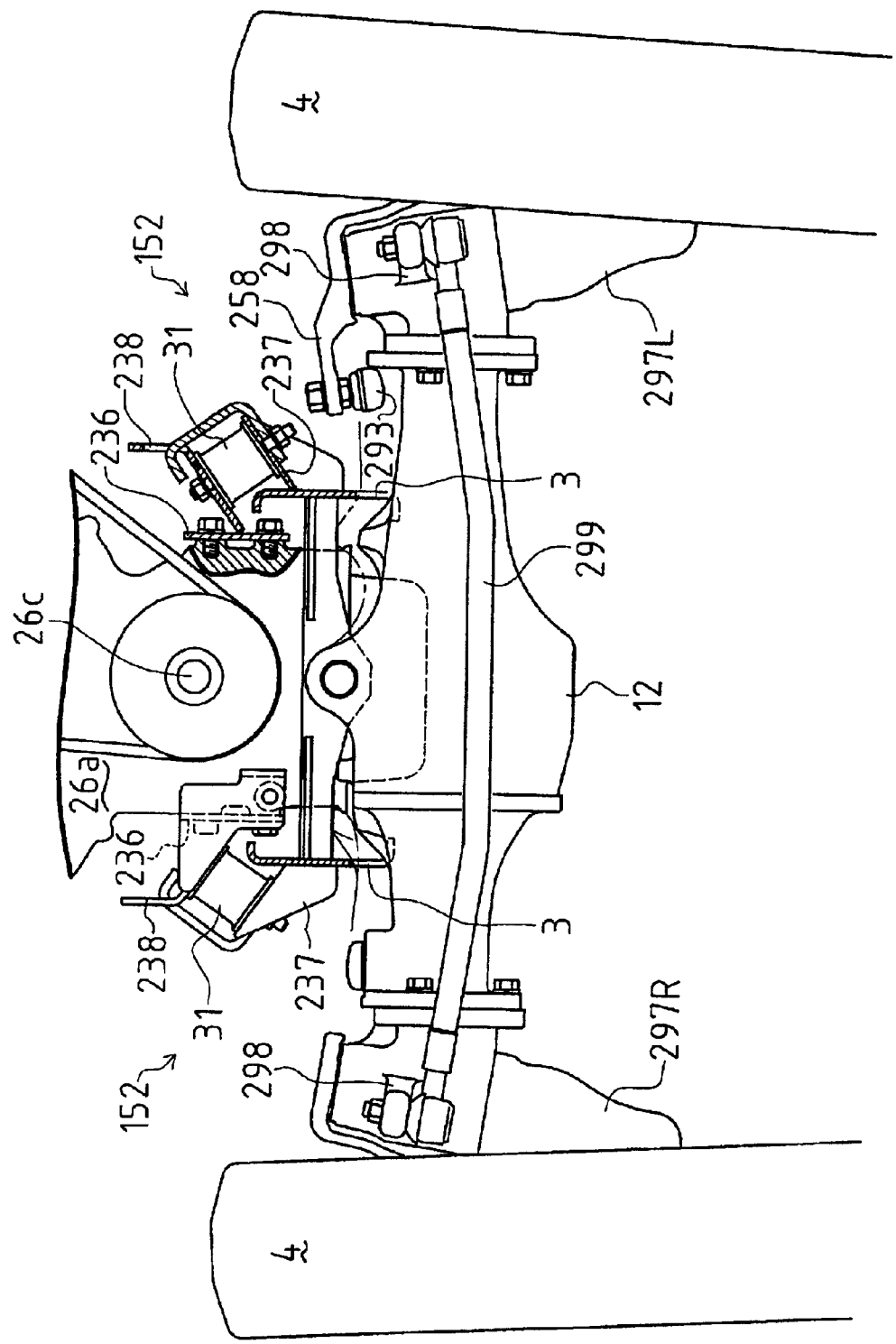
FIG. 3 is a cross sectional view taken along an arrow III—III of FIG. 2.

Description will now be given of engine 26 and its circumference in accordance with FIGS. 2 to 4 and others. As shown in FIGS. 2 and 3, engine 26 comprises a crankcase 26a in which a crankshaft 26c is disposed. Crankshaft 26c projects forward so as to drive a cooling fan 265 of a radiator 192 disposed in front of crankcase 26a through pulleys and a belt. Crankshaft 26c also projects backward from crankcase 26a so as to be provided thereon with a flywheel 48.

Figure 4:
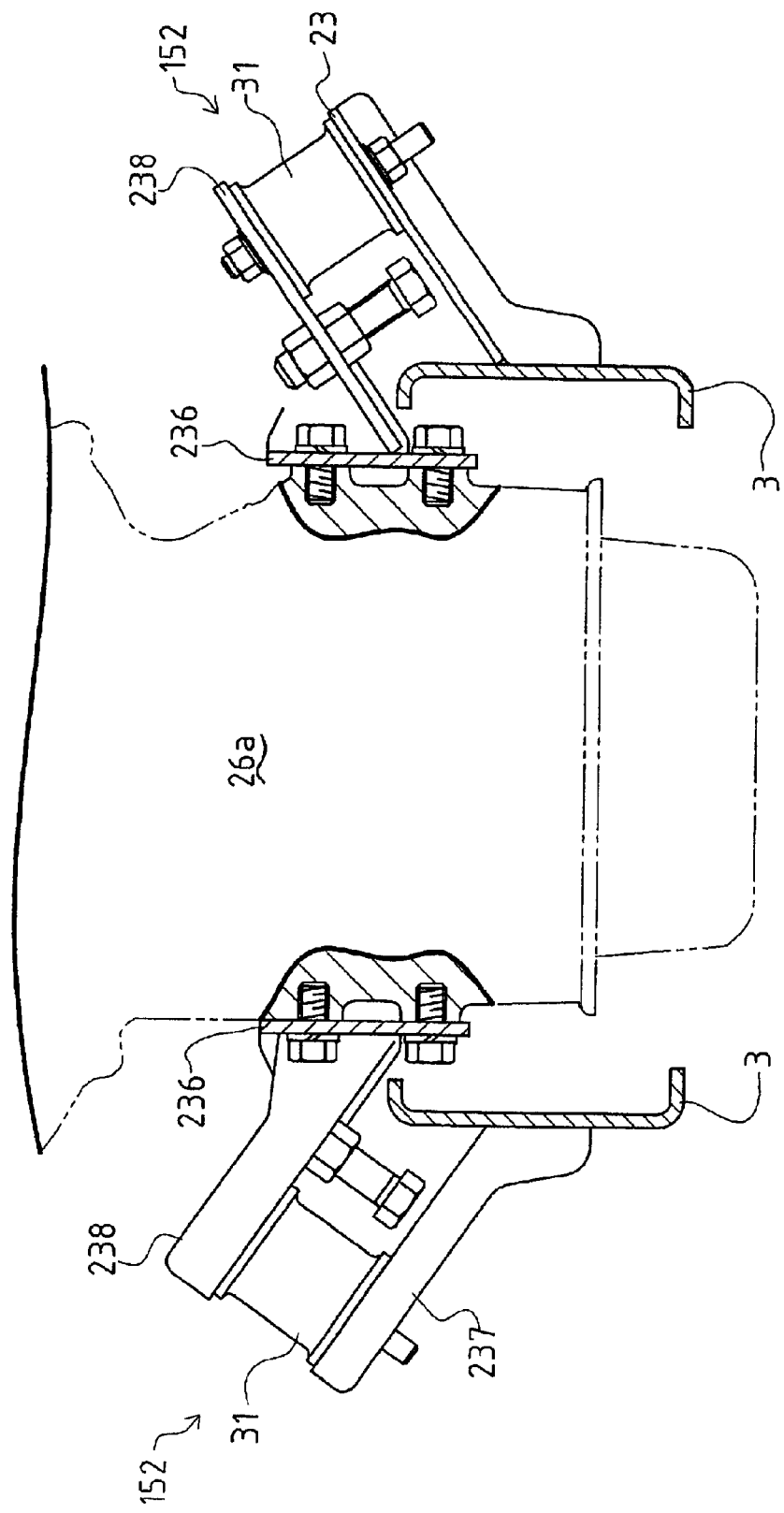
FIG. 4 is a cross sectional view taken along an arrow IV—IV of FIG. 2.

As shown in FIGS. 2 to 4, front and rear stays 237 are provided on an outer side surface of each of side frames 3 so as to project laterally upwardly slantwise. On the other hand, longitudinally elongated plate-like isolator support frames 236 are fixed onto left and right side surfaces of a lower portion of crankcase 26a, respectively. Front and rear stays 238 are provided on each isolator support frame 236 so as to project slantwise in parallel to and vertically coincident with respective front and rear stays 238.

Four rubber isolators 31 in total, serving as first vibration isolators, are fixedly mounted on respective stays 237 projecting from left and right side frames 3. Isolator support frames 238 are placed on respective rubber isolators 31.

Isolator support frames 236, rubber isolators 31 and stays 237 and 238 constitute a vibration isolating mechanism 152 for supporting engine 26 on side frames 3 while isolating vibration.

Rubber isolators 31 are required to support a torque reaction force from engine 26 as well as the self-weight of engine 26. Rubber isolators 31 are also required to isolate noise and vibration appropriately. If the chief ingredient of rubber isolator 31 is natural rubber, both the isolation of vibration and durability may be sufficiently obtained.

However, other material, e.g., synthetic resin, is allowed to form rubber isolators 31, if it can appropriately absorb vibration and noise from engine 26. Metal springs may serve as vibration isolators replacing rubber isolators 31.

In front of engine 26 are disposed radiator 192 and a battery (not shown). Above crankcase 26a are disposed an air cleaner and a muffler. A front cover 17, left and right side covers 18 and a hood 10, as shown in FIG. 1, enclose engine 26 and the instruments surrounding engine 26. Hood 10 is provided at its rear end with a hinge 10a so as to allow its front end to rotate vertically, as shown in FIG. 2.

Figure 7:
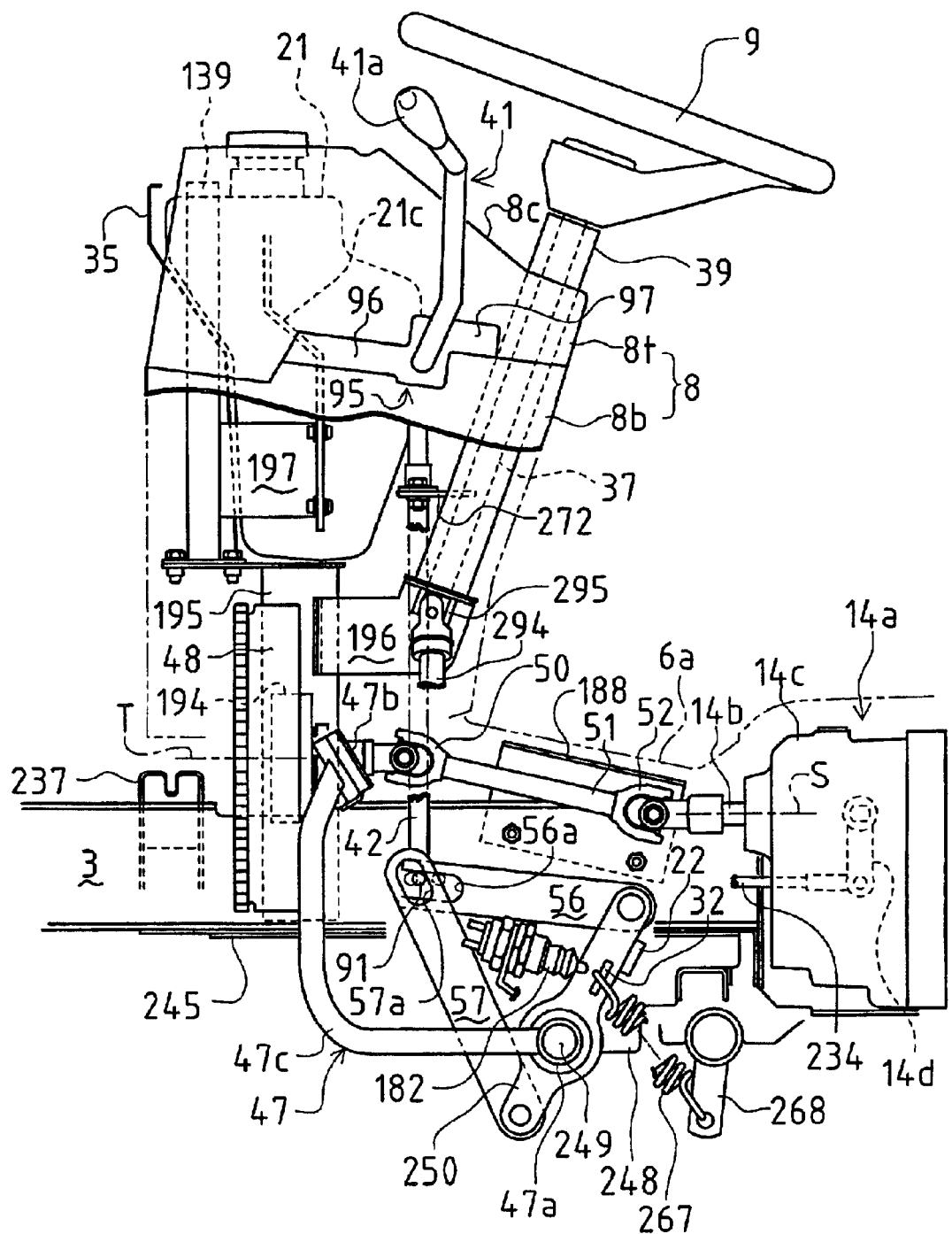
FIG. 7 is a fragmentary inner side view of the tractor showing a linkage among a steering wheel, a speed-change lever and the input shaft of the transmission, which are mostly disposed in a dashboard.
Figure 9:
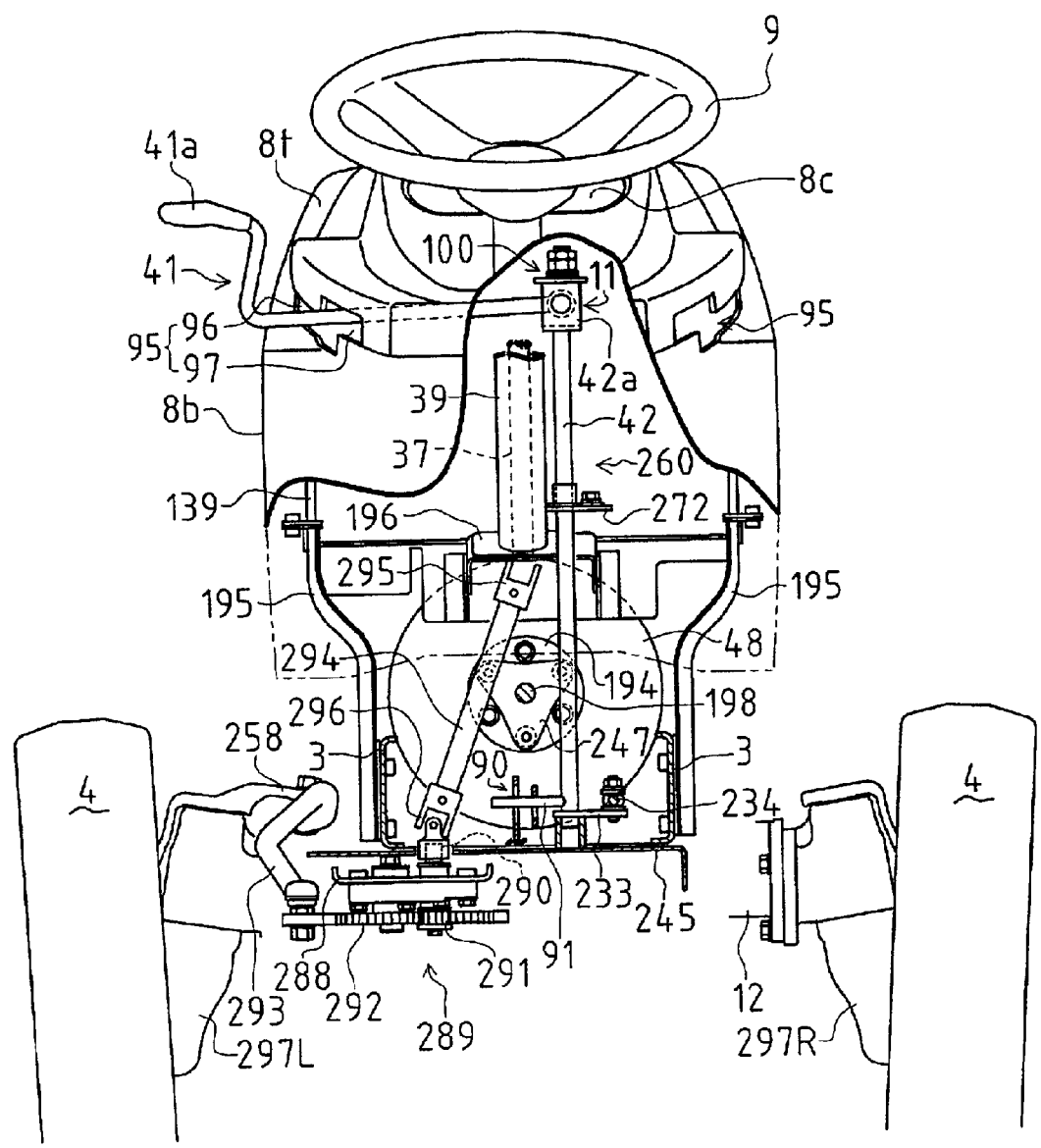
FIG. 9 is a fragmentary inner rear view of FIG. 7 showing a travel control system and a steering control system.
Figure 27:
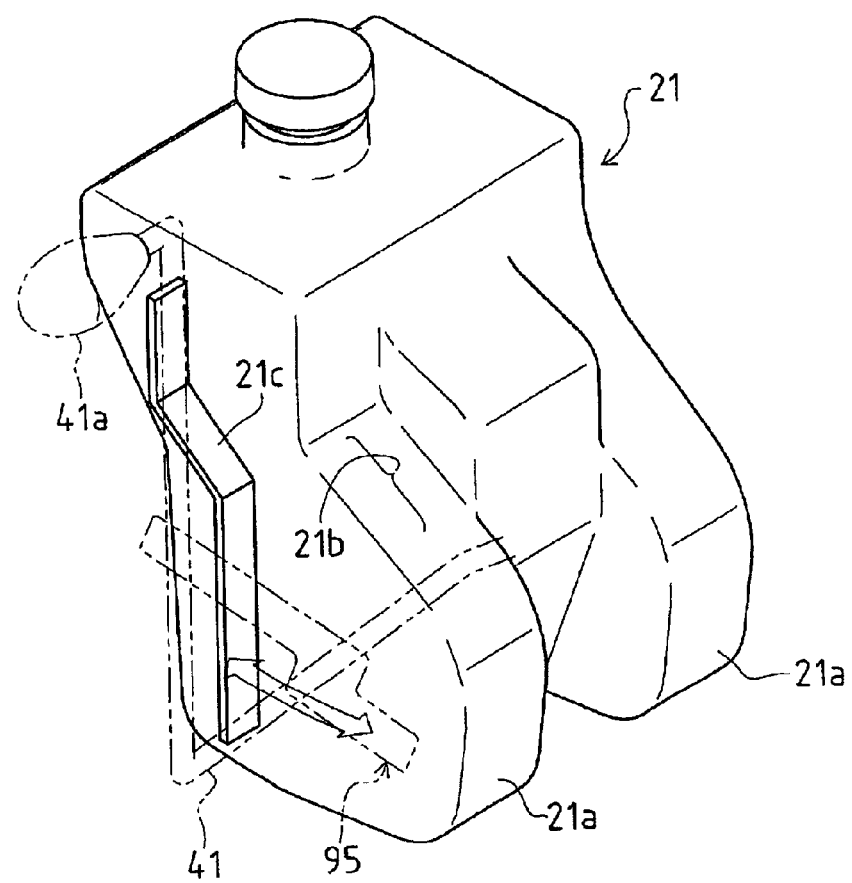
FIG. 27 is a perspective view of a fuel tank in association with the speed-change lever.

Behind engine 26, left and right upright frames 195 are fixed onto respective outer surfaces of side frames 3 and extended upward. As shown in FIGS. 2, 7 and 9, bottom ends of feet of a support frame 139, which looks like an arch when viewed in rear, are fixed onto respective top ends of upright frames 195. As shown in FIGS. 2 and 7, a fuel tank 21 is immovably supported by one of the feet of support frame 139. That is, as shown in FIG. 27, fuel tank 21 is formed on its either left or right side surface with a rib 21c, which is fastened to the foot of support frame 139 through a stay 197.

A shield plate 35 is fixed to upright frames 195 so as to partition off an interior space of dashboard 8 from an interior space of hood 10. Shield plate 35 is extended and bent along a bending front surface of fuel tank 21 disposed in dashboard 8.

Behind upright frames 195, a bracket 196 is fixedly extended laterally between upright frames 195. A bottom end of a cylindrical steering column 39 is fixed to bracket 196 so as to be extended almost upright and slightly backwardly slantwise. A steering wheel shaft 37 is rotatably disposed in steering column 39. Steering wheel shaft 37 projects upward from steering column 39 so as to be fixedly provided on its top with steering wheel 9.

Flywheel 48 of engine 26 is disposed in rear of the lower portion of crankcase 26a so as to orient its axis in the longitudinal direction of tractor 1. A flange 247 is mounted onto flywheel 48 through an elastic coupling 194 serving as a second vibration isolator. An output shaft 198 is fixed onto flange 247. Output shaft 198 is drivingly connected to an input shaft 14b of transmission 14 through a transmission shaft 51 and first and second universal joints 50 and 52. First universal joint 50 is nearer to flywheel 48 than second universal joint 52. Transmission shaft 51 is interposed between first and second universal joints 50 and 52.

Elastic coupling 194 absorbs fluctuation of torque acting to flywheel 48. In detail, teeth of gears of later-discussed multiple gear trains in transmission 14 are provided with backlash for smooth transmittal of rotation of the gears. If a torque fluctuation generated in flywheel 48 is transmitted to the gears, the teeth of gears beat against one another because of their backlash. Elastic coupling 194 is interposed on the power train between flywheel 48 and transmission 14 so as to restrict the transmittal of torque fluctuation to the gears in transmission 14, thereby restricting the tooth-beating sound of the gears.

For restricting this tooth-beating sound, elastic coupling 194 may be disposed at any position between flywheel 48 and input shaft 14b of transmission 14. For example, it may be interposed between second universal joint 52 and input shaft 14b. However, in the preferred embodiment, elastic coupling 194 is interposed between flywheel 48 and preceding (first) universal joint 50 so as to be disposed adjacent to flywheel 48, thereby improving the effect of absorbing the torque fluctuation. Also, elastic coupling 194 upstream of preceding universal joint 50 can prevent the torque fluctuation generated in flywheel 48 from reaching universal joint 50 which is angled to transmit power to slanted transmission shaft 51, thereby prolonging the life of universal joint 50.

Figure 5:
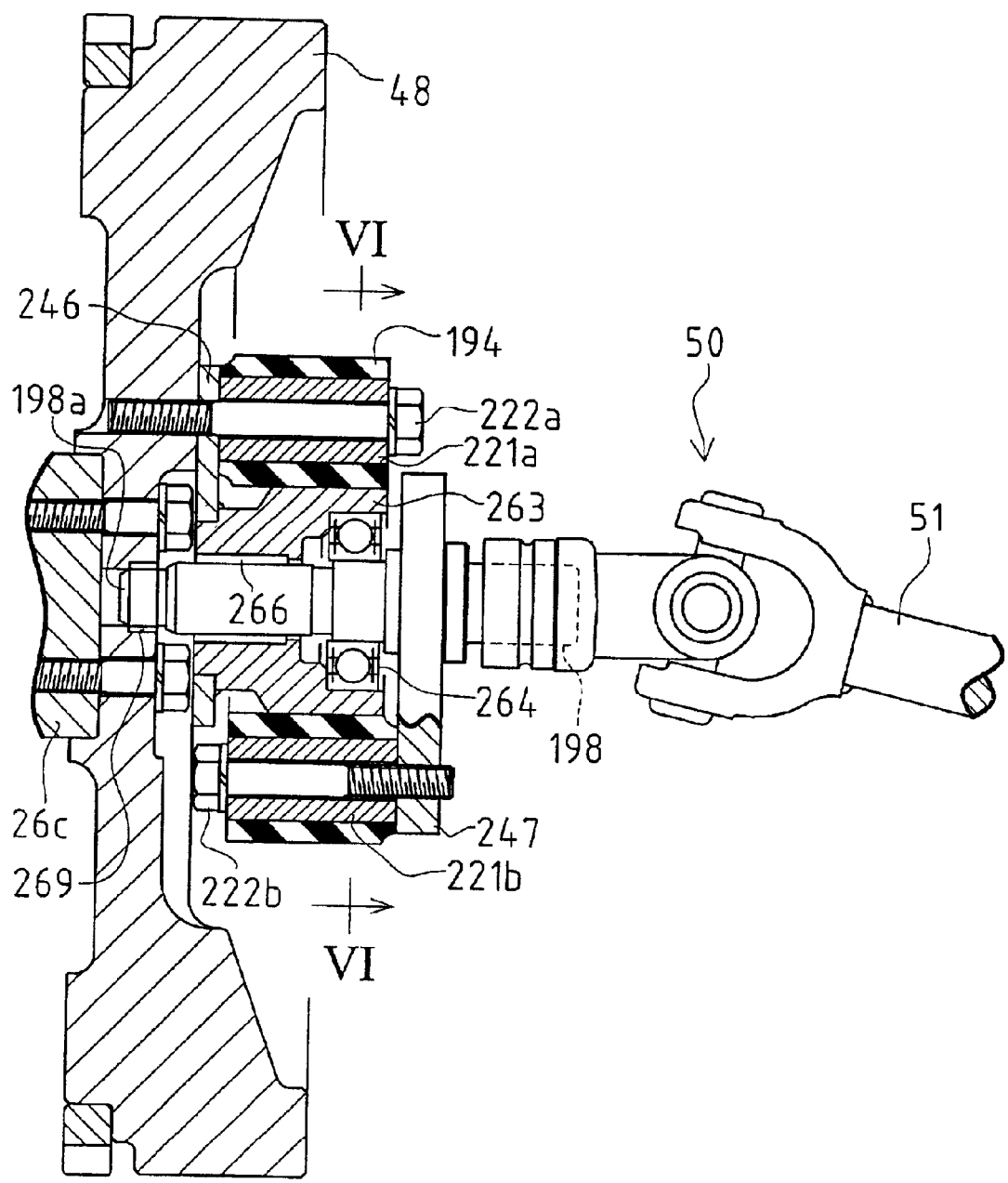
FIG. 5 is a sectional side view of the flywheel drivingly connected to the transmission.
Figure 6:
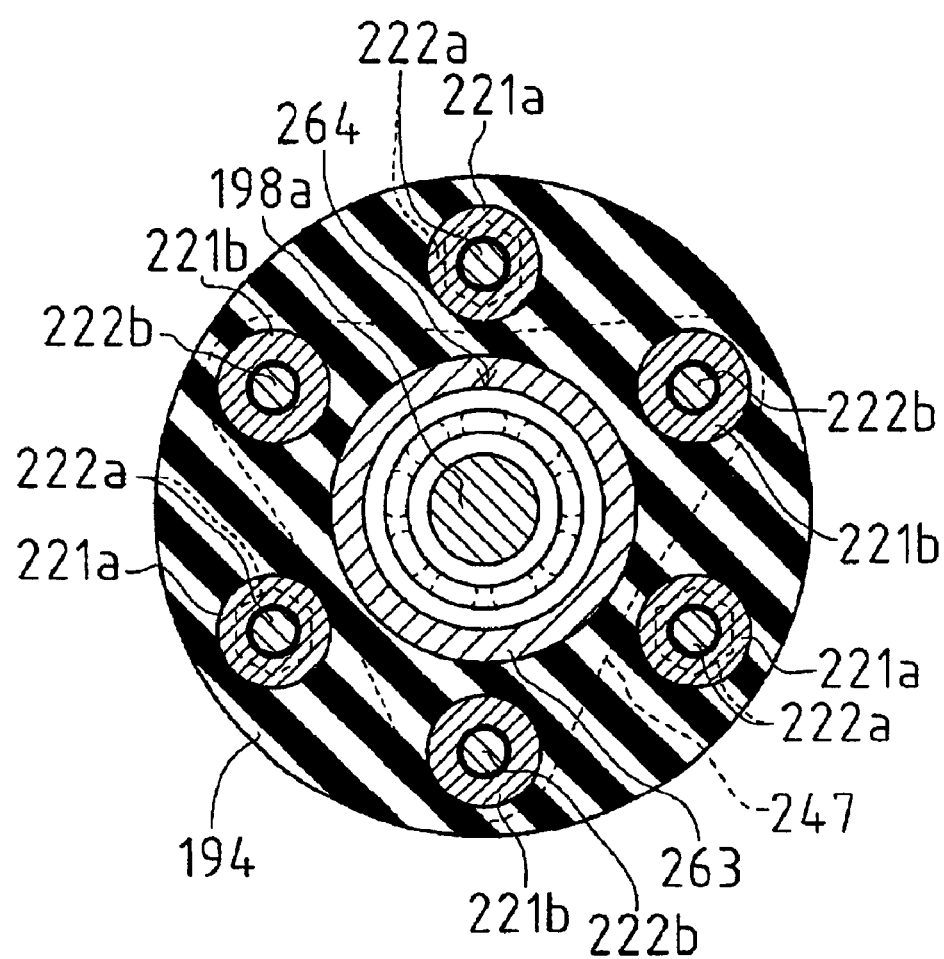
FIG. 6 is a cross sectional view taken along an arrow VI—VI of FIG. 5.

Referring to FIGS. 5 and 6, the structure of a portion of the power train around elastic coupling 194 will be detailed. A central portion of the front surface of flywheel 48 is fixed to the rear end of crankshaft 26c with bolts. Flange 246 to be disposed in rear of flywheel 48 is equilaterally triangular when viewed in rear. Flange 246 is located so that its centroid coincides with the axis of flywheel 48. Three steel cylindrical pipes 221a are arranged in parallel so as to extend backward from the three vertexes of flange 246, respectively. Bolts 222a are forwardly inserted into respective pipes 221a and screwed into flywheel 48, thereby fastening flange 246 to the rear surface of flywheel 48 together with pipes 221a.

Flange 246 is provided with a hole corresponding to the centroid of the equilaterally triangular rear view thereof. A front end of a hollow supporter 263 is engaged into the centroid hole of flange 246 and fixed to flange 246 by welding so as to extend supporter 263 backward from flange 246. Hence, flange 246 is used for mounting supporter 263 onto flywheel 48. Bolts 222a are screwed in or out so as to attach or detach supporter 263 to and from flywheel 48.

Supporter 263 is located so that an axis of a center hole of supporter 263 having a circular rear view coincides with the rotational axis of flywheel 48.

Elastic coupling 194 is made of rubber and entirely shaped in a thick ring so as to be disposed around supporter 263. Elastic coupling 194 is bored through along its axis with six parallel circular holes. These six holes are distributed at regular (60°) intervals around the center hole of elastic coupling 194 in which supporter 263 is disposed. Three pipes 221a extended backward from flange 246 are inserted into three alternating holes of the six holes, respectively.

Three cylindrical pipes 221b having the same shape of pipes 221a are inserted into the rest of the holes, respectively. Rear ends of pipes 221b are put onto a second flange 247. Bolts 222b are inserted backward into respective pipes 221b and screwed into second flange 247 so as to fasten pipes 221b to second flange 247. Similarly with flange 246, second flange 247 has a substantially equilaterally triangular rear view, as shown in FIG. 9. When viewed in rear, the centroids of two flanges 246 and 247 coincide with each other, but flanges 246 and 247 are different at an angle of 60 ui in phase in their rotational direction.

Second flange 247 is integrally provided with output shaft 198 projecting backward from the center of flange 247. A rear end of output shaft 198 is joined to first universal joint 50 so as to be drivingly connected to transmission shaft 51. As shown in FIG. 2 and others, transmission shaft 51 is drivingly connected to input shaft 14b of transmission 14 through second universal joint 52.

Also, second flange 247 is integrally provided with a shaft portion 198a projecting forward from second flange 247 coaxially with output shaft 198. Shaft portion 198a is supported by the inner peripheral surface of supporter 263 through a roller bearing 264 and a bush 266. Shaft portion 198a projects forward from supporter 263 and is rotatably inserted into an axial hole of flywheel 48 through a bush 269.

Due to such a structure, when flywheel 48 is rotated by driving engine 26, a torque is transmitted from flywheel 48 to output shaft 198 through flange 246, pipes 221a, elastic coupling 194, pipes 221 and second flange 247, so as to be further transmitted to transmission 14. At this time, the fluctuation of rotational acceleration of engine 26 is absorbed by peripherally elastic deformation of elastic coupling 194.

However, elastic coupling 194 is allowed to be elastically deformed in its radial direction as well as its peripheral direction. The radial deformation of elastic coupling 194 tilts or displaces the rotational axis of output shaft 198 relative to the rotational axis of flywheel 48, thereby impairing the stability of torque transmittal to the power train downstream thereof. This unsteadiness of torque transmittal reduces the life of universal joints 50 and 52, causes a noise, and reduces the durability of elastic coupling 194. Thus, the difference of rotational axis between flywheel 48 and output shaft 198 is requested to be prevented as much as possible.

From this viewpoint, shaft portion 198a formed integrally with output shaft 198 is supported at two positions by flywheel 48 and supporter 263 which is integral with flywheel 48 through flange 246. Accordingly, while elastic coupling 194 is elastically deformed, output shaft 198 is held so that its axis firmly coincides with the axis of flywheel 48. Consequently, output shaft 198 generates a torque steadily, thereby improving the durability of elastic coupling 194 and universal joints 50 and 52 and restricting noise.

Furthermore, supporter 263 can be attached or detached to and from flywheel 48 by screwing up and loosing bolts 222a between flange 246 and flywheel 48. Preliminarily, elastic coupling 194, second flange 247, pipes 221a and 221b are put together with supporter 263, thereby constituting a unit. When tractor 1 is assembled, this unit can be easily attached to flywheel 48 just with bolts 222a, thereby reducing the number of processing steps for producing tractor 1.

An engine power input structure of transmission 14 will be described. In a front portion of transmission 14, i.e., in HST housing 14c and in the front-end portion of transmission housing 29 is disposed a hydrostatic transmission (hereinafter referred to as "HST") 14a. HST 14a serves as a main speed-change mechanism drivingly connected with sub speed-change gear mechanism 43 in transmission housing 29. An input shaft of HST 14a is the above-mentioned input shaft 14b projecting forward from HST housing 14c. Incidentally, a control arm 14d is pivoted on one lateral side portion of HST housing 14c so as to continuously vary the deceleration ratio of HST 14a.

Suppose a horizontal bisector surface U (as drawn in a phantom line in FIG. 2), which divides the entire transmission housing structure into upper and lower halves, i.e., bisects the longest vertical width W of the transmission housing structure (as shown in FIGS. 1 and 2). Input shaft 14b is supported by an upper portion of HST housing 14c so as to locate a rotational axis S of input shaft 14b above bisector surface U.

Also, as shown in FIGS. 2 and 7, input shaft 14b is disposed so as to locate its rotational axis S below a rotational axis T of flywheel 48. Furthermore, when viewed in plan as shown in FIG. 8, rotational axis S of input shaft 14b is shifted to one lateral side of rotational axis T of flywheel 48 so as to secure a space for arranging a later-discussed rod 234 in the other lateral side of rotational axis T of flywheel 48.

Transmission shaft 51 is disposed between left and right side frames 3 so as to transfer the rotation of flywheel 48 to input shaft 14b of transmission 14. Transmission shaft 51 is connected at its one end to output shaft 198 attached onto flywheel 48 through first universal joint 50. Transmission shaft 51 is also connected at the other end thereof to input shaft 14b through second universal joint 52.

Figure 8:
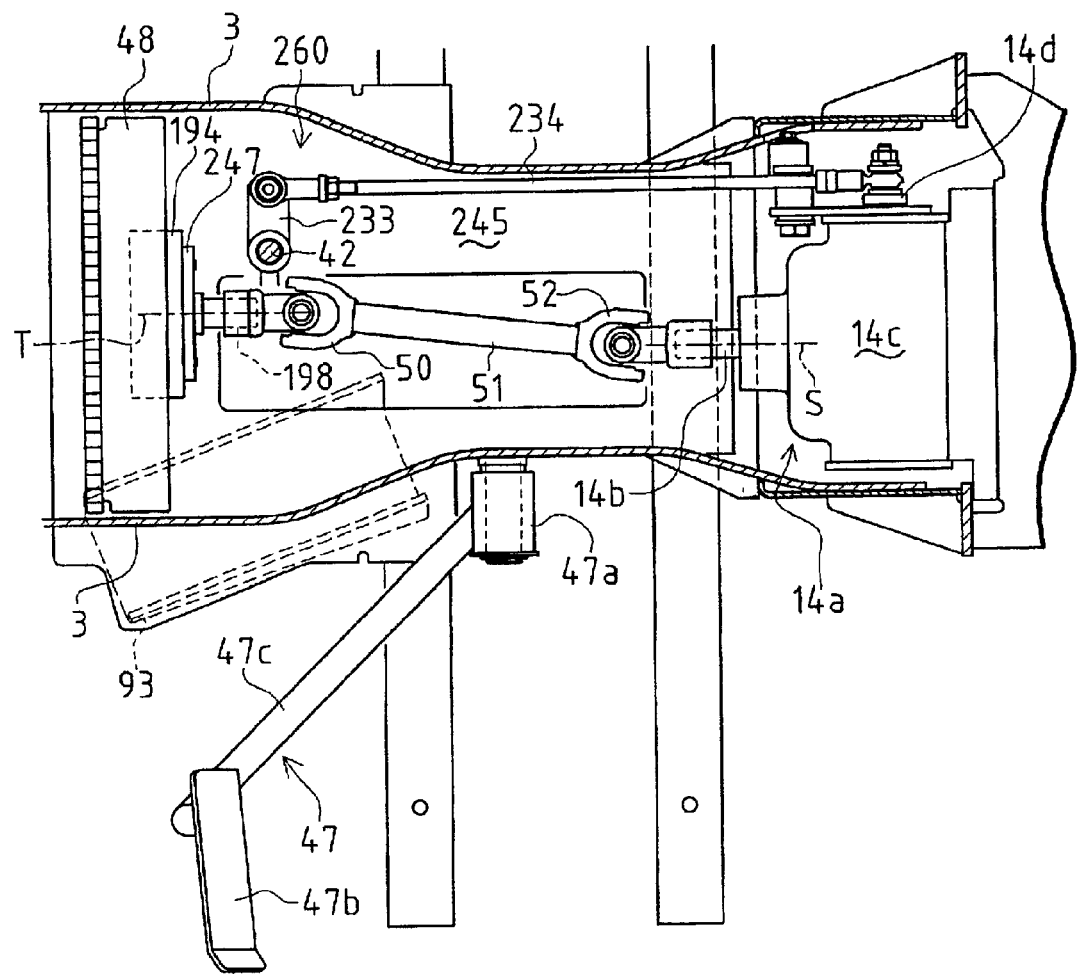
FIG. 8 is a fragmentary inner plan view of FIG. 7.

Since input shaft 14b is arranged in relative to flywheel 48 so as to establish the above-mentioned positional relationship of their rotational axes S and T, transmission shaft 51 is slanted backwardly downward when viewed in side as shown in FIG. 7, and also slanted laterally when viewed in plan as shown in FIG. 8.

The angle of first universal joint 50 is the same with that of second universal joint 52. Therefore, when flywheel 48 is rotated at a uniform velocity, input shaft 14b is also rotated at a uniform velocity. Since input shaft 14b is disposed at the upper portion of HST housing 14c, the vertically positional difference between rotational axes S and T is not excessively large. Thus, the angles of universal joints 50 and 52 can be so small as to restrict its abrasion.

Universal joints 50 and 52, transmission shaft 51 and the upper portion of HST 14a are covered with center cover portion 6a of cover 6.

As shown in FIG. 7, a partition member 188, which looks like a gate when viewed in rear, is disposed between the inner surface of center cover portion 6a and transmission shaft 51. Partition member 188 prevents center cover portion 6a made of synthetic resin from yielding to the weight of an operator. Even if universal joint 50 or 52 is broken so as to bound transmission shaft 51, partition wall 188 protects cover 6 from bounded transmission shaft 51. Left and right foot ends of partition member 188 is fixed to respective left and right side frames 3, thereby serving as a cross member reinforcing side frames 3.

A steering system of tractor 1 will now be described in accordance with FIGS. 7, 9 and others.

As shown in FIGS. 7 and 9, a base plate 245 is disposed between the bottom surfaces of side frames 3 so as to join side frames 3 with each other. As shown in FIG. 9, a steering gear frame 288 is fixedly disposed under a left portion of base plate 245. A steering gear unit 289 is provided on a horizontal surface of steering gear frame 288. Steering gear unit 289 comprises an input shaft 290, a pinion 291, a sector gear 292 and an output rod 293. Input shaft 290 is vertically supported by steering gear frame 288. Pinion 291 is provided on a lower end of input shaft 290. Sector gear 292 is rotatably supported by steering gear frame 288 and meshes with pinion 291. Output rod 293 is pivotally connected to an end portion of sector gear 292 at a leftward outside of tractor 1.

While steering gear unit 289 is disposed at one lateral (left) side of tractor 1, steering wheel shaft 37, which is rotatably supported in steering column 39 erected on bracket 196 as mentioned above, is disposed at the lateral middle of tractor 1. Thus, a transmission rod 294 interposed between steering wheel shaft 37 and input shaft 290 is laterally slanted when viewed in rear, as shown in FIG. 9. An upper end of transmission rod 294 is connected to steering wheel shaft 37 through a first flexible joint 295. A lower end of transmission shaft 294 is connected to input shaft 290 through a second flexible joint 296.

On the other hand, as shown in FIG. 3, left and right rotatable casings 297L and 297R are attached through respective kingpins (not shown) to the left and right outside ends of front axle casing 12. A knuckle arm 298 projects from each of rotatable casings 297L and 297R. Utmost ends of left and right knuckle arms 298 are connected with each other through a tie rod 299.

A steering arm 258 is provided on left rotatable casing 297L. Output rod 293 of steering gear unit 258 is pivotally connected to an utmost end of steering arm 258.

Due to this structure, when steering wheel 9 together with steering wheel shaft 37 is turned, pinion shaft 291 together with input shaft 290 is rotated through transmission rod 294, thereby rotating sector gear 292 so as to move output rod 293 longitudinally. According to the movement of output rod 293, rotatable casings 297L and 297R connected with output rod 293 are laterally rotated so as to turn front wheels 4 leftward or rightward, thereby turning tractor 1.

The reason why two universal joints 295 and 296 are used to connect steering wheel shaft 37 and input shaft 290 will be described. If input shaft 290 is connected to steering wheel shaft 37 without second flexible joint 296, input shaft 290 must be slanted so as to be coaxial with transmission rod 294. In this case, sector gear 292 must be slanted below base plate 245 so that the minimum clearance of tractor 1 above ground is not allowed to be large. If pinion 291 and sector gear 292 are replaced with bevel gears, a bevel gear as sector gear 292 can be disposed horizontally. However, bevel gears increase expenses.

In this embodiment, by interposing second flexible joint 296 between transmission rod 294 and input shaft 290, input shaft 290 can be oriented vertically, thereby allowing sector gear 292 to be disposed laterally horizontally. Therefore, the minimum clearance of tractor 1 above ground can be sufficient so as to prevent impediments on the ground from hitting tractor 1. Pinion 291 and sector gear 292 can be made of economical spur gears.

Figure 13:
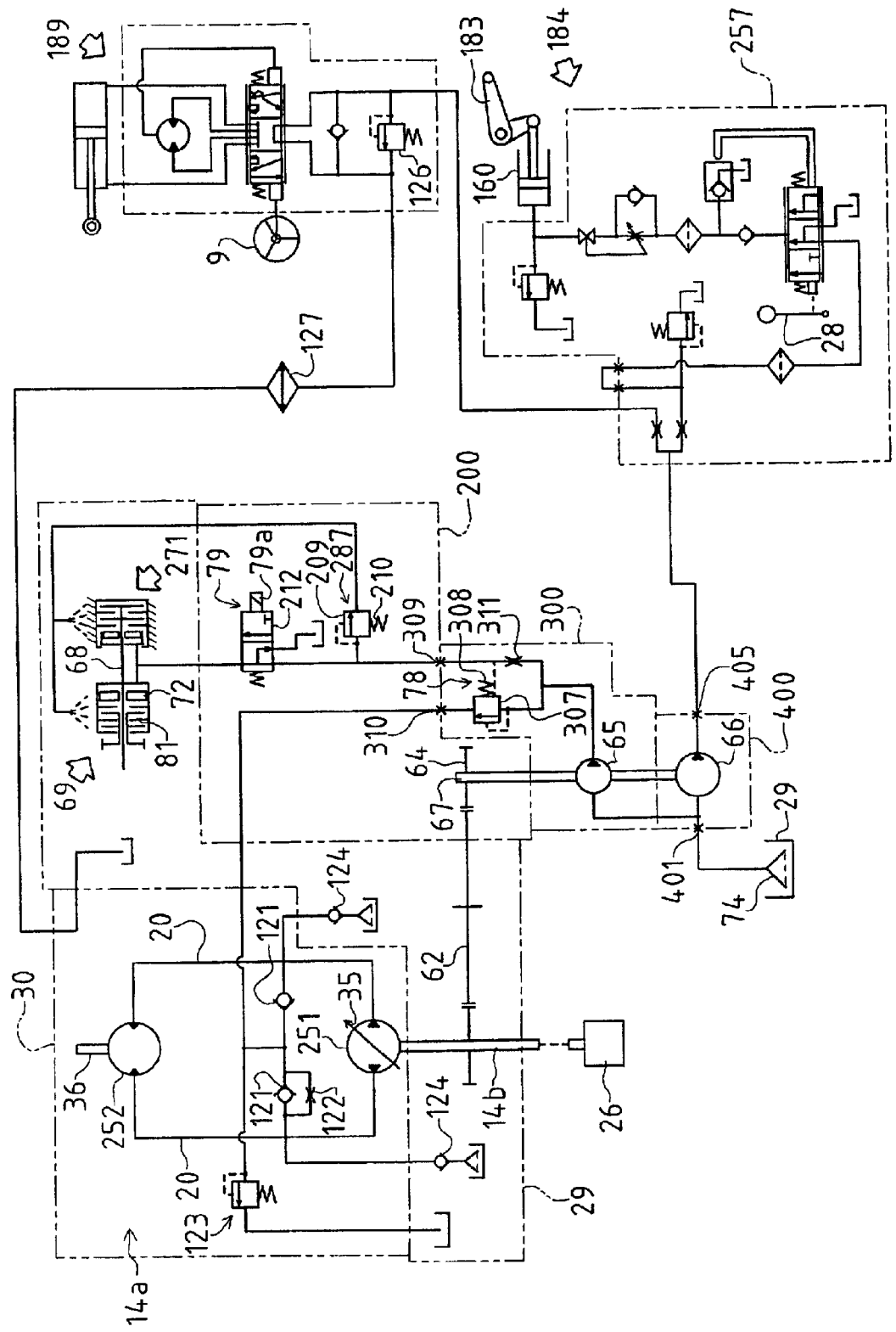
FIG. 13 illustrates a hydraulic circuit of the tractor.

Instead of the above-mentioned mechanical linkage, the steering system of tractor 1 may comprise a hydraulic power steering device 189 as shown in FIG. 13. The next description about transmission 14 is predicated upon use of hydraulic power steering device 189.

Figure 10:
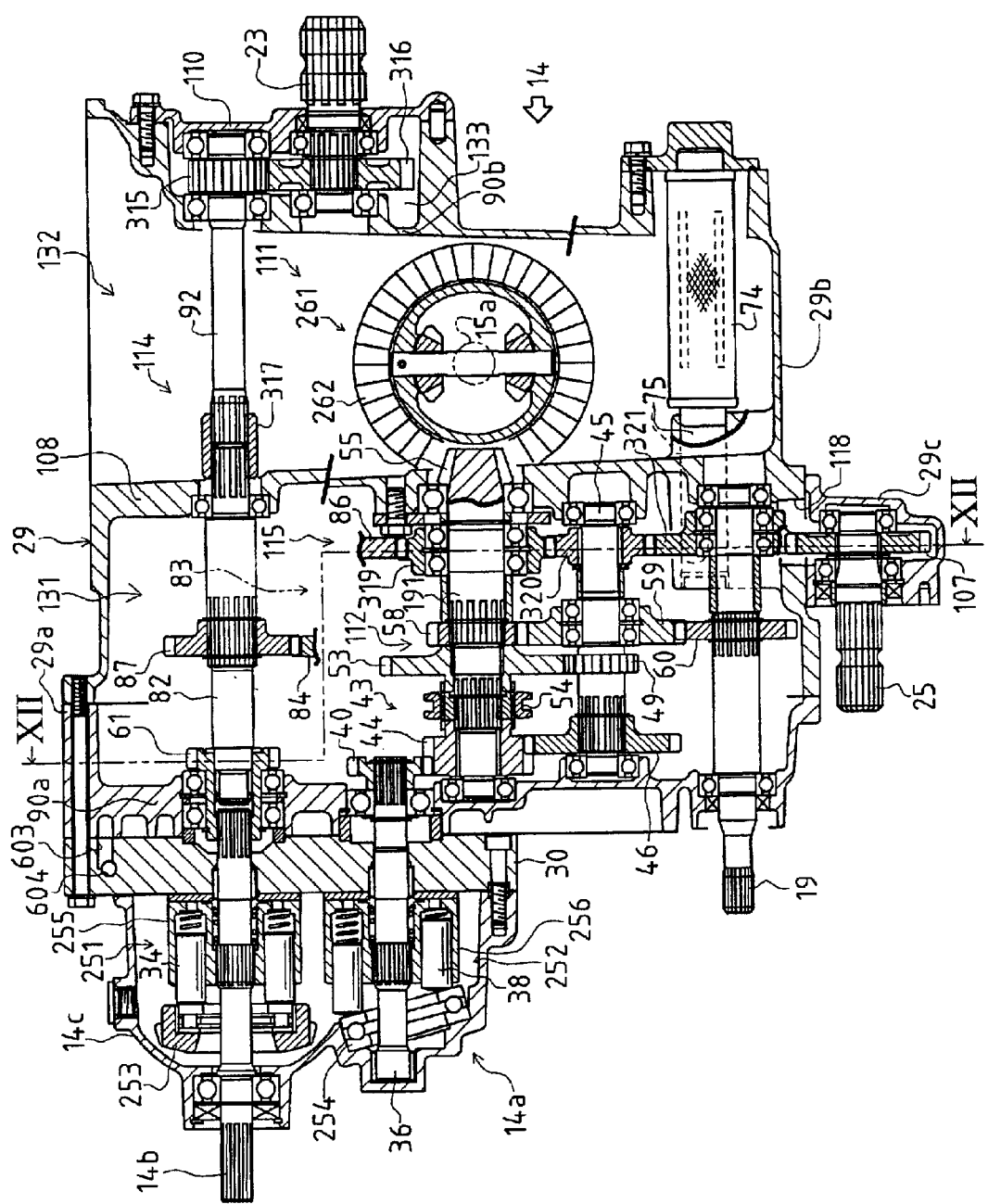
FIG. 10 is a developed sectional side view of the transmission.
Figure 11:
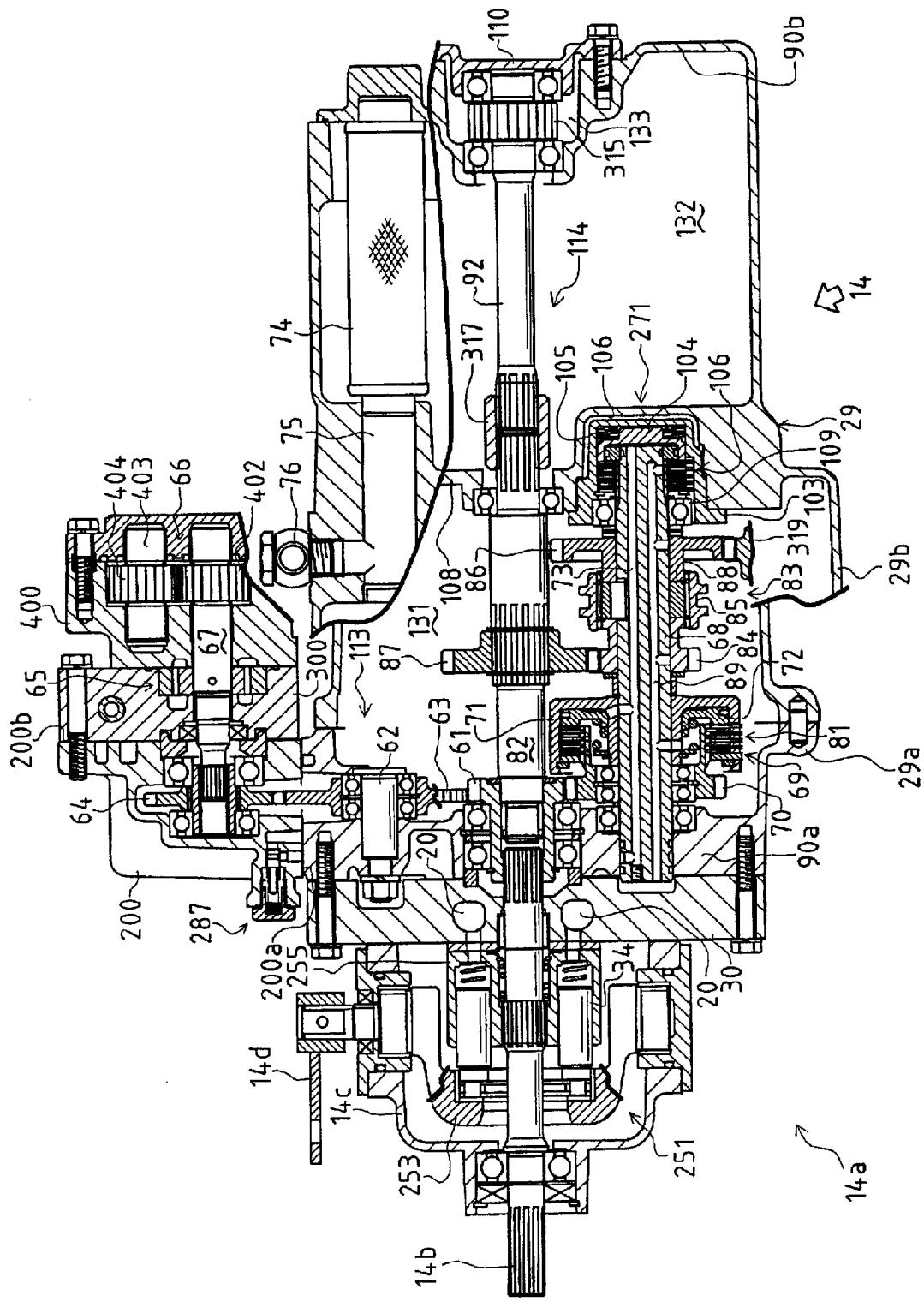
FIG. 11 is a developed sectional plan view of the same transmission.

Transmission 14 of tractor 1 will be described. As shown in FIGS. 10 and 11, transmission housing 29 of transmission 14 comprises a front casing part 29*a* and a rear casing part 29*b* joined with each other. HST housing 14*c* is fixed to the front surface of (front casing part 29*a* of) transmission housing 29 so that HST 14*a* serving as the main speed-changing mechanism is constructed in HST housing 14*c* and the front surface portion of transmission housing 29. Input shaft 14*b* of HST 14*a* projects forward from HST housing 14*c*. HST housing 14*c* overhangs front-PTO shaft 19 projecting forward from the front surface portion of (front part 29*a* of) transmission housing 29. The rear end portion of (rear casing part 29*b*) of transmission housing 29 supports rear-PTO shaft 23. Bottom cover 29*c* attached to the bottom surface of front casing part 29*a* of transmission housing 29 supports mid-PTO shaft 25 projecting forward.

As shown in FIGS. 10 and 11, front casing part 29*a* is formed at its front end with a front wall 90*a*, and is open at its rear end. Rear casing part 29*b* is formed at its rear end with a rear wall 90*b*, and is open at its front end. Rear casing part 29*b* is formed in its longitudinally intermediate portion with a partition wall 108. Behind partition wall 108, rear casing part 29*b* is upwardly open.

Figure 21:
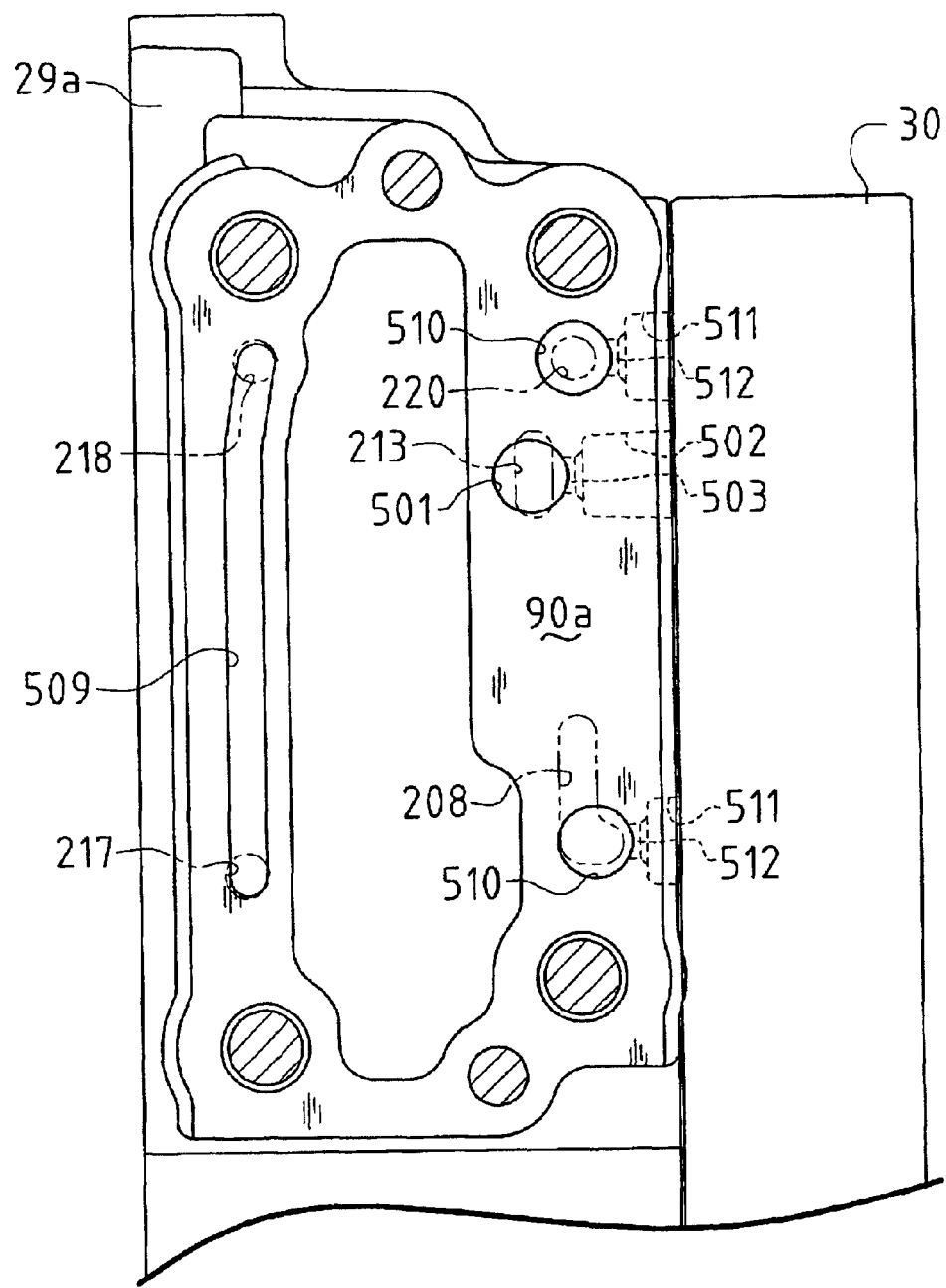
FIG. 21 is a cross sectional view taken along an arrow XXI—XXI of FIG. 16.

Front wall 90*a* is plate-like shaped and disposed laterally upright in perpendicular to the longitudinal direction of tractor 1. As shown in FIG. 21, the surrounding edge of front wall 90*a* is extended so as to be formed into top, bottom, left and right side walls of front casing part 29*a* of transmission housing 29.

The surrounding rear end edge of front casing part 29*a* is joined to the surrounding front edge of rear casing part 29*b* so as to form a first chamber 131 before partition wall 108, and a second chamber 132 behind partition wall 108. A rear cover 110 is attached to rear wall 90*b* of rear casing part 29*b* so as to form a third chamber 133 between rear wall 90*b* and rear cover 110.

As shown in FIGS. 10 and 11, in first chamber 131, a travel output shaft 191, a travel counter shaft 45, front-PTO shaft 19, a PTO main drive shaft 68 and a first rear-PTO transmission shaft 82 are longitudinally disposed in parallel between front wall 90*a* of front casing part 29*a* and partition wall 108 of rear casing part 29*b*.

As detailed later, a second rear-PTO transmission shaft 92 and rear-PTO shaft 23 are rotatably supported by rear wall 90*b* of rear casing part 29*b* and rear cover 110 so as to be disposed longitudinally in parallel.

Transmission housing 29 is filled therein with a certain amount of oil. This oil lubricates shafts and gears of the later-discussed drive train, and also serves as hydraulic oil for HST 14*a*.

Figure 23:
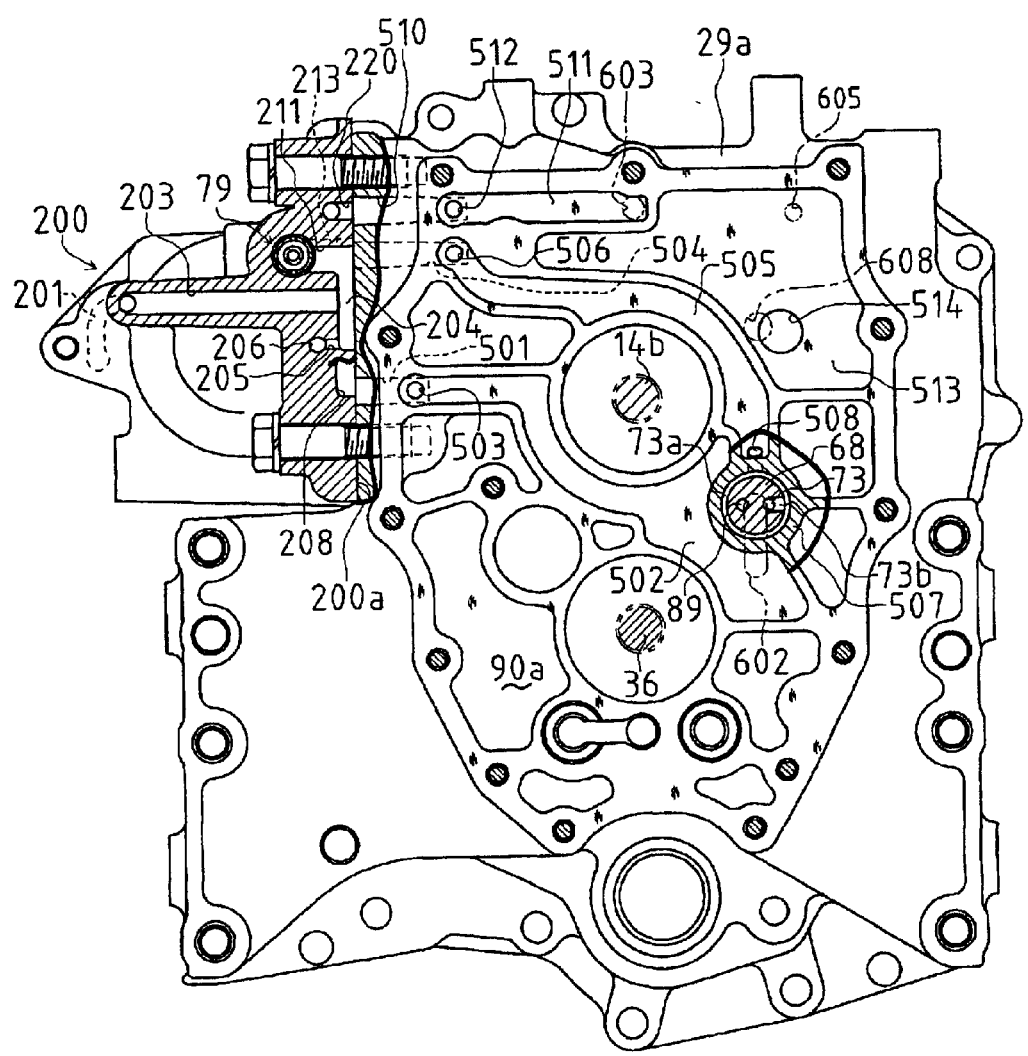
FIG. 23 is a front view of a front wall portion of the transmission housing with a cross sectional view taken along an arrow XXII—XXII of FIG. 16.

As shown in FIGS. 11 and 23, a pump-drive-gear casing 200 is attached to an upper left or right side outer surface of transmission housing 29. More specified, pump-drive-gear casing 200 is attached from outside to a left or right side edge portion of front wall 90*a* of transmission housing 29. A first pump casing 300 of a first auxiliary hydraulic pump 65 is attached to a rear surface of casing 200. A second pump casing 400 of a second auxiliary hydraulic pump 66 is attached to a rear surface of first pump casing 300.

As shown in FIG. 13, first auxiliary hydraulic pump 65 driven by a later-discussed pump drive train 113 pumps up the oil in transmission housing 29 so as to deliver it to a pair of hydraulic-oil-circulation holes 20 of HST 14*a*. First auxiliary hydraulic pump 65 also delivers the oil to a PTO clutch device 69 and an inertial-rotation-prevention brake device 271 so as to be used as lubrication and hydraulic oil for devices 69 and 271.

Furthermore, as shown in FIG. 13, second auxiliary hydraulic pump 66 pumps up the oil in transmission housing 29 and distributes it as hydraulic oil between hydraulic lift device 184 and hydraulic power steering device 189. Hydraulic lift device 184 vertically moves lift arms 183 according to the operation of a lift lever 28 provided on an optimal portion of tractor 1, thereby changing the height of the rear working attachment attached to the rear end of tractor 1. Hydraulic power steering device 189 is provided for reducing an operator's force required to operate steering wheel 9.

A travel power train in transmission 14 will be described in accordance with FIG. 10 and others. The travel power train comprises HST 14*a* as the main speed-change mechanism, sub speed-change mechanism 43, a rear wheel drive train 111 and a front wheel drive train 112. Sub speed-change mechanism 43 shifts the output power of HST 14*a*. Rear wheel drive train 111 transfers the output power of sub speed-change mechanism 43 to rear axles 16 through differential gear unit 261. Front wheel drive train 112 transfers the output power of sub speed-change mechanism 43 to front-PTO shaft 19.

HST 14*a* as the main speed-change mechanism will be described. A plate-like HST center section 30 is disposed upright at a substantially upper half front surface portion of transmission housing 29. An axial piston type hydraulic pump 251 is mounted onto a pump valve surface formed on the upper front surface of HST center section 30. An axial piston type hydraulic motor 252 is mounted onto a motor valve surface formed on the lower front surface of HST center section 30. Both hydraulic pump 251 and hydraulic motor 252 mounted onto HST center section 30 are housed in HST housing 14*c* attached to HST center section 30.

Referring to hydraulic pump 251, input shaft 14*b* also serving as a pump shaft is placed at a center of the pump valve surface of HST center section 30 and rotatably supported by HST center section 30. Input shaft 14*b* is locked together with a pump cylinder block 255 which rotates and slides along the pump valve surface. Input shaft 14*b* projects forward from HST housing 14*c* so as to be drivingly connected to flywheel 48 of engine 26 through transmission shaft 51 and so on.

A plurality of pistons 34 are reciprocally inserted through biasing springs into respective cylinder holes bored in pump cylinder block 255. Heads of pistons 34 abut against a movable swash plate 253. The slant angle of swash plate 253 is changed so as to change the stroke of pistons 34, thereby continuously varying the discharging capacity of hydraulic pump 251. Movable swash plate 253 is of a trunnion type. A trunnion shaft of movable swash plate 253 projects outward from HST housing 14*c* so as to be fixedly provided thereon with control arm 14*d*, as shown in FIGS. 8 and 11. Control arm 14*d* is interlockingly connected to speed-change lever 41 through a later-discussed linkage.

Figure 15:
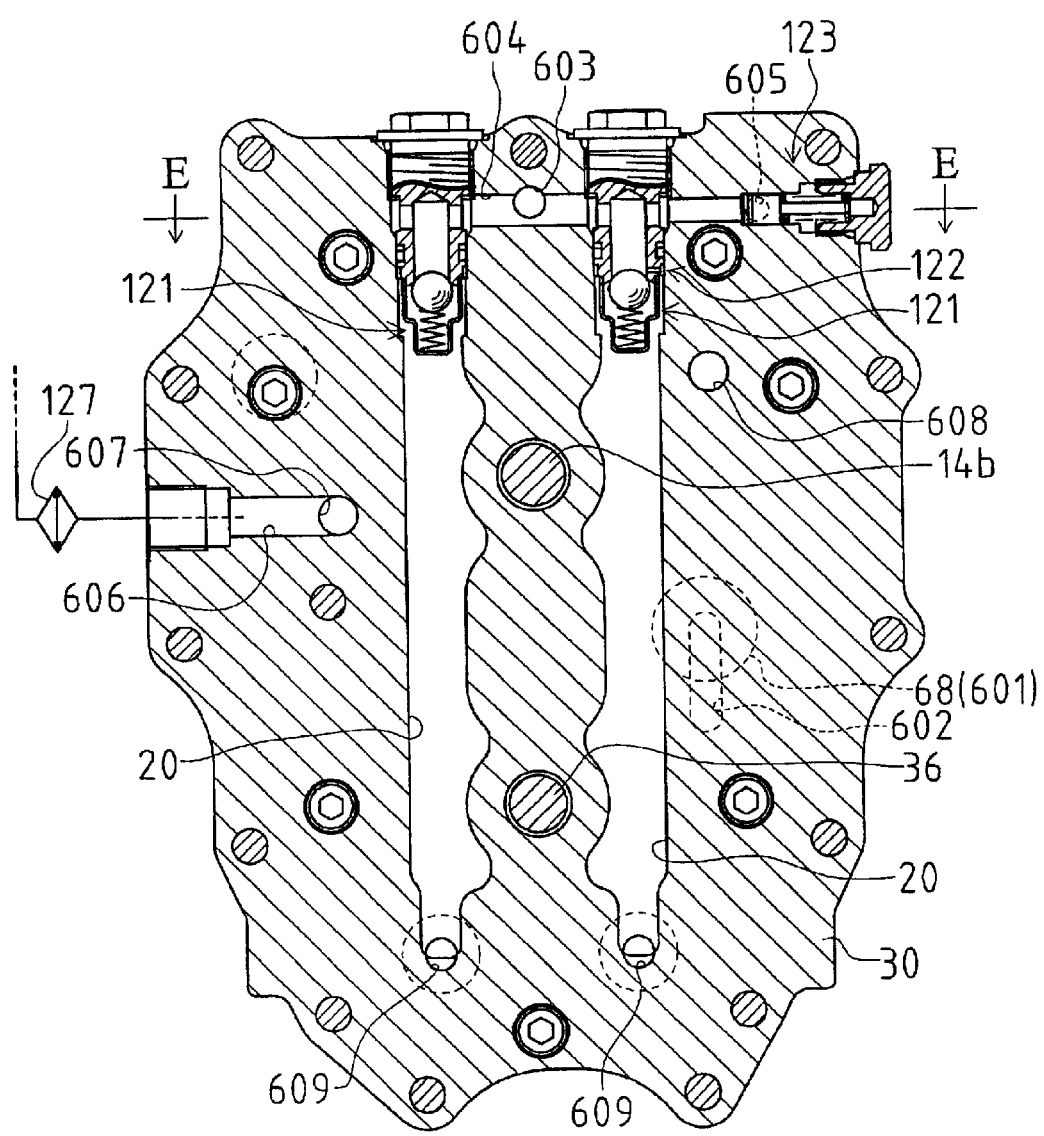
FIG. 15 is a sectional front view of an HST center section showing the hydraulic-oil-circulation holes therein.

As shown in FIGS. 11, 15 and so on, twin hydraulic-oil-circulation holes 20 are bored in HST center section 30 so as to circulate oil between hydraulic pump 251 and hydraulic motor 252.

Referring to hydraulic motor 252, a motor shaft 36 is disposed in parallel below input shaft 14*b* and at the center of the pump valve surface of HST center section 30. Motor shaft 36 is rotatably supported by HST center section 30 and locked together with motor cylinder block 256. A plurality of pistons 38 are reciprocally inserted through biasing springs into respective cylinder holes bored in motor cylinder block 256. Heads of pistons 38 abut against a fixed swash plate 254. Therefore, motor shaft 36 is rotated at a speed corresponding to the discharging capacity of hydraulic pump 251.

As shown in FIG. 10, motor shaft 36 penetrates HST center section 30 and extends into rear casing part 29a so as to be fixedly provided on its rear end with an HST output gear 40.

Sub speed-change mechanism 43 will be described in accordance with FIG. 10. Sub speed-change mechanism 43 is a constantly meshing speed-change gear arrangement having two speed stages. A first clutch gear 44 is relatively rotatably provided on travel output shaft 191 so as to mesh with both HST output gear 40 fixed on motor shaft 36 and a first counter gear 46 fixed on travel counter shaft 45.

Travel counter shaft 45 is notched on its periphery so as to form a second counter gear 49 having teeth which are fewer than those of first counter gear 46. Second counter gear 49 meshes with a second clutch gear 53 relatively rotatably provided on travel output shaft 191. Therefore, first and second clutch gears 44 and 53 always interlock with each other through first and second counter gears 46 and 49 and travel counter shaft 45.

A clutch slider 54 is not-relatively rotatably and provided to axially slide through a clutch hub on travel output shaft 191 between first clutch gear 44 and second clutch gear 53. Clutch slider 54 interlocks with sub speed-change lever 24 (shown in FIG. 1) through an adequate linkage.

Both first and second clutch gears 44 and 53 have teeth allowed to mesh with clutch slider 54. By operating sub speed-change lever 24, clutch slider 54 slides along travel output shaft 191 so as to selectively engage with one of first and second clutch gears 44 and 53 or disengage from both gears 44 and 53. When clutch slider 54 meshes with first clutch gear 44, travel output shaft 191 is rotated at a high speed stage together with first clutch gear 44 meshing with HST output gear 40 while second clutch gear 53 interlocking with first clutch gear 44 freely rotates around travel output shaft 191. When clutch slider 54 meshes with second clutch gear 53, the reduced rotation of second clutch gear 53 following first clutch gear 44 freely rotating around travel output shaft 191 is transferred to travel output shaft 191, thereby rotating travel output shaft 191 at a low speed stage. Clutch slider 54 is allowed to disengage from both clutch gears 44 and 53 so as to isolate sub speed-change mechanism 43 from the output power of HST 14c.

The output power of travel output shaft 191 is transferred to rear wheels 5 through rear wheel drive train 111 comprising differential gear unit 261 and rear axles 16. A bevel pinion 55 is formed on a rear end portion of travel output shaft 191 so as to mesh with an input bevel gear 262 of differential gear unit 261. Differential gear unit 261 distributes the torque from travel output shaft 191 between left and right differential output shafts 15a. Rear axles 16 engaging with respective differential output shafts 15a through gears are differentially rotated, thereby driving rear wheels 5. A front wheel drive train 112 and a mid-PTO drive train 115 are allowed to be located between bevel pinion 55 and second clutch gear 53.

Front wheel drive train 112 transfers the rotation of travel output shaft 191 to front wheels 4. Front wheel drive train 112 comprises a front wheel drive gear 53, an intermediate gear 59 and above-mentioned front wheel transmission gear 60. Front wheel drive gear 53 is fixed on an axially middle portion of travel output shaft 191 (between sub speed-change mechanism 43 and differential gear unit 26) adjoining a later-discussed PTO drive switching mechanism 83.

Front wheel drive gear 58 is disposed oppositely to clutch slider 54 with respect to second clutch gear 53. Intermediate gear 59 is freely rotatably disposed around travel counter shaft 45 so as to mesh with front wheel drive gear 58. Intermediate gear 59 also meshes with front wheel transmission gear 60 fixed on front PTO shaft 19 projecting forward from the lower portion of front wall 90a of transmission housing 29.

Pump drive train 113 for driving first and second auxiliary hydraulic pumps 65 and 66 will be described. In transmission housing 29, a distributing drive gear 61 is fixed on the rear end of input shaft 14b penetrating HST center section 30. A counter shaft 62 is disposed adjacent to distributing drive gear 61 so as to overhang from front wall 90a of front casing part 29a. A counter gear 63 is rotatably provided on counter shaft 62 and meshes with distributing drive gear 61.

Pump-drive-gear casing 200 is formed with a vertical fixture surface 200a and a vertical pump-mount surface 200b disposed perpendicularly to fixture surface 200a. Pump-drive-gear casing 200 is fixed to transmission housing 29 by fixing fixture surface 200a thereof to front casing part 29a. First and second pump casings 300 and 400 in tandem overhang from pump-mount surface 200b of pump-drive-gear casing 200. First auxiliary hydraulic pump 65 is disposed in first pump casing 300, and second auxiliary hydraulic pump 66 disposed in a second pump casing 400.

As shown in FIG. 11, first and second auxiliary hydraulic pumps 65 and 66 are provided with a common pump shaft 67 penetrating both pump casings 300 and 400 and inserted into pump-drive-gear casing 200. In pump-drive-gear casing 200, a pump shaft gear 64 is fixed on pump shaft 67. Also, front casing part 29a and fixture surface 200a abutting against each other are partly opened so that a part of counter gear 63 in front casing part 29a protrudes into pump-drive-gear casing 200 so as to mesh with pump shaft gear 64. Therefore, both first and second auxiliary hydraulic pumps 65 and 66 are driven by the rotational power of input shaft 14b so as to charge oil to hydraulic power steering device 189 and hydraulic lift device 184.

Figure 12:
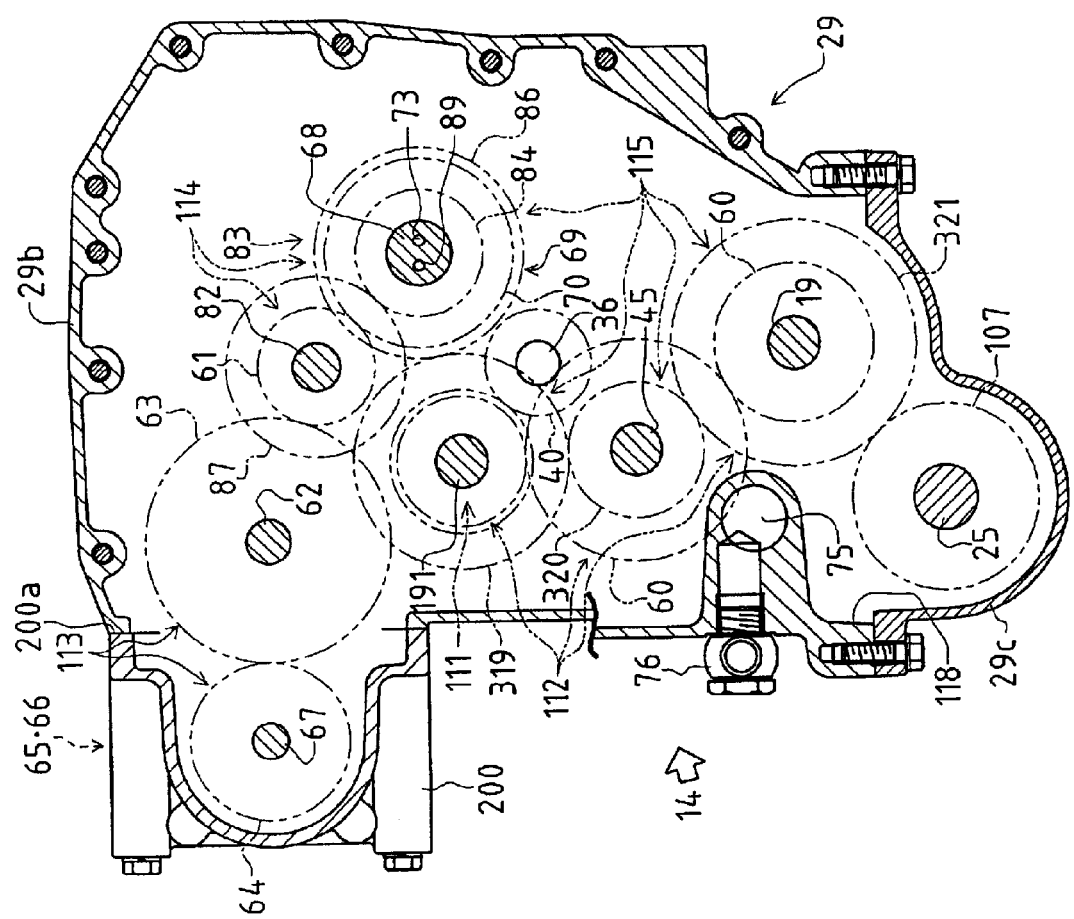
FIG. 12 is a cross sectional view taken along an arrow XII—XII of FIG. 10.

Drive trains for driving rear-PTO shaft 23 and mid-PTO shaft 25 will be described. As shown in FIGS. 11 and 12, PTO main drive shaft 68 is disposed approximately oppositely to counter gear 63 with respect to distributing drive gear 61. As shown in FIG. 11, PTO drive main shaft 68 is disposed in parallel to travel output shaft 191 disposed coaxially with input shaft 14b. PTO clutch device 69 of a hydraulic multi-disc type is provided around a forward portion of PTO main drive shaft 68. Inertial-rotation-prevention brake device 271 is provided on a rearward portion of PTO main drive shaft 68. Such a distributive arrangement of PTO clutch device 69 and inertial-rotation-prevention brake device 271 on common PTO drive main shaft 68 contributes for minimization of the PTO drive train.

PTO clutch device 69 will be described. A PTO input gear 70 is relatively rotatably disposed on PTO drive main shaft 68 so as to mesh with distributing drive gear 61. A PTO clutch housing 71 is fixed on PTO drive main shaft 68 behind PTO input gear 70. PTO clutch housing 71 is provided therein with a ring-shaped recess, in which a piston 72 is disposed so as to reciprocate along PTO drive main shaft 68 by hydraulic pressure. In the ring-shaped recess of PTO clutch housing 71 is disposed a cylindrically shaped rear portion of PTO input gear 70. A multi friction disc 81 is interposed between an outer peripheral surface of the rear portion of PTO input gear 70 and an inner peripheral surface of PTO clutch housing 71.

PTO drive main shaft 68 is bored in the axial direction thereof with a hydraulic oil passage hole 73, through which pressure oil flows so as to reciprocate piston 72 for engagement and disengagement of multi friction disc 81 between PTO input gear 70 and PTO clutch housing 71.

Figure 14:
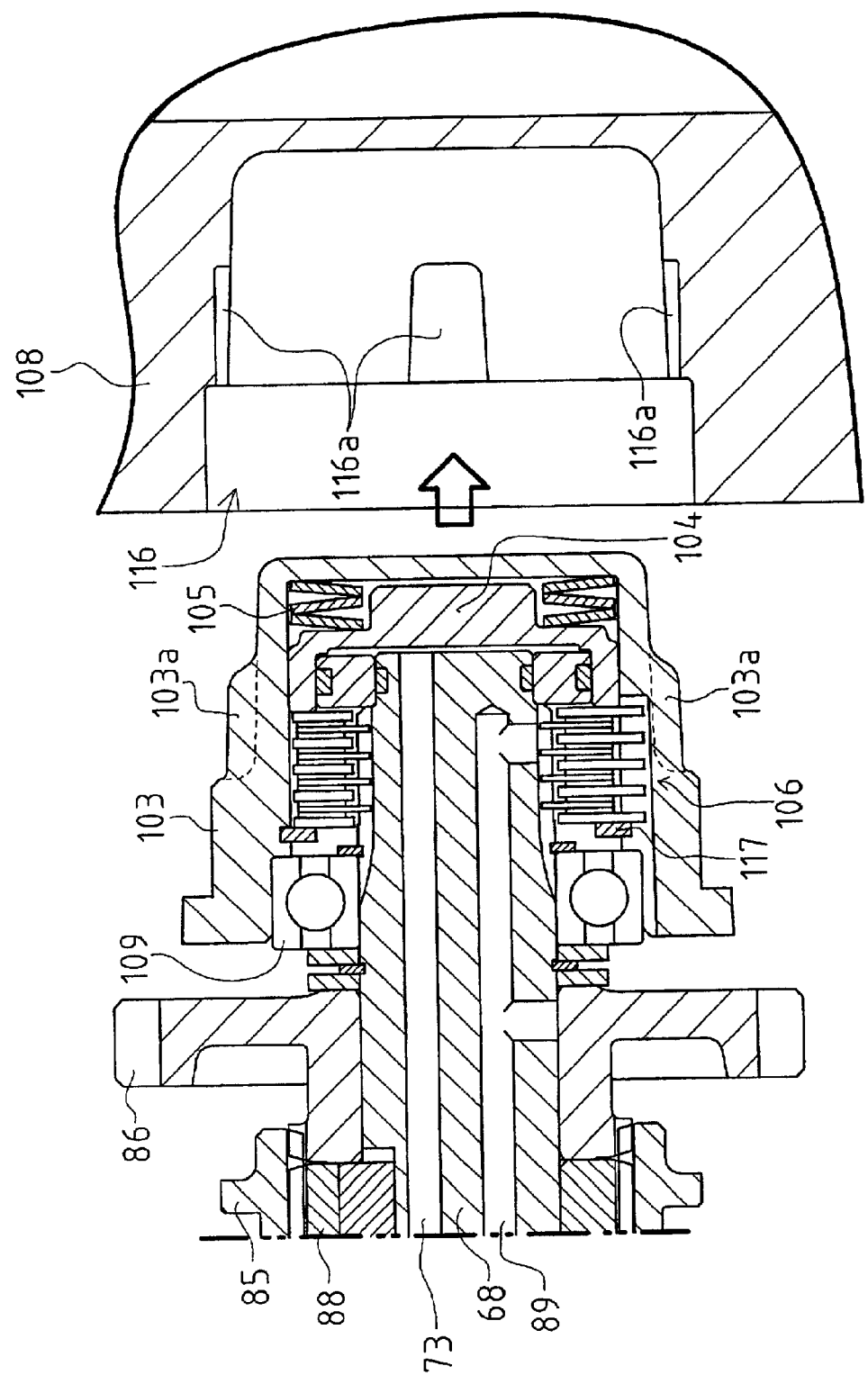
FIG. 14 is a sectional side view of a brake housing while being inserted into a recess in a partition wall in the transmission.

Inertial-rotation-prevention brake 271 will be described. FIGS. 11 and 14, a rear end portion of PTO main drive shaft 68 is inserted into a laid cup-like shaped brake housing 103 and rotatably supported therein through a bearing 109. As shown in FIG. 14, brake housing 103, while being provided on PTO main drive shaft 68, is simply inserted without bolts into a recess 116 formed in partition wall 108 facing first chamber 131.

Specifically, one or more key portions 103a are integrally formed on an outer peripheral surface of brake housing 103. In partition wall 108, recess 116 is deformed so as to provide slots 116a corresponding to respective key portions 103a. By inserting brake housing 103 into recess 116, key portions 103a are engaged into respective slots 116a so as to fix brake housing 103 to partition wall 108 without bolts.

As shown in FIG. 14, in brake housing 103, a piston 104 is oil-tightly disposed between the rear end of PTO main drive shaft 68 and brake housing 103. Also, a multi friction disc 106 is interposed between brake housing 103 and PTO main drive shaft 68. A retaining ring 117 is fixed to brake housing 103 so as to restrict sliding of multi friction disc 106. By pressing piston 104 against multi friction disc 106, multi friction disc 106 engages so as to brake PTO main drive shaft 68.

In brake housing 103, coned disc springs 105 are interposed between brake housing 103 and piston 104. Hydraulic oil passage hole 73 is open at the rear end surface of PTO main drive shaft 68.

When hydraulic pressure oil is charged into hydraulic oil passage hole 73, the oil flows out from the rear opening of passage hole 73 and is filled between piston 104 and PTO main drive shaft 68 in brake housing 103 so as to move piston 104 backward against coned disc springs 105, thereby disengaging multi friction disc 106 so as to allow PTO main drive shaft 68 to rotate in relative to brake housing 103. When the hydraulic pressure oil is drained from hydraulic oil passage hole 73, piston 104 is pushed forward by biasing force of coned disc springs 105 so as to engage multi friction disc 106, thereby braking PTO main drive shaft 68.

Thus, PTO clutch device 69 and inertial-rotation-prevention brake device 271 are operationally linked with each other. When PTO clutch device 69 is engaged, inertial-rotation-prevention brake device 271 is put in a brake-releasing condition. When PTO clutch device 69 is disengaged, inertial-rotation-prevention brake device 271 is put in a braking condition. In other words, inertial-rotation-prevention brake device 271 brakes both rear-PTO shaft 23 and mid-PTO shaft 25 as soon as either PTO shaft 23 or 25 is unclutched. Since both devices 69 and 271 are disposed adjacent to each other on the common shaft (PTO main drive shaft 68), the effect of simplifying the hydraulic linkage of devices 271 and 69 can be obtained as well as the above-mentioned minimization of transmission 14.

As shown in FIG. 11, PTO drive switching device 83 is constructed on PTO main drive shaft 68 between PTO clutch device 69 and inertial-rotation-prevention brake device 271. PTO drive switching device 83 comprises a rear-PTO clutch gear 84, mid-PTO clutch gear 86, a splined hub 88 and a clutch slider 85. Both gears 84 and 86 are relatively rotatably provided on PTO main drive shaft 68. Splined hub 88 is fixed through a key onto a portion of PTO main drive shaft 68 between both gears 84 and 86. Clutch slider 85 is provided around splined hub 88 not-relatively rotatably but axially slidable. Clutch slider 85 is interlockingly connected with an unshown PTO switching lever disposed at an optimal position in the vicinity of seat 7 of tractor 1.

Both PTO drive gears 84 and 86 have teeth allowed to mesh with clutch slider 85. Clutch slider 85 is slid along PTO main drive shaft 68 so as to mesh with one or both of gears 84 and 86. The rotation of PTO main drive shaft 68 is transferred to one or both of gears 84 and 86 meshing with clutch slider 85. On PTO main drive shaft 68, PTO drive switching device 83 is disposed just behind PTO clutch device 69, thereby compacting the PTO drive train to rear-PTO shaft 23 and mid-PTO shaft 25.

A rear-PTO drive train 114 from PTO main drive shaft 68 to rear-PTO shaft 23 will be described in accordance with FIGS. 10, 11 and others. Behind input shaft 14b of HST 14a is disposed first rear-PTO transmission shaft 82 coaxially with input shaft 14b. A front end of first rear-PTO transmission shaft 82 is relatively rotatably supported in distributing drive gear 61 through a needle bearing.

A rear-PTO transmission gear 87 is fixed on first rear-PTO transmission shaft 82 so as to mesh with rear-PTO clutch gear 84. In second chamber 132, a second rear-PTO transmission shaft 92 is disposed coaxially with first rear-PTO transmission shaft 82. A rear end of first rear-PTO transmission shaft 82 and a front end of second rear-PTO transmission shaft 92 are inserted into a coupling 317 so as to be integrated with each other. A rear end of second rear-PTO transmission shaft 92 is extended backward into third chamber 133 behind second chamber 132 so as to be drivingly connected to rear-PTO shaft 23 through gears 315 and 316.

A mid-PTO drive train 115 from PTO main drive shaft 68 to mid-PTO shaft 25 will be described. As shown in FIG. 10, on travel output shaft 191 in first chamber 131, a first mid-PTO drive gear 319 is relatively rotatably disposed adjacent to PTO drive switching device 83 and between sub speed-change mechanism 43 and differential gear unit 261. First mid-PTO drive gear 319 meshes with a second mid-PTO drive gear 320 rotatably provided on travel counter shaft 45. Second mid-PTO drive gear 320 meshes with a third mid-PTO drive gear 321 rotatably provided on front PTO shaft 19.

As shown in FIG. 12, rear casing part 29b is provided at its bottom surface with an opening 118, which is covered with cover 29c detachably attached to the bottom surface of rear casing part 29b. Front and rear walls of cover 29c rotatably support mid-PTO shaft 25. In cover 29c, a mid-PTO shaft gear 107 is fixed on mid-PTO shaft 25. A part of third mid-PTO drive gear 321 protrudes into cover 29c through opening 118 and meshes with mid-PTO shaft gear 107.

If mid-PTO shaft 25 is unnecessary, cover 29c, mid-PTO clutch gear 86, first, second and third mid-PTO drive gears 319, 320 and 321 and PTO switching device 83 may be removed. In this case, rear-PTO clutch gear 84 may be fixedly provided on PTO main drive shaft 68, and opening 118 may be plugged by a lid attached to the bottom surface of rear casing part 29b.

As shown in FIG. 10, three mid-PTO drive gears 319, 320 and 321 of mid-PTO drive train 115 are provided on respective shafts 191, 45 and 19, which support gears 58, 59 and 60 for driving front wheels 4, respectively. For example, both first mid-PTO drive gear 319 and front wheel drive gear 58 are disposed before and behind on front output shaft 191. Thus, mid-PTO drive train 115 and front wheel drive train 112 are juxtaposed in a space between sub speed-change mechanism 43 and differential gear unit 261.

In this space, the flow of power in mid-PTO drive train 115 from gear 319 to gear 321 through gear 320 is parallel to that in front wheel drive train 112 from gear 58 to gear 60 through gear 59. Therefore, the component parts of both drive trains 115 and 112 can be arranged together with differential gear unit 261, sub speed-change mechanism 43 and PTO clutch device 69 in the restricted space, thereby contributing for minimization of transmission 14.

Furthermore, first mid-PTO drive gear 319 constituting mid-PTO drive train 115 and front wheel drive gear 58 constituting front wheel drive train 112 are supported on travel output shaft 191 on which sub speed-change mechanism 43 is also provided, thereby also contributing for minimization of transmission 14.

Description will be given of the structure of feeding oil to PTO clutch device 69, brake device 271, HST 14a and so on in accordance with FIGS. 15 to 25 and others.

As shown in FIGS. 10 and 11, a strainer 74 is disposed in a bottom space of second chamber 132 in transmission housing 29. Oil filtrated by strainer 74 flows in an oil passage 75 bored in a thick side wall of rear casing part 29b. Then, the oil flows into an external conduit (not shown) from a pipe joint 76 attached to the outer side wall of rear casing part 29b so as to be led into a suction port 401 (shown in FIG. 17) shared between two auxiliary hydraulic pumps 65 and 66. Suction port 401 is formed in second pump casing 400 of second auxiliary pump 66 located at one side of transmission housing 29.

Figure 16:
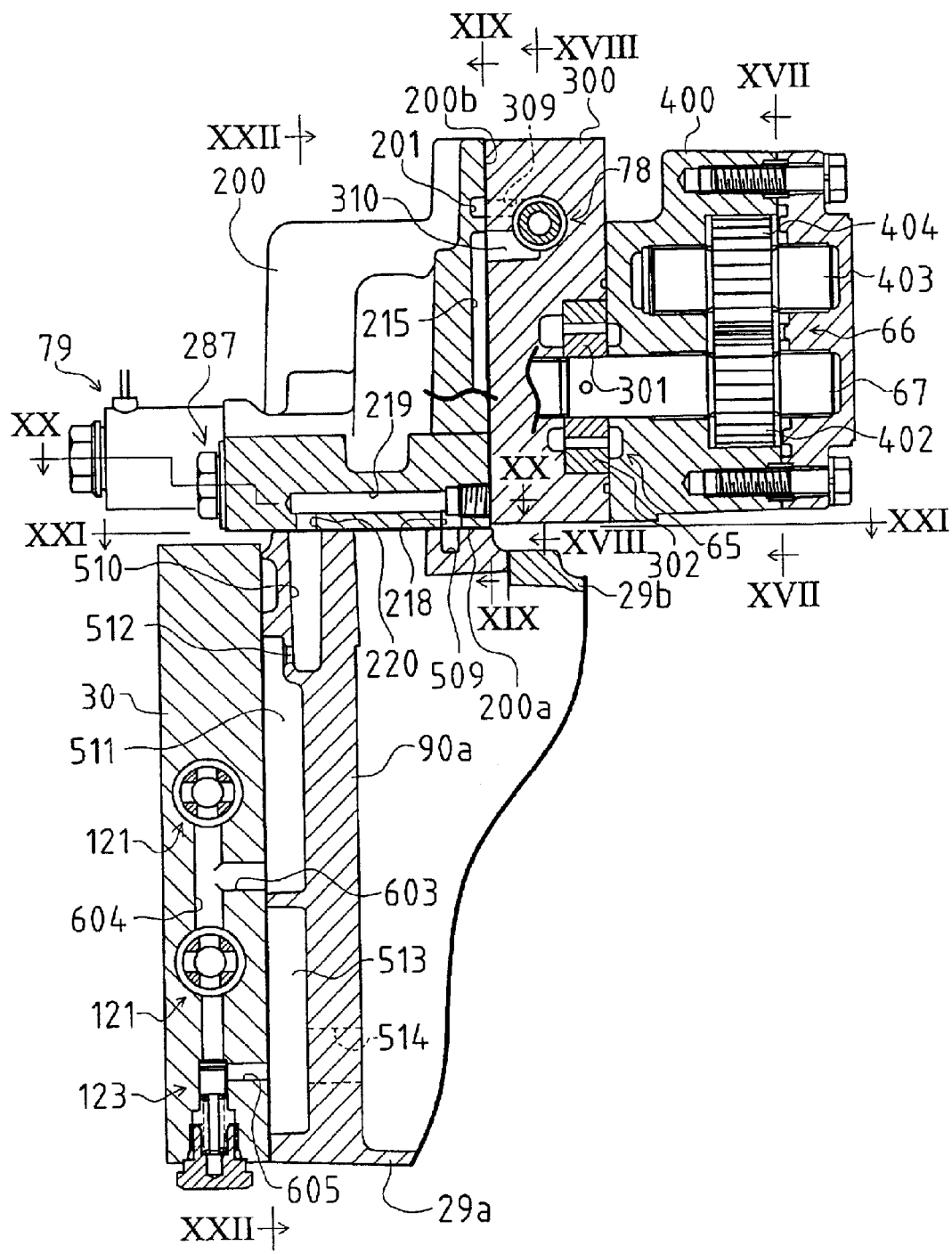
FIG. 16 is a sectional plan view of auxiliary hydraulic pumps attached to a transmission housing with a cross sectional view taken along an arrow XVI—XVI of FIG. 15.
Figure 17:
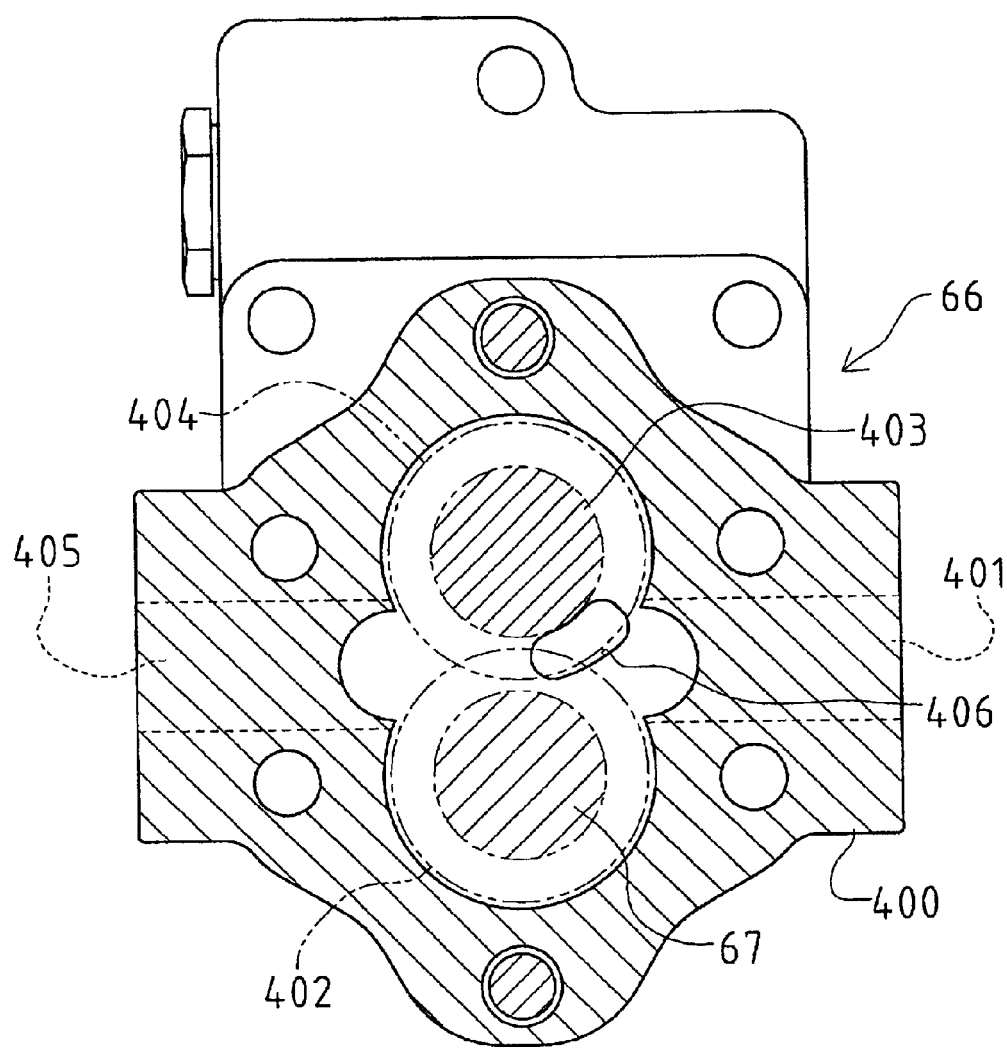
FIG. 17 is a cross sectional view taken along an arrow XVII—XVII of FIG. 16.

As shown in FIGS. 16 and 17, second auxiliary pump 66 is an external gear pump comprising a drive gear 402 and a driven gear 404. Drive gear 402 is formed around pump shaft 67. Driven gear 404 is supported by shaft 403 so as to mesh with drive gear 402.

By driving pump shaft 67, both gears 402 and 403 are rotated while holding the oil from suction port 401 among their teeth, thereby sending the oil to a discharging port 405 formed in second pump casing 400 oppositely to suction port 401. The oil from discharging port 405 is led into hydraulic lift device 184 and hydraulic power steering device 189, as shown in FIG. 13.

A suction hole 406 is bored in a second pump casing 400 for second auxiliary hydraulic pump 66. One end of suction hole 406 is disposed toward suction port 401 facing gears 402 and 403 in second auxiliary hydraulic pump 66. The other end of suction hole 406 faces a fixture surface (a front surface) of second pump casing 400 to be attached to first pump casing 300 for first auxiliary hydraulic pump 65.

As shown FIG. 16, first pump casing 300 is provided at its rear surface with a recess, in which an inner rotor 301 and an outer rotor 302 are contained so as to constitute a trochoid pump. Inner rotor 301 is fixed to pump shaft 67. Suction hole 406 is connected to a suction port of first auxiliary hydraulic pump 65.

Figure 18:
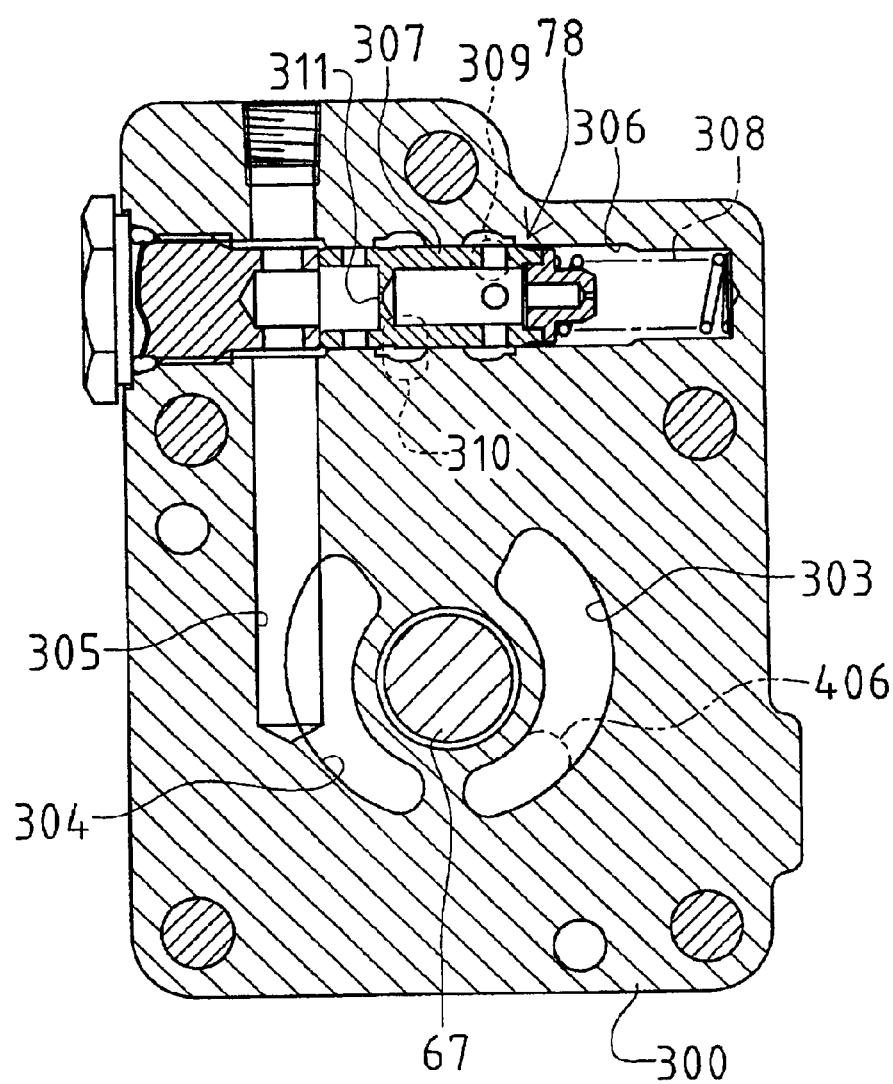
FIG. 18 is a cross sectional view taken along an arrow XVIII—XVIII of FIG. 16.

As shown in FIG. 18, first pump casing 300 is formed therein with a suction groove 303 and a discharge groove 304 for first auxiliary hydraulic pump 66. By driving pump shaft 67, rotors 301 and 302 are rotated so as to send oil from suction groove 303 to discharge groove 304.

In first pump casing 300 are formed an oil hole 305 communicating with discharge groove 304 and a valve chamber hole 306 perpendicularly crossing oil hole 305. A valve spool having an orifice 311 is disposed through a biasing spring 308 in valve chamber hole 306, thereby constituting a flow divider 78. Flow divider 78 is provided with a regulation flow port 309 for sending oil to PTO clutch device 69. Flow divider 78 is also provided with an overflow port 310 for sending oil to a charge oil port of HST 14a.

Figure 19:
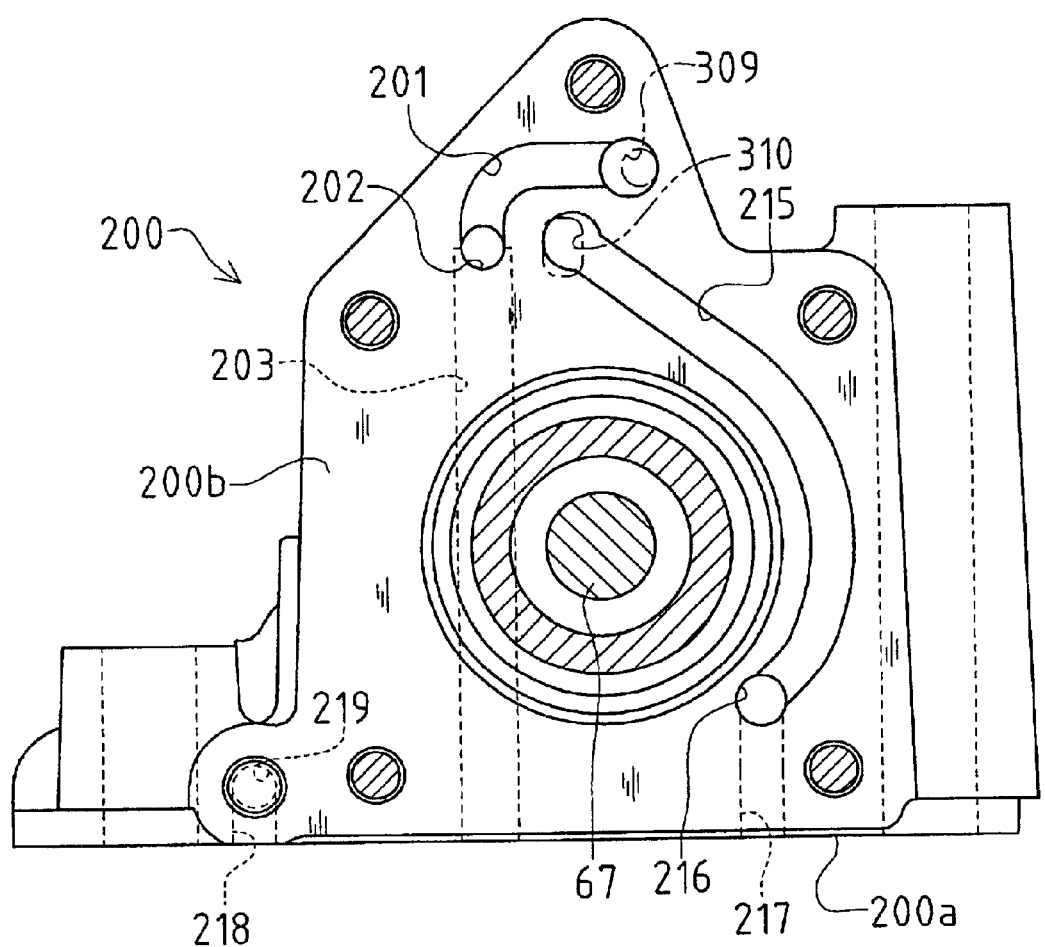
FIG. 19 is a cross sectional view taken along an arrow XIX—XIX of FIG. 16.
Figure 22:
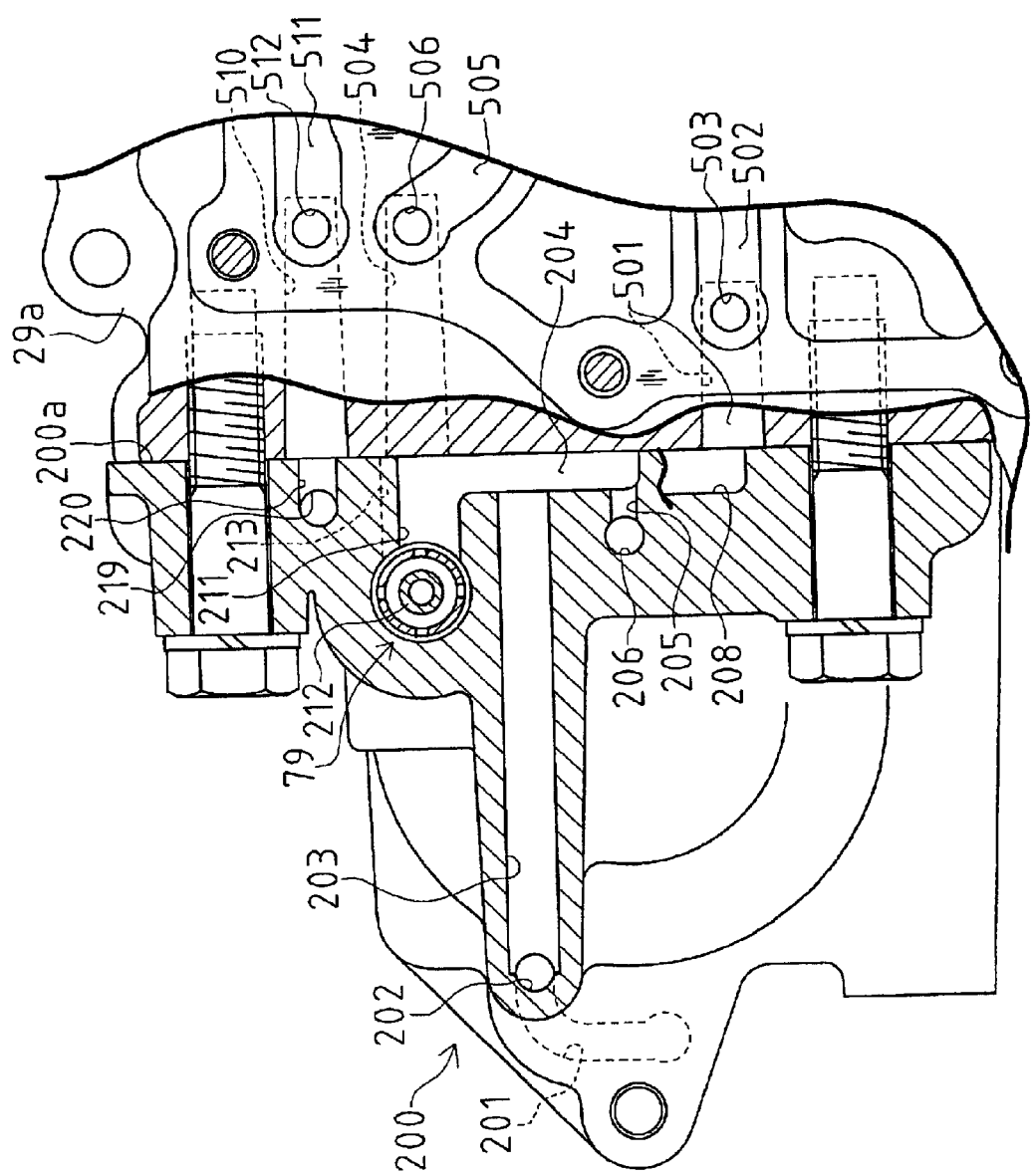
FIG. 22 is a cross sectional view taken along an arrow XXII—XXII of FIG. 16.
Figure 24:
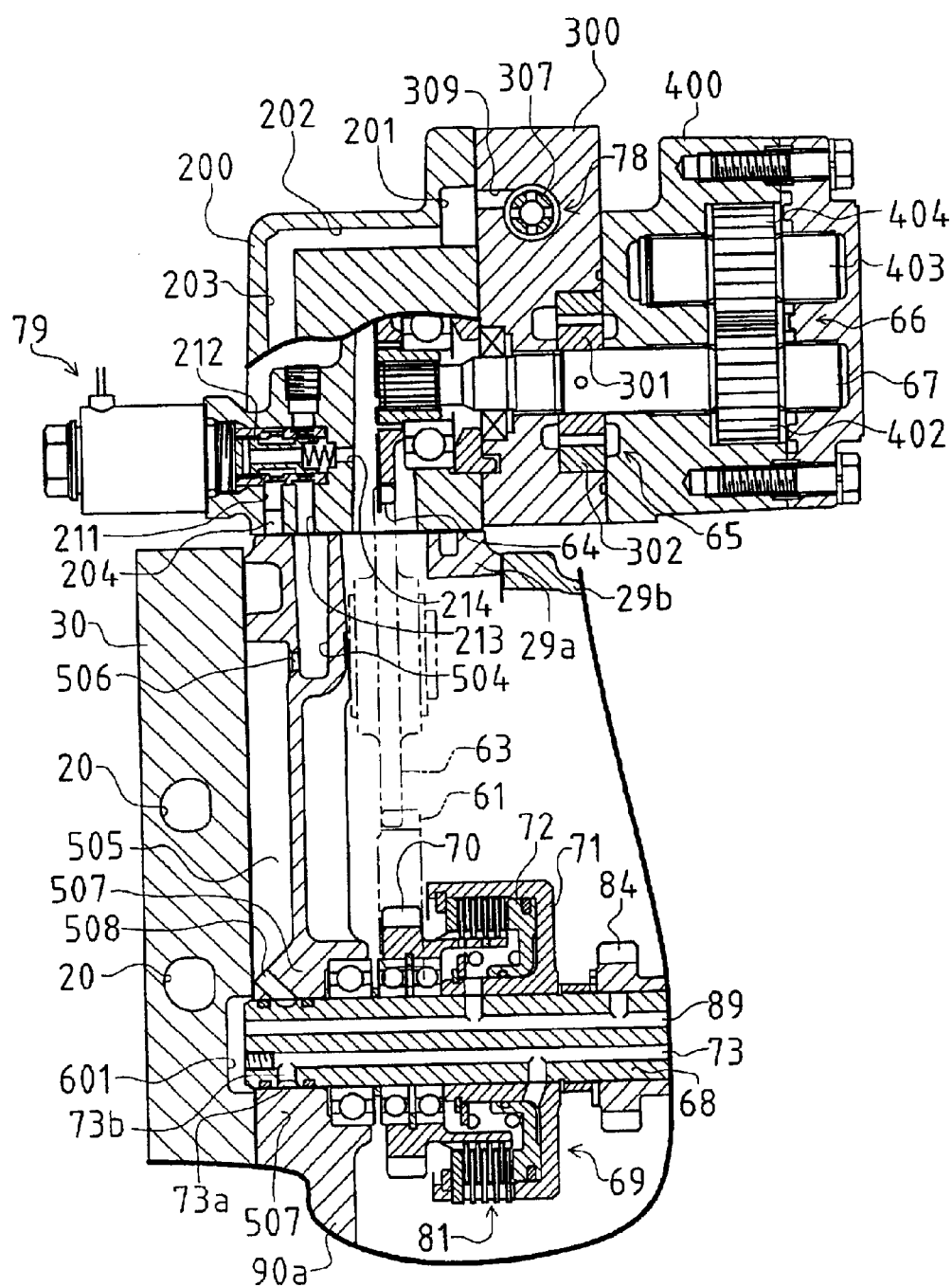
FIG. 24 is a sectional plan view of a gear casing for driving the auxiliary hydraulic pumps and a part of the transmission housing, showing a PTO switching valve unit pro vided in the gear casing.

As shown in FIGS. 16 and 19, pump-mount surface 200b (the rear surface) of pump-drive-gear casing 200 is formed with an L-like shaped groove 201 when viewed in rear. In first pump casing 300, regulation flow port 309 is extended to be open at the front surface of first pump casing 300 so as to be joined to one end of L-like shaped groove 201 between pump-mount surface 200b and the front surface of first pump casing 300 jointed with each other. As shown in FIGS. 19, 22 and 24, pump-drive-gear casing 200 is bored therein with an oil hole 202 extended in perpendicular to pump-mount surface 200b. Oil hole 202 is opened at pump-mount surface 200b so as to be joined to the other end of L-like shaped groove 201. Pump-drive-gear casing 200 is also bored therein with an oil hole 203, which perpendicularly crosses oil hole 202 in a thick wall portion of pump-drive-gear casing 200 and is opened at fixture surface 200a (the side surface) of pump-drive-gear casing 200.

Figure 20:
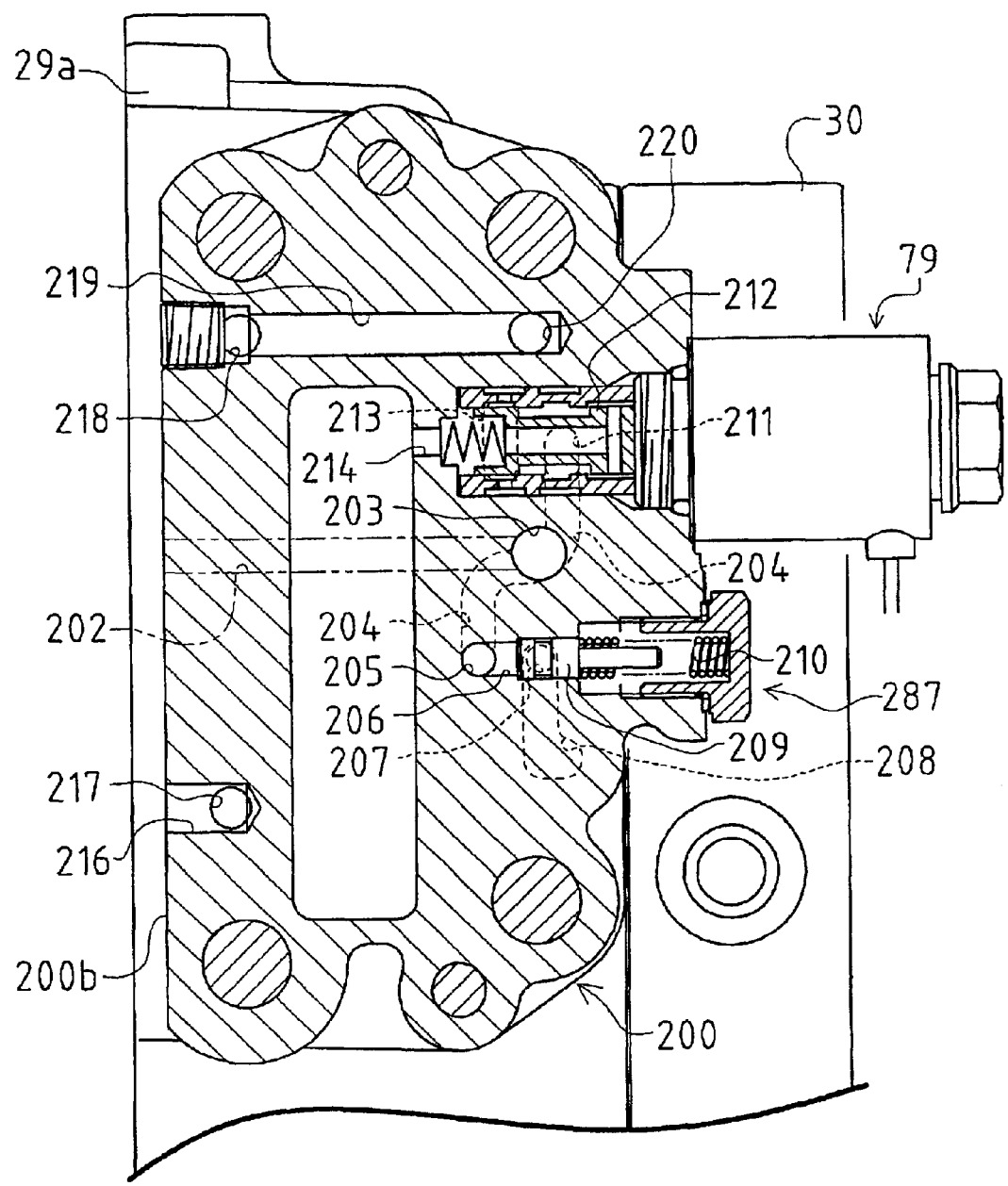
FIG. 20 is a cross sectional view taken along an arrow XX—XX of FIG. 16.
Figure 25:
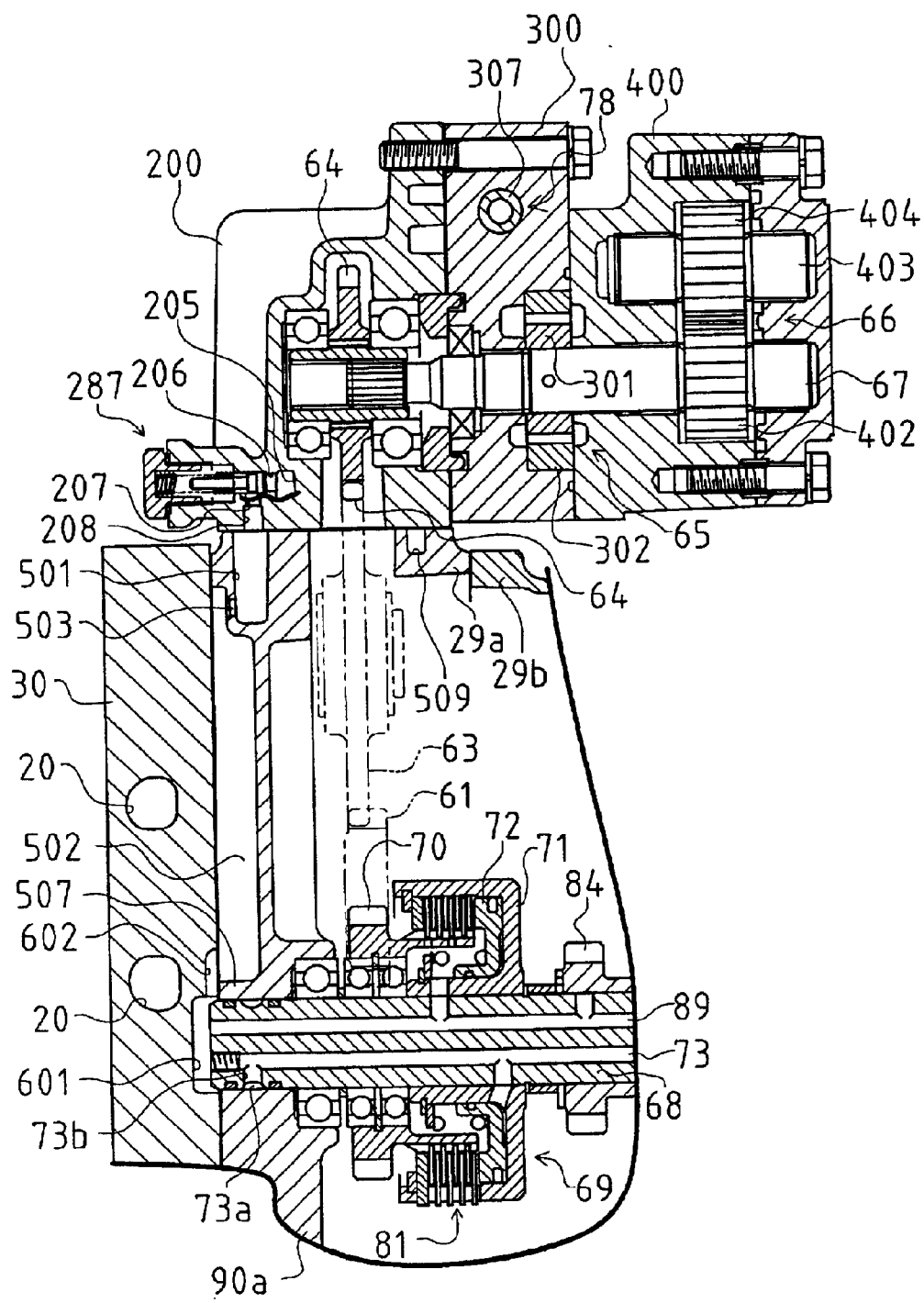
FIG. 25 is a sectional plan view of the gear casing for driving the auxiliary hydraulic pumps and the part of the transmission housing, showing a relief valve provided in the gear casing.

As shown in FIG. 20, the open end of oil hole 203 is open at an intermediate portion of a crank-shaped groove 204, when viewed inside, formed in fixture surface 200a. As shown in FIGS. 20 and 22, pump-drive-gear casing 200 is bored therein with an oil hole 205 extended from one end crank-like groove 204 in perpendicular to fixture surface 200a. Furthermore, in pump-drive-gear casing 200 are bored a relief hole 206 perpendicularly crossing oil hole 205 and a drain hole 207 extended from an intermediate portion of relief hole 206, as shown in FIGS. 20 and 25. Drain hole 207 is extended to be open at one end of an L-like shaped drain groove 208 formed in fixture surface 200a.

A relief valve 287 is interposed between relief hole 206 and drain hole 207 so as to limit the pressure of hydraulic oil for PTO clutch device 69 and inertial-rotation-prevention brake device 271. Relief valve 287 is a normal relief valve comprising a spool 209 and a spring 210 biasing spool 209. When the hydraulic pressure in relief hole 206 is less than a predetermined value, spool 209 closes drain hole 207 by the force of spring 210. When the hydraulic pressure in relief hole 206 is not less than the predetermined value, spool 209 is displaced against the force of spring 210 so as to open relief hole 206 to drain hole 207, thereby draining oil.

As shown in FIGS. 21, 22 and 25, correspondingly to one end of drain groove 208 of pump-drive-gear casing 200, an oil hole 501 is bored in front wall 90a of transmission housing 29 from the side surface of front wall 90a to be fixed to pump-drive-gear casing 200. Lubrication-oil-feeding groove 502 is formed in the front surface of front wall 90a of transmission housing 29. Furthermore, front wall 90a is bored therein with a connection hole 503 interposed between oil hole 501 and one end of lubrication-oil-feeding groove 502.

As shown in FIG. 23, lubrication-oil-feeding groove 502 is curved around below HST input shaft 14b and extended downwardly slantwise so as to lead the drained oil from pump-drive-gear casing 200 into the vicinity of the front end portion of PTO main drive shaft 68.

A cylindrical boss portion 507 is formed on front wall 90a of transmission housing 29. The forward portion of PTO main drive shaft 68 is oil-tightly inserted into boss portion 507 so that front wall 90a supports PTO main drive shaft 68. As shown in FIGS. 15 and 25, the rear surface of HST center section 30 of HST 14a to be attached to the front surface of front wall 90a is recessed by a recess 601 into which the front end of PTO main drive shaft 68 is inserted. FIGS. 23, 25 and so on, the back surface of HST center section 30 is recessed by a connection groove 602 over boss portion 507 so as to connect recess 601 to lubrication-oil-feeding groove 502. Accordingly, the oil drained from drain groove 208 flows to recess 601 through oil hole 501, connection hole 503, lubrication-oil-feeding groove 502 and connection groove 601.

PTO main drive shaft 68 is formed therein with a linear lubrication oil passage 89 in parallel to hydraulic oil passage hole 73. Lubrication oil passage hole 89 is open at the front-end surface of PTO main drive shaft 68. The oil led into recess 601 flows through lubrication oil passage hole 89 so as to lubricate and cool PTO clutch device 69, rear-PTO clutch gear 84, mid-PTO clutch gear 86 and inertial-rotation-prevention brake device 271.

As shown in FIGS. 20 and 22, in pump-drive-gear casing 200, an oil hole 211 is bored from the other end of crank-like groove 204 perpendicular to fixture surface 200a. Oil hole 211 is connected to an oil leading port to a PTO switching valve 79 which is a solenoid valve. PTO switching valve 79 is electrically connected to a PTO switch 150 provided on a top surface of dashboard 8 as shown in FIG. 1. Spool 212 is electro-magnetically displaced by switching PTO switch 150 on and off, thereby selectively making the hydraulic oil in crank-like groove 204 either flow to PTO clutch device 69 through a clutch feed port 213 or drain through a drain port 214.

In the case that transmission 14 is provided with a PTO drive train which is not only clutchable but also shiftable and a PTO shift lever is provided on an optimal portion of the vehicle, a switch replacing PTO switch 150 may be provided to interlock with the PTO shift lever so as to disengage PTO clutch device 69 when the PTO shift lever is located in neutral.

As shown in FIGS. 22 and 24, clutch feed port 213 is open at fixture surface 200a. As shown in FIGS. 21 and 22, an oil hole 504 is bored in front wall 90a from its side surface correspondingly to the open end of clutch feed port 213 at fixture surface 200a. A clutch-oil-feeding groove 505 is formed in the front surface of front wall 90a of transmission housing 29. In front wall 90a is bored a connection hole 506 interposed between one end of clutch-oil-feeding groove 505 and oil hole 504.

As shown in FIGS. 23 and 24, hydraulic oil passage hole 73 bored in PTO main drive shaft 68 is connected through an oil hole 73b to a ring-like groove 73a formed on the periphery of the forward portion of PTO main drive shaft 68. In front wall 90a, a connection hole 508 is bored from an end portion of clutch-oil-feeding groove 505. As shown in FIG. 24, connection hole 508 is bored through slantwise within boss portion 507 so as to fluidly communicate clutch-oil-feeding groove 505 to ring-like groove 73a around PTO main drive shaft 68.

Oil hole 504, clutch-oil-feeding groove 505, connection hole 506 and connection hole 508 formed in front wall 90a constitutes a part of an oil passage from PTO switching valve 79 to hydraulic oil passage hole 73.

In this construction, by setting PTO switch 150 at its PTO clutch-on position, PTO switching valve 79 delivers hydraulic oil to hydraulic oil passage hole 73 through clutch feed port 213, oil hole 504, connection hole 506, clutch-oil-feeding groove 505, connection hole 508 and ring-like shaped groove hole 73a. Therefore, piston 72 of PTO clutch device 69 presses multi friction disc 81, and simultaneously, piston 104 of brake device 271 loosens multi friction disc 106. Therefore, the PTO drive train is clutched and released from brake so as to allow the power from engine 26 to be transmitted to rear-PTO shaft 23 and/or mid-PTO shaft 25, thereby driving a working attachment (or working attachments).

Also, by setting PTO switch 150 at its PTO clutch-off position, PTO switching valve 79 drains hydraulic oil from hydraulic oil passage hole 73. Therefore, piston 72 of PTO clutch device 69 loosens multi friction disc 81, and piston 104 of brake device 271 presses multi friction disc 106 so as to unclutch and brake the PTO drive train. Thus, both rear-PTO shaft 23 and mid-PTO shaft 25 are isolated from the power of engine 26, and immediately braked to be safe from inertial rotation.

Description will be given of oil charging to hydraulic-oil-circulation holes 20 of HST 14a.

As shown in FIG. 19, pump-mount surface (back surface) 200b of pump-drive-gear casing 200 is formed with a J-like shaped groove 215 so as to circumvent pump shaft 67. Overflow port 310 of flow divider 78 is connected to one end of J-like groove 215. Pump-drive-gear casing 200 is bored therein with an oil hole 216 from the other end of J-like groove 215. Also, pump-drive-gear casing 200 is bored therein with a vertical oil hole 217 from fixture surface 200a so as to be connected to oil hole 217. Furthermore, pump-drive-gear casing 200 is bored therein with an oil hole 218 from fixture surface 200a so as to be parallel to oil hole 217, perpendicular to pump mount surface 200b and connected to oil hole 219.

As shown in FIG. 21, transmission housing 29 is formed at its side surface facing fixture surface 200a of pump-drive-gear casing 200 with an approximately vertically linear oil groove 509 interposed between open ends of oil holes 217 and 218.

As shown in FIG. 20, in pump-drive-gear casing 200, an oil hole 220 is bored from fixture surface 200a and perpendicularly to fixture surface 200a so as to be connected to an end of oil hole 219. On the other hand, as shown in FIG. 21, front wall 90a of transmission housing 29 is bored sidewise with an oil hole 510 corresponding to an open end of oil hole 220. Also, front wall 90a is formed at its front surface with a laterally horizontally extended charge-oil-feeding groove 511 so as to be connected at its one end to oil hole 510 through a connection hole 512 bored in front wall 90a.

As shown in FIG. 16, HST center section 30 attached to front wall 90a of transmission housing 29 is bored therein with a charge-oil-leading hole 603 in communication with charge-oil-feeding groove 511. As shown in FIG. 15, charge-oil-leading hole 603 is located between vertical hydraulic-oil-circulation holes 20 disposed left and right in parallel. HST center section 30 is laterally horizontally bored therein with a charge oil hole 604 so as to connect charge-oil-leading hole 603 to hydraulic-oil-circulation holes 20. A check valve 121 for prevention of back-flow is provided at the joint portion between charge oil hole 604 and each of hydraulic-oil-circulation holes 20. One of check valves 121 is provided with an orifice 122 so as to expand a neutral dead zone of HST 14a.

A relief valve 123 is disposed at the open end of charge oil hole 604 so as to determine a hydraulic charge pressure. When the hydraulic pressure of charged oil exceeds the determined charge pressure, relief valve 123 opens a drain port 605 so as to drain oil from a later-discussed drain chamber 513 through a later-discussed drain hole 514.

As shown in FIG. 15, a pair of backwardly open oil holes 609 are bored in HST center section 30 so as to be connected to respective bottom ends of hydraulic-oil-circulation holes 20. Each oil hole 609 communicates with a check valve 124 (shown in FIG. 13) and an oil filter (not shown) so as to supply oil into depressed one of hydraulic-oil-circulation holes 20.

HST center section 30 is bored therein with an oil leading hole 606 and a cooling oil leading hole 607. Oil leading hole 606 is bored from one side surface of HST center section 30 so as to be connected to cooling oil leading hole 607 which is open at the front surface of HST center section 30. Oil leading hole 606 is fed therein with oil released from relief valve 126 of power steering device 189 through an oil cooler 286. The oil in oil leading hole 606 is led into HST housing 14c so as to lubricate and cool cylinder blocks 255 and 256, pistons 34 and 38 and so on provided in HST housing 14c. Oil overflowing from housing 14c is led into drain chamber 513 formed in the front end portion of front wall 90a of transmission housing 29 through a return hole 608 penetrating HST center section 30. The oil in drain chamber 513 is returned to the oil sump in transmission housing 29 through drain oil hole 514.

Description will now be given of a structure of the travel control device comprising speed-change lever 41 and linkage 260 connecting speed-change lever 41 to control arm 14d of HST 14a.

As shown in FIG. 9 and others, speed-change lever 41 laterally projects through a slot 95 on one side surface of dashboard 8 so as to be longitudinally and vertically rotatably disposed beside dashboard 8.

Figure 26:
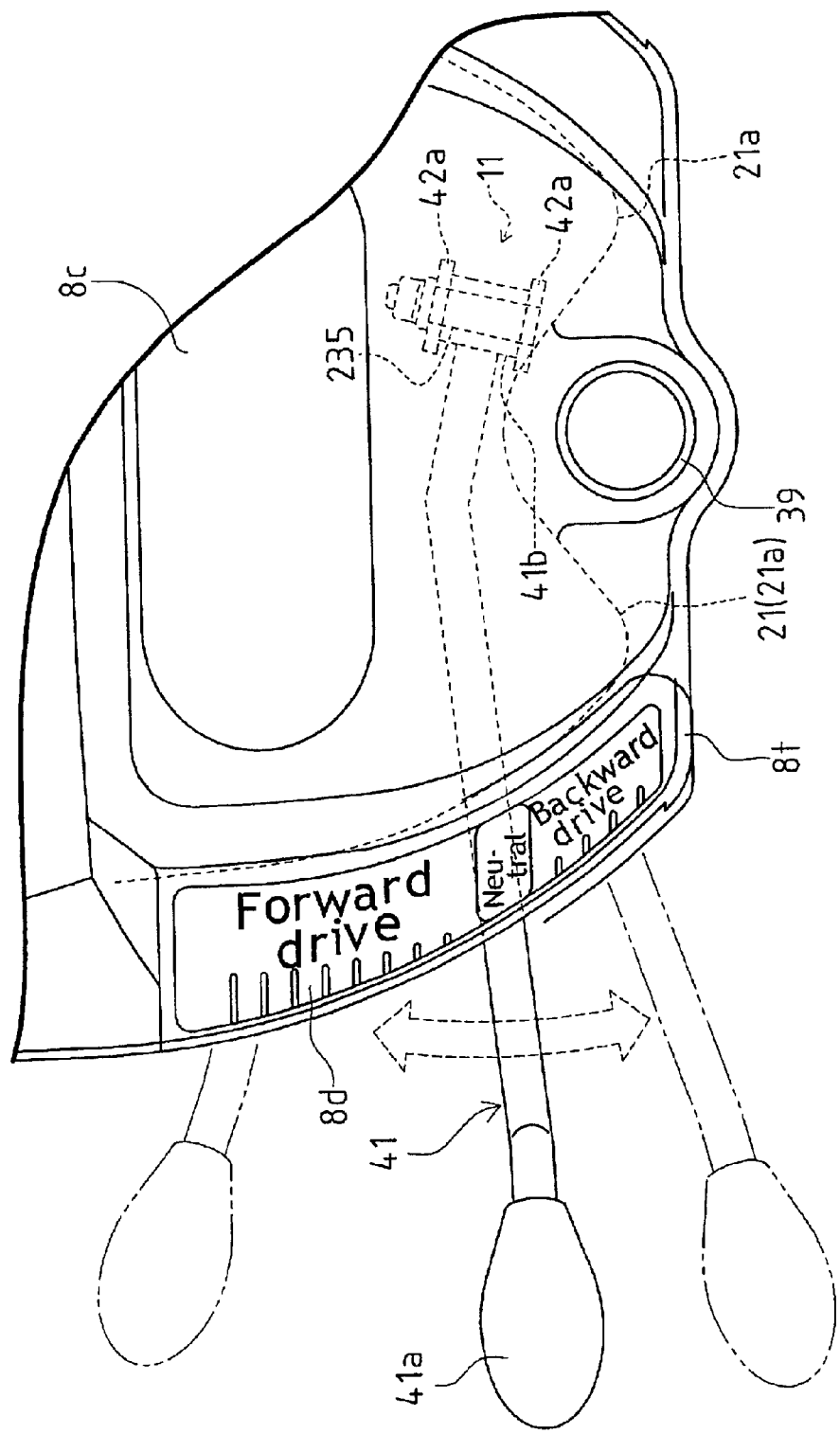
FIG. 26 is a fragmentary plan view of an instrument panel showing a speed-change lever and a speed-change operation shaft connected with each other.

Dashboard 8 comprises an upper part 8t and a lower part 8b joined with each other. As shown in FIG. 26, upper part 8t is provided at its center top surface with instrument panel 8c. A gauge plate 8d is attached on upper part 8t beside grip portion 41a of speed-change lever 41.

When viewed inside, upper and lower parts 8t and 8b are joined together through an approximately horizontal surface. Each of left and right side bottom edges of upper part 8t is partly cut away. Therefore, by joining upper and lower parts 8t and 8b, dashboard 8 is formed at its left and right surfaces with openings (slots) 95, respectively. Speed-change lever 41 projects from left slot 95, and a throttle lever (not shown) projects from right slot 95.

Left slot 95 for guiding speed-change lever 41 is cranked. A short vertical guide slot portion of left slot 95 corresponds to a neutral position of speed-change lever 41. A front guide slot portion 96 for forward driving is extended forward from a top end of the vertical guide slot portion. A rear guide slot portion 97 for backward driving is extended rearward from a lower portion of the vertical guide slot portion.

Due to the shape of left slot 95, for shifting speed-change lever 41 between the forward driving shift range and the backward driving shift range, speed-change lever 41 must be set in the neutral position once so as to be rotated vertically.

As shown in FIG. 2, fuel tank 21 is disposed in a narrow space longitudinally sandwiched between steering column 39 and engine 26. However, a back portion of fuel tank 21 is extended backward so as to be formed into left and right expanded portions 21a and laterally sandwich steering column 39. While a center portion of fuel tank 21 is longitudinally narrowed, fuel tank 21 is formed with expanded portions 21a so as to secure a required volume.

Left expanded portion 21a is formed at its upper surface with a recess 21b in the vicinity of a locus of rotated speed-change lever 41 so as to allow an intermediate portion of rotated speed-change lever 41 to pass through in recess 21b, thereby preventing left expanded portion 21a from hitting speed-change lever 41.

As shown in FIG. 9, speed-change lever 41 is adequately bent when viewed in rear. Therefore, grip portion 41a on the tip of speed-change lever 41 is located leftward below steering wheel 9 so as to be directed substantially in a lateral direction of tractor 1 (in this embodiment, leftward).

Due to this construction, tractor 1 can be controlled in its traveling direction and speed by an operator who walks beside tractor 1 while handling steering wheel 9 with his/her right hand and handling speed-change lever 41 with his/her left hand.

Referring to linkage 260 interposed between speed-change lever 41 and control arm 14d, as shown in FIG. 9, a stay 272 laterally projects from a lower portion of steering column 39. Stay 272 supports a vertical speed-change operation shaft 42 disposed beside steering column 39 so that speed-change operation shaft 42 is rotatable around its vertical axis. Speed-change operation shaft 42 is entirely disposed in dashboard 8 while a top portion of speed-change operation shaft 42 is located just below instrument panel 8c.

Base plate 245 interposed between bottom edges of left and right base frames 3 is provided at its top surface with a boss portion in which a bottom end of speed-change operation shaft 42 is supported. Accordingly, speed-change operation shaft 42 is disposed at one of left and right sides of steering column 39 in tractor 1 so as to be rotatable around its substantially vertical axis.

Alternatively, speed-change operation shaft 42 may comprise two or more shafts connected with one another through universal joints.

Figure 28:
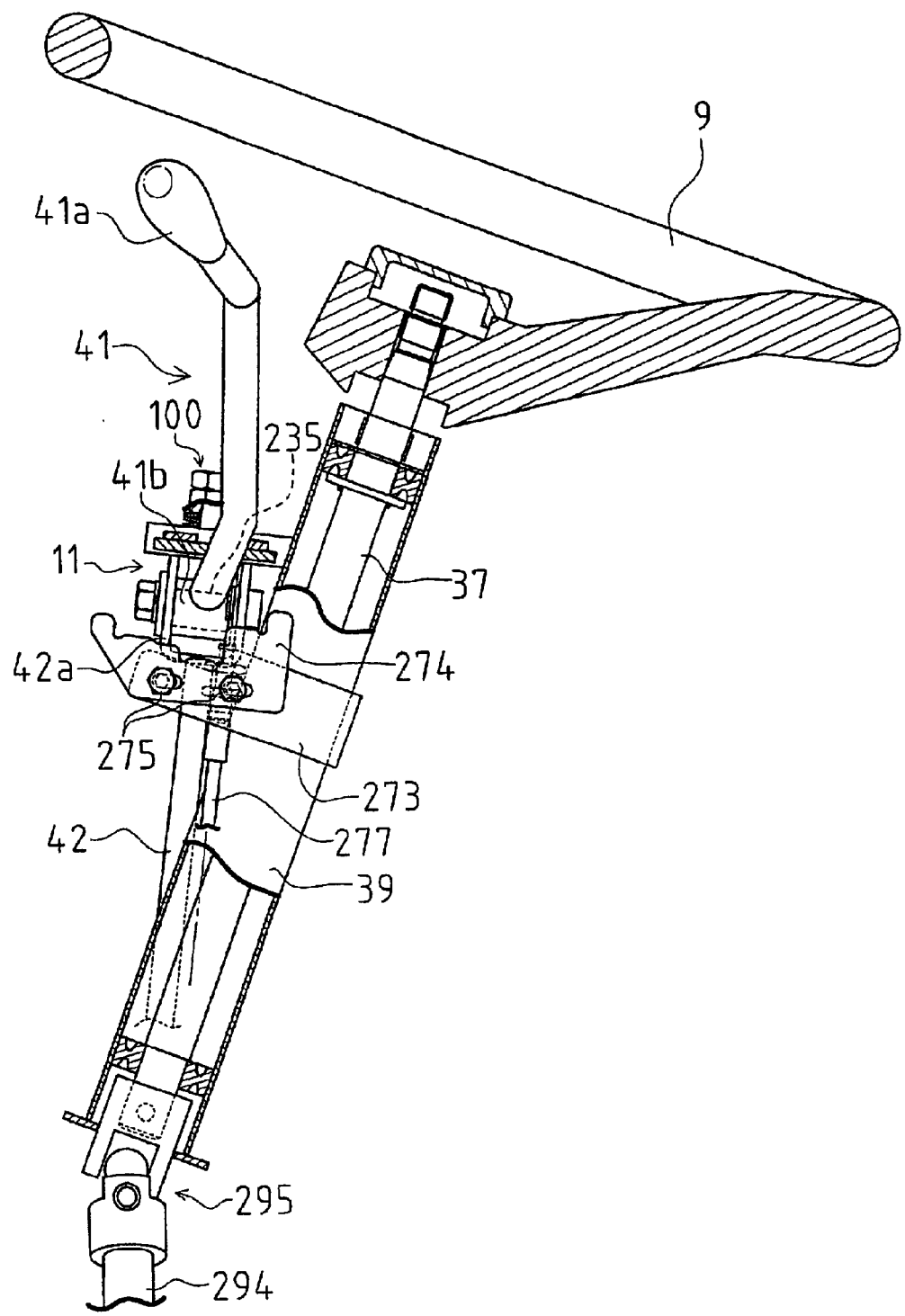
FIG. 28 is a fragmentary side view partly in section of a steering column and the speed-change operation shaft.
Figure 30:
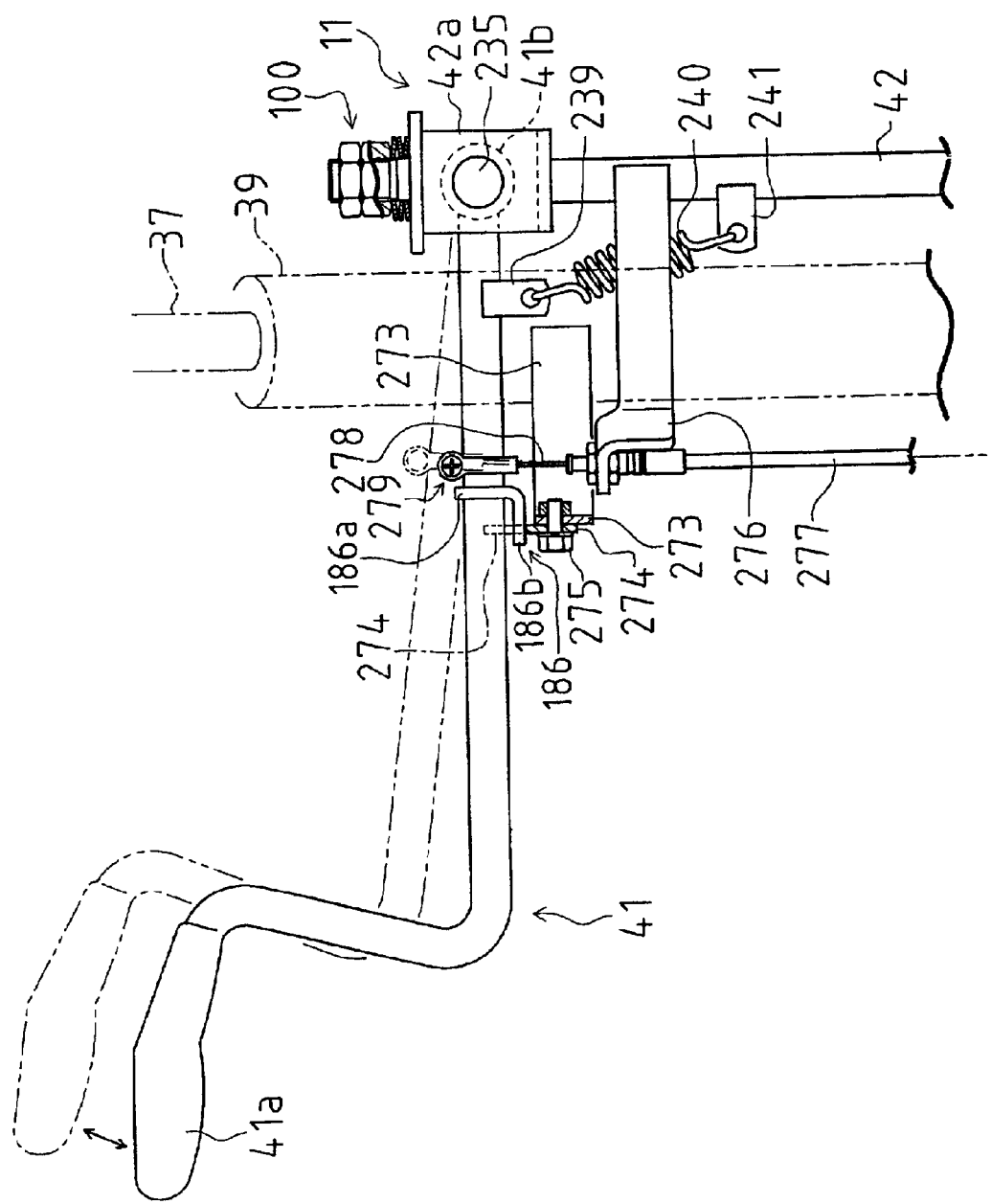
FIG. 30 is a rear view of the speed-change lever and the speed-change operation shaft.

As shown in FIGS. 9, 28 and 30, an upwardly U-like shaped tab 42a is fixed onto the top end of speed-change operation shaft 42. A support shaft 235 is disposed through tab 42a in perpendicular to speed-change operation shaft 42. Speed-change lever 41 is provided at its base end with a cylindrical portion, into which support shaft 235 is inserted. Such an arrangement of the top end of speed-change operation shaft 42, tab 42a, support shaft 235 and the cylindrical base end of speed-change lever 41 constitutes a flexible joint 11.

In this way, speed-change lever 41 is connected to the top end of speed-change operation shaft 42 while speed-change lever 41 being vertically rotatable around an axis of support shaft 235. When speed-change lever 41 is longitudinally rotated, speed-change operation shaft 42 entirely rotates together with speed-change lever 41 around the axis of shaft 42.

As shown in FIGS. 8 and 9, a swing arm 233 fixedly projects from the bottom end of speed-change operation shaft 42. One end of a rod 234 is pivotally connected to a tip (free) end of swing arm 233 so that, in the space between left and right side frames 3, rod 234 is reciprocated in the longitudinal direction of tractor 1 correspondingly to the rotation of swing arm 233. The other end of rod 234 is connected to control arm 14d of HST 14a.

Due to this structure, when speed-change lever 41 is rotated longitudinally, speed-change operation shaft 42 rotates together so as to rotate swing arm 233 longitudinally horizontally, thereby pushing and pulling control arm 14d through rod 234 so as to change the speed reduction ratio of HST 14a. Thus, the traveling speed of tractor 1 is changed.

As shown in FIG. 30, a stay 239 is fixedly provided on an intermediate portion of speed-change lever 41 nearer to cylindrical portion 41b than grip 41a. Also, a stay 241 is formed on an intermediate portion of speed-change operation shaft 42. A spring 240 is interposed between stays 239 and 241 so as to bias speed-change lever 41 downward.

Therefore, speed-change lever 41, when being shifted from the neutral position to the backward traveling region, must be rotated upward against the biasing force of spring 240. Conversely speaking, even if speed-change lever 41 is unexpectedly touched, downwardly biased speed-change lever 41 is prevented from entering rear guide slot portion 97 for backward traveling because rear guide slot portion 97 is connected to the top end of vertical neutral slot portion of slot 95. Thus, tractor 1 is prevented from unexpected sudden reverse in its traveling direction.

Spring 240 shown in FIG. 30 is stretched. Alternatively, a coiled spring may be wound around support shaft 235 or cylindrical portion 41b of speed-change lever 41 so as to bias speed-change lever 41 downward.

A reference numeral 100 designates as a friction device for holding the position of longitudinally rotated speed-change lever 41. Speed-change lever 41 released from an operator's hand is retained by friction device 100.

As shown in FIGS. 28 and 30, one end of an elongated narrow plate 273 in its longitudinal direction is fixed with welding to a rear peripheral surface of steering column 39. Plate 273 is extended in the same lateral side with speed-change lever 41 and bent so as to direct the other end thereof forward.

Figure 29:
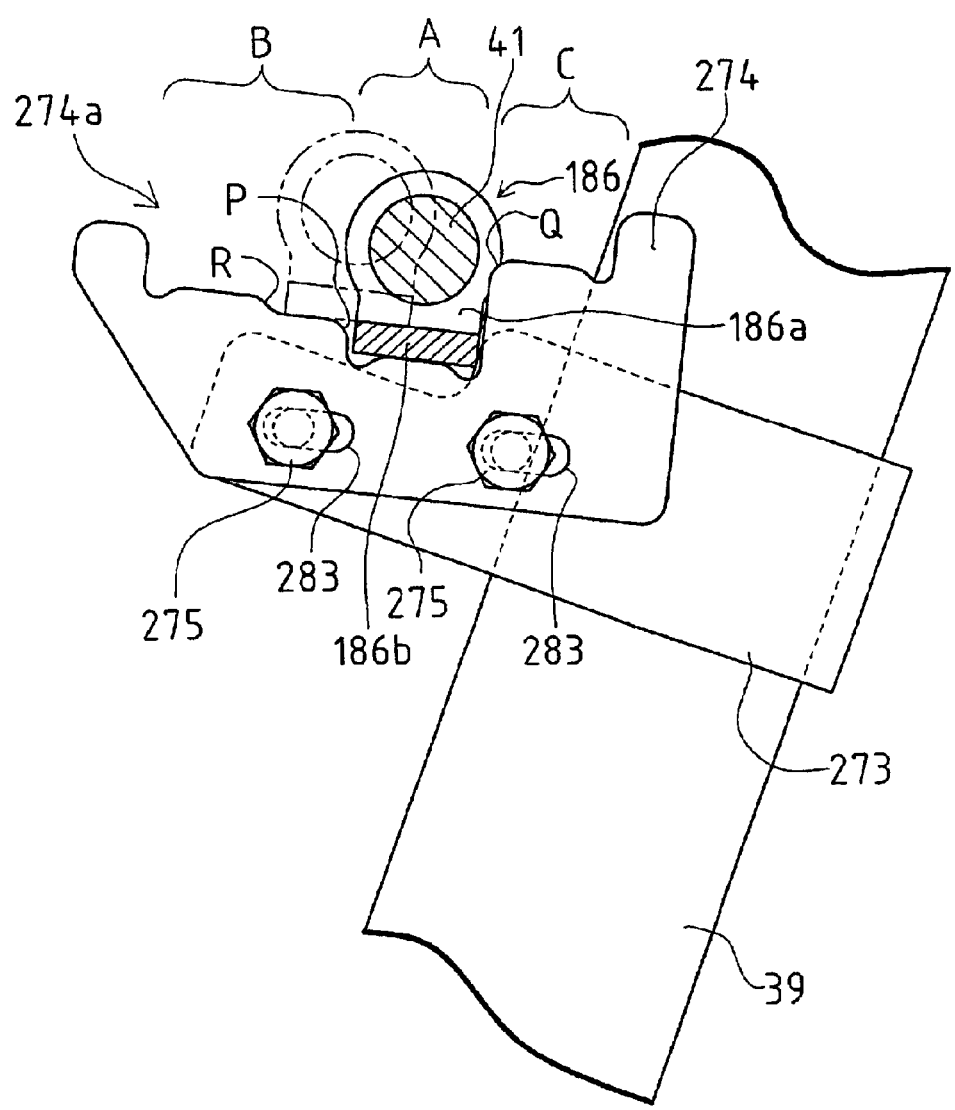
FIG. 29 is an enlarged side view of a guide plate guiding the speed-change lever in FIG. 28.

A guide plate 274 is fixed to the other end portion of plate 273 with bolts 275. As shown in FIG. 29, guide plate 274 is formed at its top edge with a recess 274a. As shown in FIGS. 29 and 30, a guide tab 186 is fixed with welding to an intermediate portion of speed-change lever 41 in correspondence to the position of guide plate 274. Guide tab 186 is omitted in FIG. 28. Guide tab 186 comprises a vertical portion 186a extended downward from speed-change lever 41 and a horizontal portion 186b extended continuously from the bottom end of vertical portion 186a, thereby being L-like shaped when viewed in rear. As discussed later, horizontal portion 186b of guide tab 186 is brought into contact with a bottom of recess 274a so as to guide speed-change lever 41.

As shown in FIG. 29, a bottom center region A of recess 274a of guide plate 274 is the deepest. A region B of recess 274a before deepest region A is slightly shallower than deepest region A. A region C of recess 274a behind deepest region A is shallower than region B. A substantially horizontal linear edge is formed in each of regions A, B and C of recess 274a so as to be parallel to the bottom surface of horizontal portion 186b of guide tab 186. Therefore, by placing the bottom surface of horizontal portion 186b on the linear edge of recess 274a, guide plate 274 retains speed-change lever 41.

Deepest region A of recess 274a is slightly longer than the width of horizontal portion 186b of guide tab 186 in the longitudinal direction of tractor 1. When guide tab 186 is engaged into deepest region A of recess 274, i.e., when speed-change lever 41 is located in neutral, too much play of speed-change lever 41 in the longitudinal direction of tractor 1 is avoided.

Recess 274a of guide plate 274 is so shaped that HST 14a is set in neutral when horizontal portion 186b of guide tab 186 of speed-change lever 41 downwardly biased by spring 240 is inserted into deepest region A of recess 274a. Guide plate 274 is formed with a slot 283 in the longitudinal direction of tractor 1 (along the longitudinally rotational direction of speed-change lever 41). Bolt 275 is screwed into plate 273 through slot 283 so as to fix guide plate 274 to plate 273. The position of bolt 275 relative to slot 274 is adjusted so as to adjust the position of guide plate 274 in the longitudinal direction of tractor 1.

Between regions A and B, the bottom edge of recess 274a is curved so as to provide a step P. Similarly, between regions A and C, the bottom edge of recess 274a is curved so as to provide a step Q.

In other words, guide tab 186 placed in deepest region A of recess 274a must climb over step P or Q to rotate speed-change lever 41 in the longitudinal direction of tractor 1. Even if speed-change lever 41 in neutral is unexpectedly touched, speed-change lever 41 is not easily rotated from its neutral position, thereby preventing tractor 1 from moving. Also, the shock by sudden shift is avoided.

In region B, a longitudinally intermediate portion of the bottom edge of recess 274a is formed into a gently curved step R, which functions as a detent so as to improve the feeling of forward rotation of speed-change lever 41. Suppose that tractor 1 is equipped with a cultivator as the rear working attachment. When speed-change lever 41 is rotated forward so as to locate guide tab 186 between step R and deepest region A in recess 274a, the cultivator is driven at a medium speed. If speed-change lever 41 is rotated forward over step R, the cultivator is driven at a high speed. Therefore, an operator, even if being not watching gauge plate 8d (shown in FIG. 26), can recognize whether the cultivator is driven at the medium speed or the high speed by the touch of speed-change lever 41.

When speed-change lever 41 is rotated forward from its neutral position, guide tab 186 leaves deepest region A, climbs over step P and enters region B slightly shallower than region A. Then, HST 14a operates for forward drive of tractor 1.

On the other hand, when speed-change lever 41 in neutral is pulled up and rotated backward, guide tab 186 leaves deepest region A, climbs over step Q and enters region C shallower than region B. Then, HST 14a operates for backward drive of tractor 1.

In this way, guide plate 274 determines the forward drive position, the neutral position and the backward drive position of speed-change lever 41 by the edge line of its recess 274a. Briefly, such a simple structure of guide plate 274 enables speed-change lever 41 to be operated properly.

Recess 274a does not directly abut against speed-change lever 41 but abuts against horizontal portion 186a of guide plate 186 fixed on the intermediate portion of speed-change lever 41. Therefore, speed-change lever 41 can be stably retained when it is set for forward and backward drive at an extremely slow speed.

Suppose that the intermediate portion of speed-change lever 41 directly abutted against the bottom of recess 274a. Sectionally circular speed-change lever 41 would touch the horizontal linear edge of recess 274a at a spot. Such speed-change lever 41, even if being put on curved step P or Q in recess 274a, would slip down into the bottom of deepest region A so as to naturally move speed-change lever 41 to the neutral position despite the retaining force of friction device 100. Therefore, speed-change lever 41 would require to be held with a hand for keeping tractor 1 in extremely slow travel whether forward or backward.

However, in the present structure of guiding speed-change lever 41, the member directly abutting against the bottom edge of recess 274a is flat horizontal portion 186b of guide tab 186. Even if speed-change lever 41 is located adjacently to the neutral position, horizontal portion 186b is retained on the horizontal linear edge in shallow region B or C of recess 274a. In FIG. 29, phantom lines are drawn as speed-change lever 41 located at the extremely slow forward drive position. An approximately half of horizontal portion 186b of guide tab 186 is placed on the bottom edge in shallow region B so as not to slip down along the curved edge of step P. Thus, horizontal portion 186b of guide tab 186 is prevented from naturally slipping down into deepest region A from shallow region B or C so as to prevent speed-change lever 41 from unexpectedly returning to the neutral position from the extremely slow forward or backward driving position, thereby avoiding the unexpected stop of tractor 1.

Guide plate 274 is fixed together with bolts 275 to plate 273 firmly fixed to steering column 39 by welding. As long as bolts 275 are strongly screwed up, guide plate 274 is prevented from longitudinally slipping according to the regular use of tractor 1, thereby avoiding the departure of speed-change lever 41 from its right position. Such an effect can be obtained by using economical bolts 275.

In addition to determination of the forward and backward drive positions and the neutral position of speed-change lever 41, recess 274a of guide plate 274 also determines the course of movement of speed-change lever 41 shifted among the positions. The bottom edge line of recess 274a (including those of regions A, B and C and steps P and Q as shown in FIG. 29) is substantially cranked correspondingly to the cranked side shape of slot 95 so as to determine the shift course of speed-change lever 41. Various bottom edge lines of recess 274a may be appreciated so as to optimally determine the shift course of speed-change lever 41.

The interlocking connection of speed-change lever 41 to hydraulic lift device 184 will be described.

As shown in FIG. 30, a stay 276 is fixed to the upper portion of speed-change operation shaft 42 and extended substantially in parallel to speed-change lever 41. One end of a wire tube 277 is vertically fixed to the tip of stay 276.

A connector 279 is fixed with welding to the intermediate portion of speed-change lever 41. A wire 278 is passed through wire tube 277 and fixedly connected at its one end to connector 279 through a screw. As discussed later, wire 278 links speed-change lever 41 with hydraulic lift device 184.

Stay 276, which supports the end of wire tube 277 and is fixed to speed-change operation shaft 42, is rotated in the longitudinal direction of tractor 1 together with speed-change operation shaft 42 according to the rotation of speed-change lever 41 in the longitudinal direction of tractor 1. Thus, while speed-change lever 41 is longitudinally rotated, the longitudinal position of connector 279 in relation to the tip of stay 276 is almost fixed. Consequently, only the vertical movement of speed-change lever 41 is transmitted to wire 278. Regardless of the position of speed-change lever 41 in the longitudinal direction of tractor 1, the end of wire 278 is pulled up by upwardly rotating speed-change lever 41. Then, speed-change lever 41 is rotated downward so as to release wire 278 from being pulled up. Speed-change lever 41 is provided with such a simple mechanism for vertical movement of the rear working attachment according to the vertical rotation of speed-change lever 41.

Figure 31:
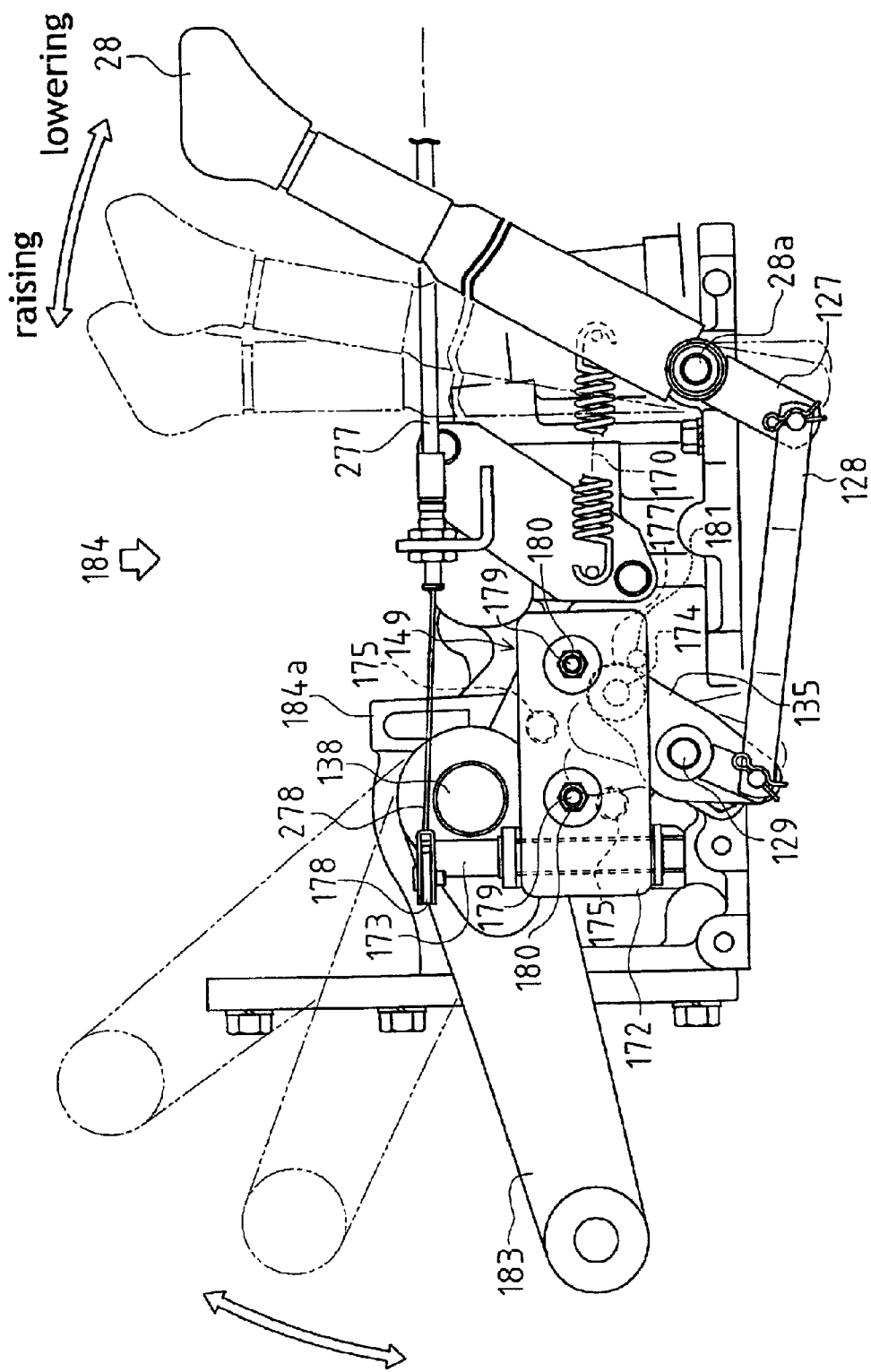
FIG. 31 is a right side view of a hydraulic lift device.

The other end of wire tube 277 involving wire 278 is extended toward hydraulic lift device 184 on the rear end of tractor 1. As shown in FIG. 31, hydraulic lift device 184 moves lift arms 183 vertically according to the longitudinal rotation of lift lever 28 (not shown in FIG. 1) extended upward toward seat 7, thereby vertically moving the rear working attachment attached to lift arms 183. As shown in FIG. 31, the rear working attachment is lowered by forward rotation of lift lever 28 (locating lift lever 28 at a lowering position), and raised by backward rotation of lift lever 28 (locating lift lever 28 at a raising position).

A pivot shaft 28a, around which the bottom end of lift lever 28 is rotatably provided, is fixed to one side surface of a lift housing 184a of hydraulic lift device 184. An arm 127 is fixedly extended downward from the bottom end of lift lever 28 and pivotally connected to a front end of a rod 128.

Figure 32:
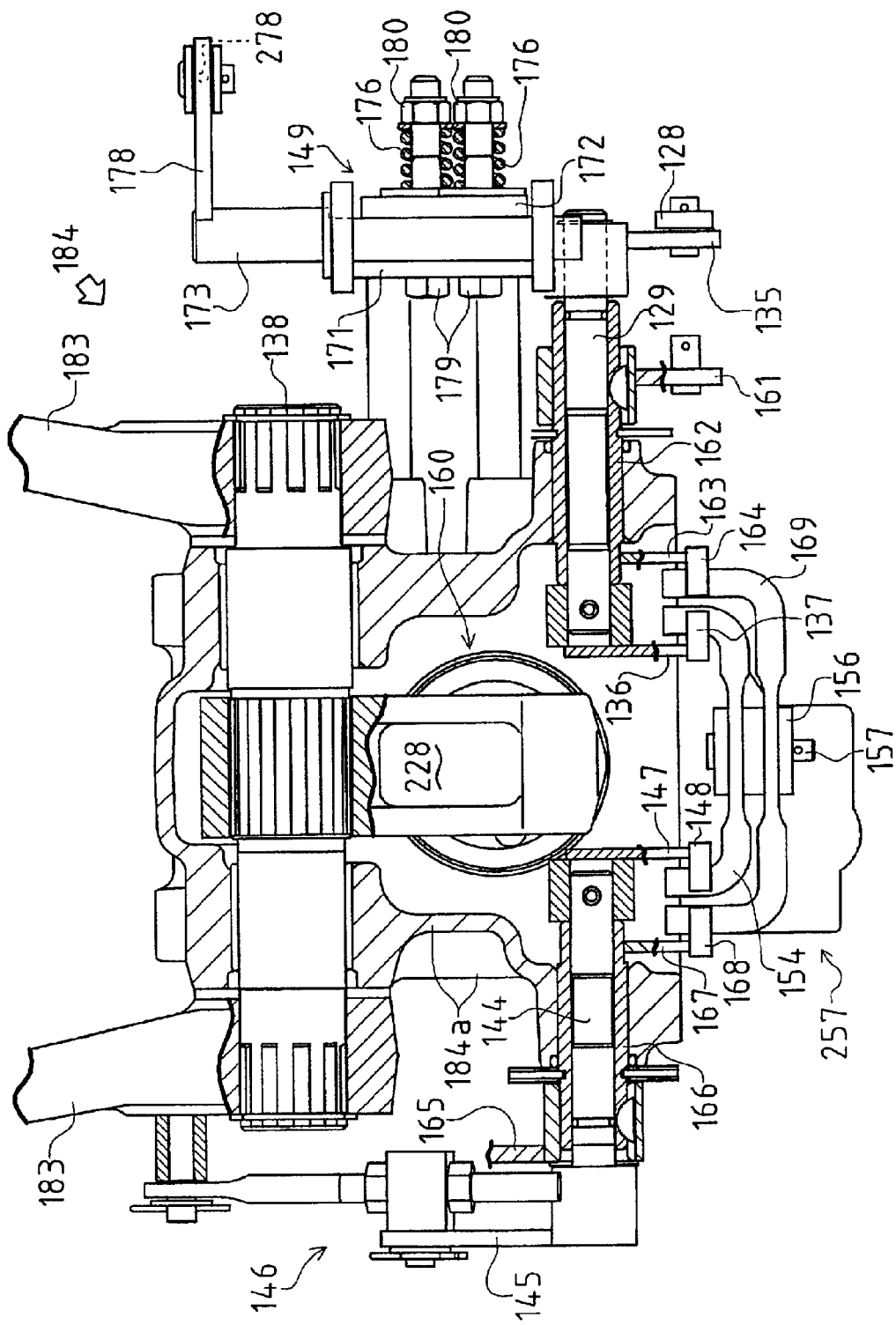
FIG. 32 is a sectional rear view of FIG. 31.

As shown in FIGS. 31 and 32, behind lift lever 28, a support shaft 129 is horizontally and rotatably supported by a side wall of lift housing 184a. A positioning arm 135 is fixed on support shaft 129 extended outside hydraulic lift device 184. The rear end of rod 128 is pivotally connected to one end of positioning arm 135 so as to interlock positioning arm 135 with lift lever 28.

A restoring spring 170 is interposed between lift lever 28 and an optimal portion of lift housing 184a so as to constantly bias lift lever 28 to the raising position. A friction device 149 is provided on positioning arm 135 for frictionally retaining shifted lift lever 28 against the biasing force of restoring spring 170.

Figure 33:
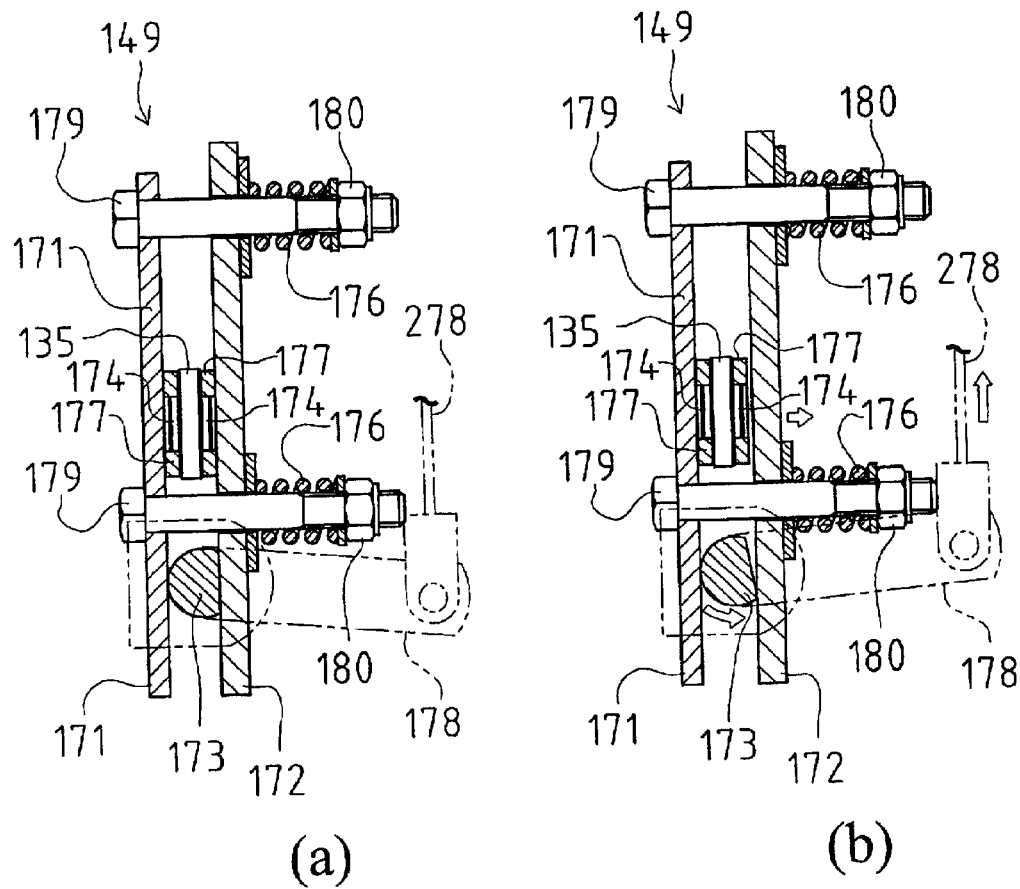
FIG. 33(*a*) is a sectional plan view of a friction device of the hydraulic lift device for retaining lift arms, showing the situation where a wire does not pull an arm for operation of the friction device.

The structure of friction device 170 will be described in accordance with FIGS. 31 to 33. As shown in FIGS. 31 and 32, a first plate 171, which has a rectangular side aspect, is fixed to lift housing 184a by bolts 175 on the same side with positioning arm 135.

A second plate 172 is disposed in parallel to first plate 171 and farther from lift hosing 184a than first plate 171. More specified, both first and second plates 171 and 172 are provided with respective holes, into which respective bolts 179 are inserted from lift housing 184a. A nut 180 is provided around each bolt 179. A spring is wound around a shaft portion of each bolt 179. Therefore, each spring 176 is interposed between second plate 172 and each nut 180 so as to bias second plate 172 toward first plate 171.

An upper portion of positioning arm 135 is inserted into the gap between first and second plates 171 and 172. As shown in FIG. 33(a), between first and second plates 171 and 172, positioning arm 135 is provided on both sides facing first and second friction plates 171 and 172 with respective projections 174. A friction ring 177, which has a ring-like side aspect as shown in FIG. 31, is provided around each projection 174. Thus, friction rings 177 are disposed on both side surfaces of positioning arm 135 facing first and second plates 171 and 172, respectively.

As shown in FIG. 33(a), second plate 172 is biased toward first plate 171 through friction rings 177 by springs 176 so as to frictionally retain positioning arm 135 between first and second plates 171 and 172 against the force of restoring spring 170. Accordingly, even if lift lever 28 is released from an operator's hand, lift lever 28 is retained, that is, lift lever 28 is not returned to its raising position by the force of restoring spring 170.

A manual force for moving lift lever 28 is required to exceed the friction force retaining positioning arm 135. As shown in FIG. 31, the shaft portion of rear one of two bolts 179 limits the rotational stroke of positioning arm 135 in one direction. Also, a pin 181 is provided on first plate 171 so as to limit the rotational stroke of positioning arm 135 in the other direction. The stroke (rotational region) of lift lever 28 is determined according to such a limited rotational region of positioning arm 135.

A camshaft 173 is rotatably supported by first plate 171 and vertically extended between two plates 171 and 172. The portion of camshaft 173 to abut against second plate 172 is partly cut away in a flat shape so as to form a cam.

An arm 178 is fixed to the top end of arm 178. The other end of wire 278 is connected to a tip of arm 178. As shown in FIG. 31, wire tube 277 is fixed to an optimal portion of the side wall of lift housing 184a.

When speed-change lever 41 in the condition as shown in FIG. 33(a) is rotated upward, speed-change lever 41 appears as shown in FIG. 33(b). Upwardly rotated speed-change lever 41 pulls wire 278, thereby pulling arm 178 so as to rotate camshaft 173. The cam portion of cam shaft 173 separates second plate 172 from first plate 171 against the force of springs 176 so as to loosen positioning arm 135 from the frictional retaining force of plates 171 and 172 with friction rings 177.

In this way, since the rotation of positioning arm 135 is allowed to be free from plates 171 and 172, lift lever 28 in connection with positioning arm 135 is returned to its raising position by the biasing force of restoring spring 170 (shown in FIG. 31) so as to raise lift arms 183, as discussed later. Thus, the rear working attachment is automatically raised according to the upward rotation of speed-change lever 41.

As shown in FIG. 32, support shaft 129 is extended into lift housing 184a so as to be fixedly provided thereon with an arm 136. A tip of arm 136 is formed into a bar 137. Thus, bar 137 is moved in the longitudinal direction of tractor 1 according to rotation of positioning arm 135 together with support shaft 129.

A lift arm drive shaft 138 is laterally horizontally and rotatably supported by lift housing 184a. Both ends of lift arm drive shaft 138 project outward from lift housing 184a so as to be fixedly provided thereon with respective lift arms 183.

An input arm 228 is fixedly extended downward from a laterally middle portion of lift arm drive shaft 138 so as to be connected to a movable portion of hydraulic cylinder 160. As shown in FIG. 13, hydraulic cylinder 160 is supplied with the oil through a directive switching valve unit 257 from second auxiliary hydraulic pump 66 driven by engine 26.

A support shaft 144 is rotatably supported by a side wall of lift housing 184a laterally oppositely to positioning arm 135. A feedback arm 145 is provided on an outer end of support shaft 144 and connected to lift arms 183 through a linkage 146. In lift housing 184a, an arm 147 is fixed on support shaft 144. A tip of support shaft 144 is formed into a bar 148. Consequently, bar 148 is moved in the longitudinal direction according to the rotational angle of lift arms 183.

A feedback link 154, which has a substantially U-like rear aspect, is laterally disposed in front of both bars 137 and 148. The both end portions of feedback link 154 is allowed to touch bars 137 and 148, respectively. Directive switching valve unit 257 is disposed in front of feedback link 154 so as to switch on and off of supplying oil to hydraulic cylinder 160. A main spool (not shown) of directive switching valve unit 257 is axially disposed to slide in the longitudinal direction of tractor 1. A connection tab 156 is fixed to a rear end of the main spool. Connection tab 156 is pivotally connected to a laterally middle portion of feedback link 154 through a pin 157. The main spool is provided with a restoring spring (not shown).

When lift lever 28 shown in FIG. 31 is pulled forward for raising the rear working attachment, positioning arm 135 interlocking with lift lever 28 through arm 127 and rod 128 is rotated together with support shaft 129 shown in FIG. 32, thereby forwardly moving bar 137 connected to support shaft 129 through arm 136 so as to push one end portion of feedback link 154. Thus, feedback link 154 is slanted so as to push the main spool connected to the center of feedback link 154 forward. Consequently, directive switching valve unit 257 is switched on so as to supply the oil to hydraulic cylinder 160, thereby stretching the movable portion of hydraulic cylinder 160 so as to raise lift arms 183 with the rear working attachment.

Feedback arm 145 shown in FIG. 32, which interlocks with lift arm 183 as mentioned above, is rotated according to the upward rotation of lift arms 183. Thus, bar 148 connected to supports haft 144 through arm 147 is moved backward. Accordingly, the center of feedback link 154 is moved backward so as to allow the restoring spring to pull the main spool backward. Consequently, directive switching valve unit 257 is switched off so as to stop the stretching movement of hydraulic cylinder 160, thereby holding the raised working attachment.

Additionally, as shown in FIG. 32 (omitted in FIG. 33), hydraulic lift device 184 is provided with a depth control lever 161 which can be manipulated by an operator. The movement of depth control lever 161 is transmitted to an arm 163 through a sleeve 162 rotatably provided around support shaft 129. A tip of arm 163 is formed into a bar 164. The degree of shift of depth control lever 161 is conversed into the position of bar 164 in the longitudinal direction of tractor 1.

An arm 165 interlocking with lift arms 183 through a linkage (not shown) is fixed onto sleeve 166 rotatably provided around support shaft 144. The vertical movement of the working attachment connected to lift arms 183 is transmitted to an arm 167 through arm 165 and sleeve 166. A tip of arm 167 is formed into a bar 168. Thus, bar 168 is moved in the longitudinal direction of tractor 1 according to the vertical position of the rear working attachment.

A depth-control feedback link 169 is allowed to touch both bars 164 and 168. Similarly with feedback link 154, depth-control feedback link 168 is U-like shaped. Connection tab 156 is pivotally connected to a laterally middle portion of depth-control feedback link 169 through pin 157.

Thus, the vertical position of the rear working attachment connected to lift arms 183 is controlled according to feedback on depth control lever 161 as well as that on lift lever 28.

Besides, as mentioned above in accordance with FIG. 31 and others, when speed-change lever 41 is rotated upward, wire 278 is moved so as to release positioning arm 135 from friction device 149, thereby letting restoring spring 170 pull lift lever 28. Therefore, positioning arm 135 interlocking with lift lever 28 is rotated to push the main spool of directive switching valve unit 257 so as to stretch hydraulic cylinder 160 to raise lift arms 183 with the rear working attachment.

Also, as mentioned above, speed-change lever 41 must be rotated upward when it is shifted into the backward drive position. According to this upward rotation of speed-change lever 41, wire 278 is moved so as to make hydraulic lift device 184 raise lift arms 183 with the rear working attachment. Briefly, when tractor 1 travels backward, the rear working attachment connected to lift arms 183 must be raised. In other words, the rear working attachment (e.g., a cultivator) cannot be lowered to work on a field unless tractor 1 travels forward.

If tractor 1, which is traveling forward while the lowered rear working attachment is working on a field, is going to travel backward, speed-change lever 41 located in the forward drive position (in front guide slot portion 96) is once shifted into the vertical slot portion of slot 95 as the neutral position, thereby stopping tractor 1. Then, speed-change lever 41 is raised against the biasing force of spring 240 in the short vertical neutral portion of slot 95, thereby making hydraulic lift device 184 raise the rear working attachment.

Then, raised speed-change lever 41 is shifted backward into rear guide slot portion 97 while the height reached by raised speed-change lever 41 is kept. Thus, tractor 1 is made to travel backward while the rear working attachment is raised.

Hence, by handling only speed-change lever 41 without lift lever 28, the rear working attachment can be raised in association with the reversing of traveling direction of tractor 1.

Instead of wire 278, another type linkage (e.g., including rigid arms and rods) may be alternatively provided for interlocking connection of speed-change lever 41 and hydraulic lift device 184. However, hydraulic lift device 184 is apart from speed-change lever 41 because, in the typical manner, speed-change lever 41 is positioned high at a longitudinally intermediate portion of tractor 1 while hydraulic lift device 184 is provided on a rear portion of tractor 1. Wire 278 can be advantageously interposed simply and compactly between hydraulic lift device 184 and speed-change lever 41 considerably apart from each other.

Description will now be given of a neutral restoring mechanism for restoring speed-change lever 41 to the neutral position according to the treading of neutral pedal 47.

As shown in FIG. 7, a bracket 248 is hung from base plate 245. A pair of left and right brake pedals (not shown) is supported by bracket 248 so as to be disposed above right step portion 6b. Also, bracket 248 rotatably supports a horizontal pivot shaft 249 below step portion 6b.

Neutral pedal 47 is fixedly extended from an outer end portion of pivot shaft 249. Neutral pedal 47 comprises a base ring portion 47a, a pedal face portion 47b and a rod portion 47c. Base ring portion 47a is fixedly provided around the outer end portion of pivot shaft 249. Rod portion 47c is fixedly extended from base ring portion 47a. Pedal face portion 47a to be trod is fixed on a tip of rod portion 47c. Thus, neutral pedal 47 is pivotally supported by bracket 248 through pivot shaft 249.

An arm 250 is disposed approximately upright but slightly rearward. An intermediate portion of arm 250 is fixed to pivot shaft 249. Therefore, when neutral pedal 47 is trod, arm 250 is rotated together.

Figure 34:
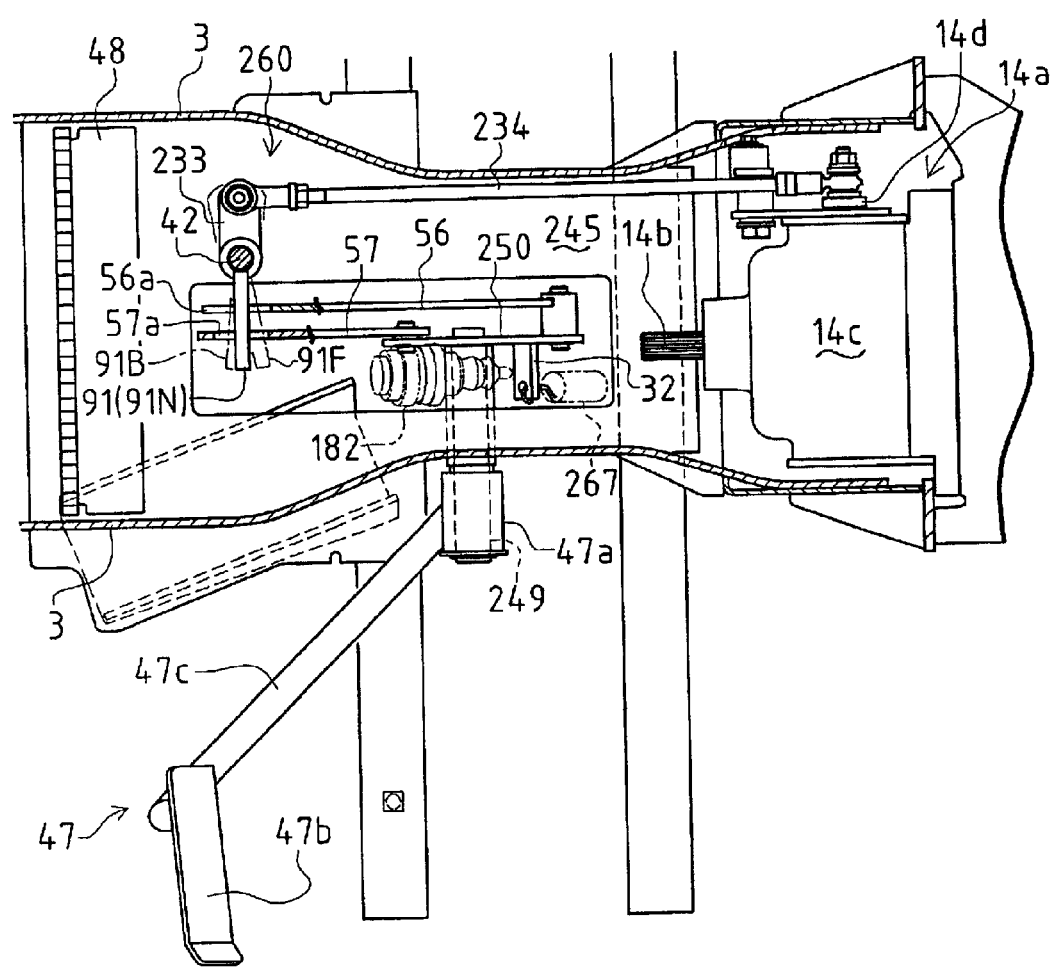
FIG. 34 is a bottom view of a neutral restoring system of the transmission.

Arm 250 projects upward from base plate 245. A top end of arm 250 above pivot shaft 249 is pivotally connected to a rear end of an approximately longitudinally horizontal first link rod 56. A forwardly open recess 56a is provided at a front end of first link rod 56. A bottom end of a forwardly upward extended second link rod 57 is pivotally connected to the bottom end of arm 250 below shaft 249. A top end of second arm 57 is provided with an elongated hole 57a having optimal length and width. As shown in FIGS. 7, 9 and 34, a pin 91 projects laterally from the lower portion of speed-change operation shaft 42 (laterally oppositely to swing arm 233) so as to be inserted through both recess 56a and elongated hole 57a, thereby connecting first and second links 56 and 57. Therefore, arm 250 and first and second link rods 56 and 57 constitute a compact and simple triangle linkage.

Pin 91 is disposed forwardly upward from pivot shaft 249 serving as a pivot of neutral pedal 47. By rotating speed-change lever 41, pin 91 is rotated in the longitudinal direction of tractor 1 together with speed-change operation shaft 42.

As shown in FIGS. 7 and 34, a tab 32 fixedly projects laterally from an intermediate portion of arm 250. An arm 268 is fixedly hung from base plate 245. A spring 267 is interposed between tab 32 and arm 268 so as to bias the top portion of arm 250 pivotally connected to first link rod 56 backward. A stopper 22 is optimally disposed so as to determine an initial (unpressed) position of neutral pedal 47. Stopper 22 coming into contact with arm 250 restricts the backward movement of neutral pedal 47 pulled by spring 267.

Unless neutral pedal 47 is trod, arm 250 is retained because spring 267 biases arm 250 so as to abut against stopper 22. In each of recess 56a and elongated hole 57a, an optimal play is secured, especially in the longitudinal direction of each of first and second links 56 and 57 pivotally connected to arm 250. Pin 91 moves in the overlapping hollow space of both recess 56a and elongated hole 57a. Moving pin 91 can freely push first and second links 56 and 57 that may be rotated around the respective ends of arm 250. In other words, pin 91 can be moved in the longitudinal direction of tractor 1 as a bold arrow in FIG. 35 freely from first and second links 56 and 57. Whereby, speed-change lever 41 interlocking with pin 91 can be freely rotated to its forward and backward drive positions (corresponding to pin positions 91F and 91B) so as to rotate control arm 14d of HST 14a for changing the traveling direction and speed of tractor 1.

Figure 37:
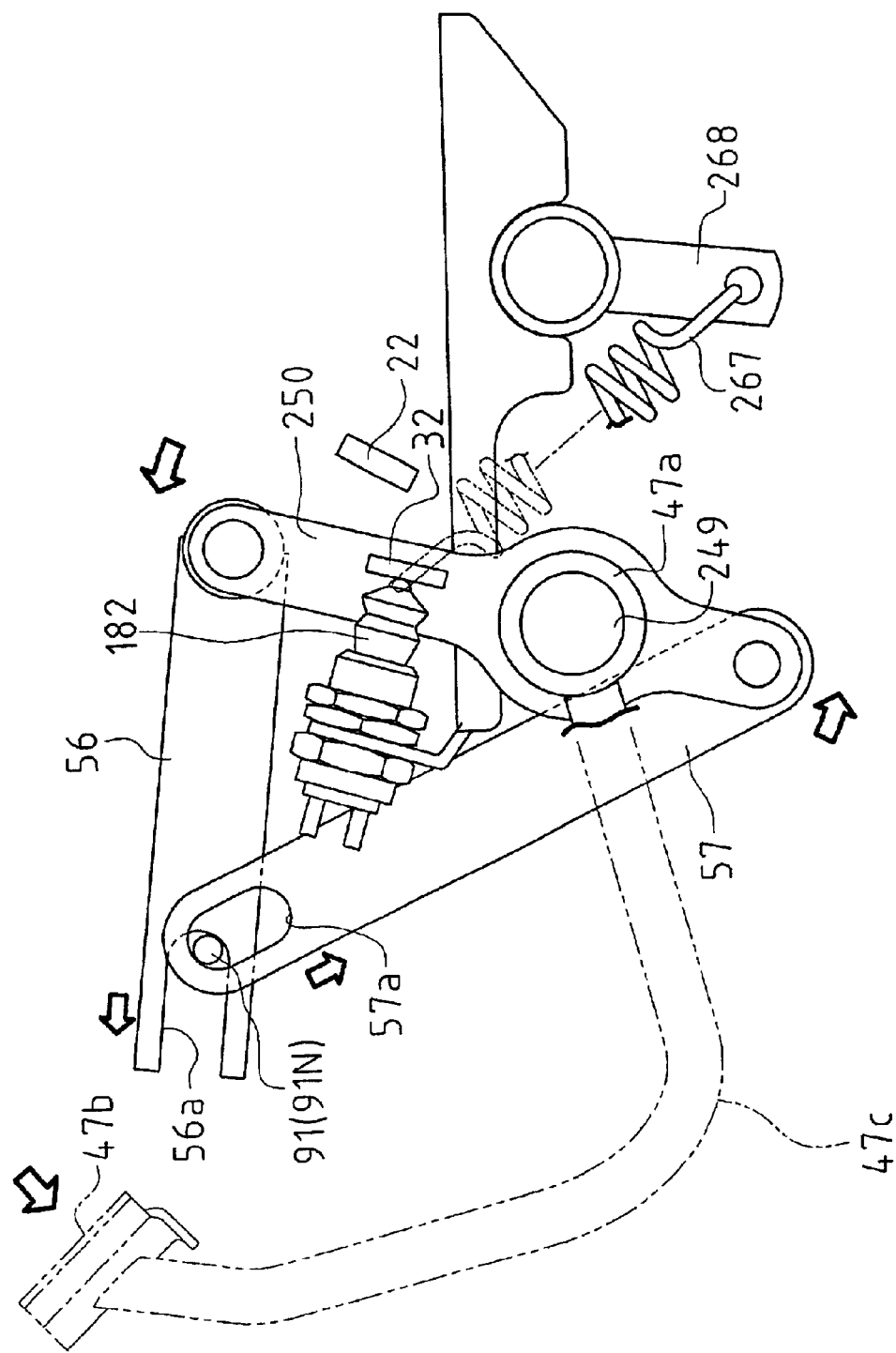
FIG. 37 is a side view of the linkage of FIG. 35 when the neutral pedal is trod.

When neutral pedal 47 is trod, arm 250 is rotated counterclockwise against the biasing force of spring 267, as shown in FIG. 37, so as to push first link rod 56 forward and to pull second link rod 57 approximately downward, thereby reducing the overlapping hollow space of both recess 56a and elongated hole 57a through which pin 91 is inserted. If trod neutral pedal 47 reaches a certain depth, the play of pin 91 in both recess 56a and elongated hole 57a vanishes. That is, pin 91 is retained while abutting against the ends of both recess 56a and elongated hole 57a, thereby being impossible to move in the longitudinal direction of tractor 1.

The lengths of first and second link rods 56 and 57 and their recess 56a and elongated hole 57a and the position of elongated hole 57a in second link rod 57 are determined so as to locate such retained pin 91 at a neutral pin position 91N corresponding to the neutral position of speed-change lever 41. Thus, by treading neutral pedal 47, pin 91 is forcedly retained at neutral pin position 9 IN so as to restore speed-change lever 41 interlocking with pin 91 through speed-change operation shaft 42 to the neutral position (against the friction force of friction device 100 shown in FIG. 9), whereby control arm 14d of HST 14a is restored to the neutral position so as to stop tractor 1. Such a simple neutral-restoring mechanism comprising arm 250 fixed to neutral pedal 47, pin 91 interlocking with speed-change lever 41, and link rods 56 and 57 interposed between arm 250 and pin 91 enable the interlocking connection of pedal 47 and lever 41, thereby contributing for reduction of the number of parts and manufacturing costs.

Pin 91 is disposed before pivot shaft 249 pivoting neutral pedal 47 so as to approach neutral pedal 47 in the vertical direction. Thus, the vertical length of the neutral-restoring mechanism can be reduced so as to secure sufficient foot space for an operator riding on tractor 1 as well as a sufficient minimum road clearance of tractor 1.

The reason why first link rod 56 is substantially horizontal and second link rod 57 is slanted upwardly forward will be described.

Figure 35:
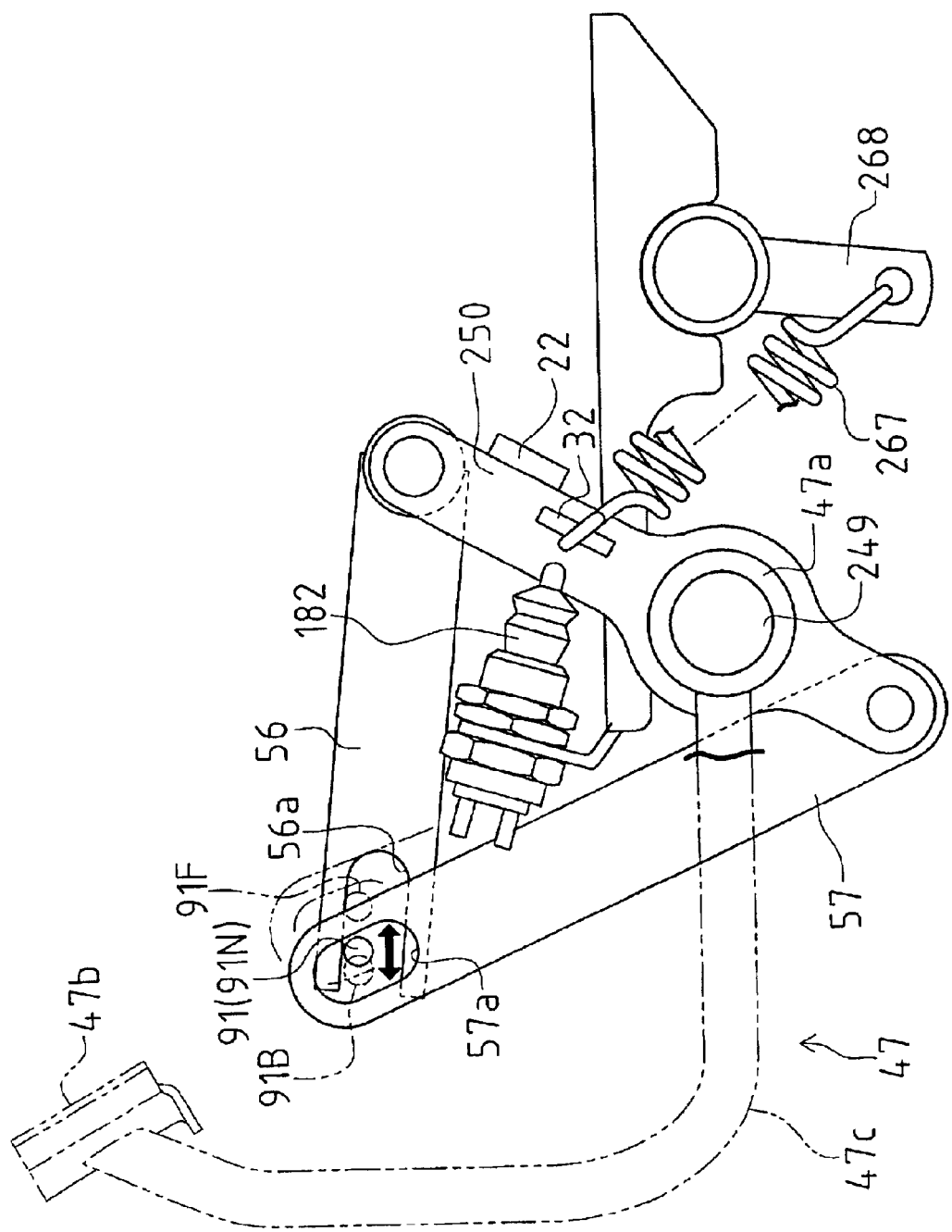
FIG. 35 is a side view of a linkage as a part of the neutral restoring system when a neutral pedal is not trod.

As shown in FIG. 35, when speed-change lever 41 is shifted for forward traveling of tractor 1, pin 91 is moved backward from neutral pin position 91N to pin position 91F. Also, when speed-change lever 41 is shifted for backward traveling of tractor 1, pin 91 is moved forward from neutral pin position 91N to pin position 91B.

In this way, if neutral pedal 47 is trod while pin 91 being at pin position 91F, first link rod 56 is pushed forward with pin 91 abutting against the end of recess 56a so as to return pin 91 to neutral pin position 91N. If neutral pedal 47 is trod while pin 91 being at pin position 91B, second link rod 57 is pulled downwardly backward with pin 91 abutting against the edge of elongated hole 57a so as to return pin 91 to neutral pin position 91N.

However, when control arm 14d is going to return to its neutral position, a hydraulic relief pressure is generated within HST 14a so as to resist control arm 14d. The relief pressure force against control arm 14d is transmitted to pin 91 together with speed-change operation shaft 42 through rod 234 and swing arm 233. The hastier and greater the neutral-return of control arm 14d is, the stronger the relief pressure force becomes. Since the maximum backward speed of tractor 1 is typically smaller than the maximum forward speed thereof the relief pressure force during the neutral-return of control arm 14d from its forward drive position tends to be strong in comparison with during the neutral-return of control arm 14d from its backward drive position.

Considering the problem, first and second link rods 56 and 57 are arranged rationally.

First link rod 56, which carries pin 91 from pin position 91F to neutral pin position 91N, is disposed in the substantially horizontally longitudinal direction almost coinciding to the direction of pin 91 moved by treading neutral pedal 47. Therefore, the tredding of neutral pedal 47 while tractor 1 is traveling forward is efficiently conversed through arm 250 into the stroke of first link rod 56 pushing pin 91 from pin position 91F to neutral pin position 91N so as to overcome the considerably large hydraulic relief pressure applied onto pin 91.

Second link rod 57, which carries pin 91 from pin position 91B to neutral pin position 91N, is necessarily disposed downwardly backward slantwise so as to constitute the triangle linkage together with substantially vertical arm 250 and substantially horizontal first link rod 56. Thus, the longitudinal direction of second link rod 57 is considerably angled from the substantially longitudinally horizontal direction of moving pin 91. When neutral pedal 47 is trod while tractor 1 is traveling backward, second link rod 57 is moved along the longitudinal direction thereof (downwardly backward). During this movement of second link rod 57, pin 91 at pin position 91B is moved in elongated hole 57a and carried by second link rod 57 so as to reach neutral pin position 91N, thereby being limited in its movement in the longitudinal direction of tractor 1. Also, the force applied on pin 91 by second link rod 57 pulled in the longitudinal direction of tractor 1 is weak because this is a component force of the stroke of second link rod 57 in the longitudinal direction of second link rod 57 (downwardly backward). However, as shown in FIG. 35, the distance between pin positions 91N and 91B in the longitudinal direction of tractor 1 is rather short because of restriction of the maximum backward traveling speed of tractor 1. Thus, the hydraulic relief pressure force, which is generated in HST 14a and applied onto pin 91 at pin position 91B, is so weak as to be overcome by the component force of second link rod 57 in the longitudinal direction of tractor 1. Hence, second link rod 57 may be safely oriented slantwise (downwardly backward). Conversely, since second link rod 57 can be disposed slantwise while first link rod 56 is approximately horizontal in the longitudinal direction, arm 250 can be vertically short, thereby securing the sufficient minimum road clearance of tractor 1.

A limit switch 182 is disposed adjacently to arm 250 so as to be directed toward tab 32 fixed on arm 250. When neutral pedal 47 is depressed over a certain stroke, tab 32 comes to press limit switch 182 so as to detect the depression of neutral pedal 47.

Figure 36:
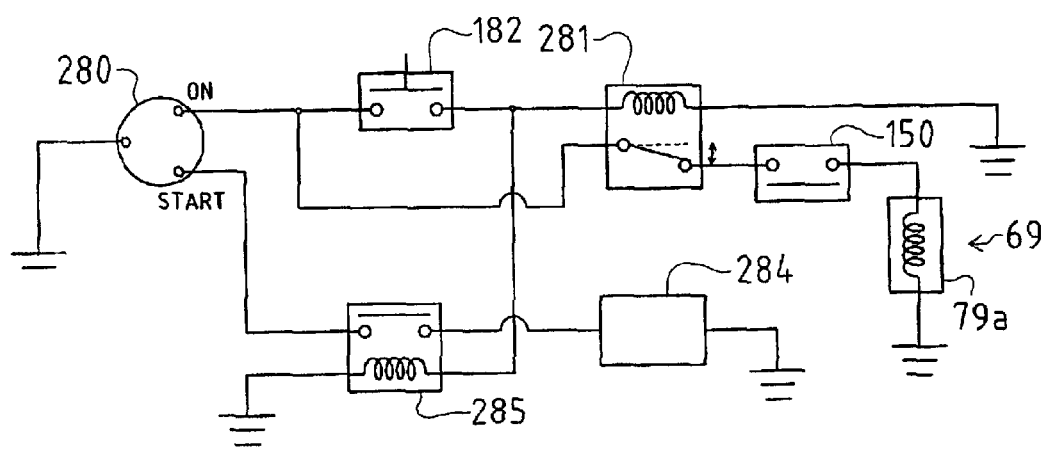
FIG. 36 is an electric circuit diagram for controlling a PTO clutch.

Referring to FIG. 36, a PTO clutch control device is provided to control PTO clutch device 69 (and a starter motor 284 for starting engine 26) on basis of the signal issued from limit switch 182. The PTO clutch control device comprises PTO clutch switch 150 and a PTO relay 281, which are connected in series to solenoid 79a of PTO switching valve 79 (shown in FIG. 13) in PTO clutch device 69. When PTO clutch switch 150 is located at the clutch-off position, PTO switching valve 79 is opened. When PTO clutch switch 150 is located at the clutch-on position, PTO switching valve 79 is closed.

PTO relay 281 is a typical electromagnetic relay. An output circuit of PTO relay 281 is closed unless an input circuit thereof is energized. The closed output circuit of PTO relay 281 connects a battery and an ignition switch 280 in series to PTO clutch switch 150. Also, the input circuit of PTO relay 281 is connected to the battery through limit switch 182 and ignition switch 280 so that, when limit switch 182 is closed (switched on), the input circuit in PTO relay 281 is energized so as to close (switch on) the output circuit in PTO relay 281.

When neutral pedal 47 is trod, tab 32 presses (switches on) limit switch 182 so as to energize PTO relay 281, thereby isolating solenoid 79a of PTO switching valve unit 69 whether PTO clutch switch 150 is switched on or off. Briefly, when neutral pedal 47 is trod, PTO clutch device 69 is clutched off. That is, neutral pedal 47 substantially functions as a main clutch pedal.

Limit switch 182 is also connected to an input circuit of a starter relay 285 for starter motor 284. An output circuit of starter relay 285 is opened between ignition switch 280 and starter motor 284 unless the input circuit thereof is energized. When the input circuit of starter relay 285 is energized, the output circuit of starter relay 285 is closed so as to energize starter motor 284, thereby rotating flywheel 48.

However, the operation required to energize starter relay 285 for driving starter motor 284 is not only to turn a key inserted into ignition switch 280 the "start" position but also to tread neutral pedal 47 so as to close limit switch 182 and energize starter relay 285. Briefly, neutral pedal 47 must be trod for starting engine 26.

As mentioned above, by treading neutral pedal 47, speed-change lever 41 is forcedly restored to the neutral position and PTO clutch device 69 is forcedly clutched off. That is, during of the start of engine 26, the neutral condition of HST 14a and the clutch-off condition of PTO clutch device 69 can be secured. Therefore, tractor 1 or the working attachment provided on tractor 1 will not suddenly start according to the start of engine 26.

Figure 38:
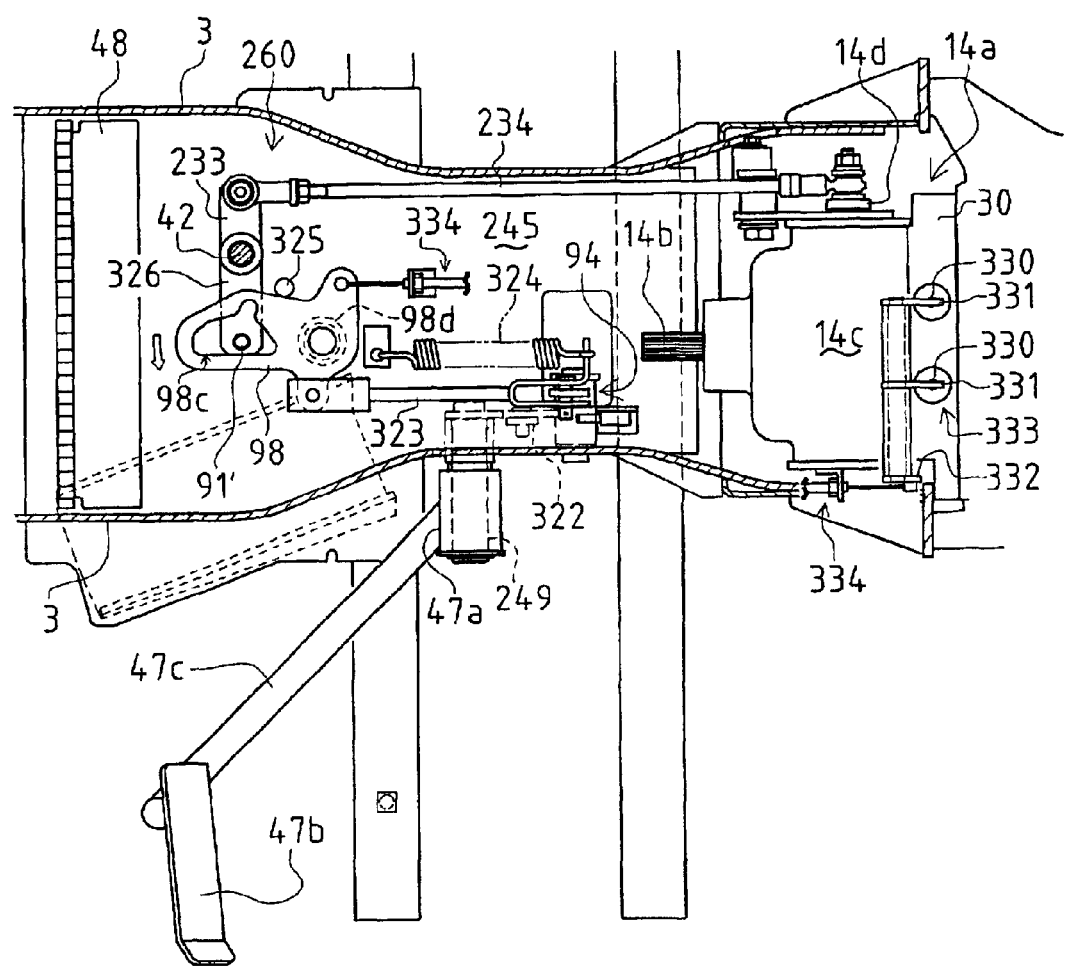
FIG. 38 is a bottom view of a modification of the neutral restoring system of FIG. 34.
Figure 39:
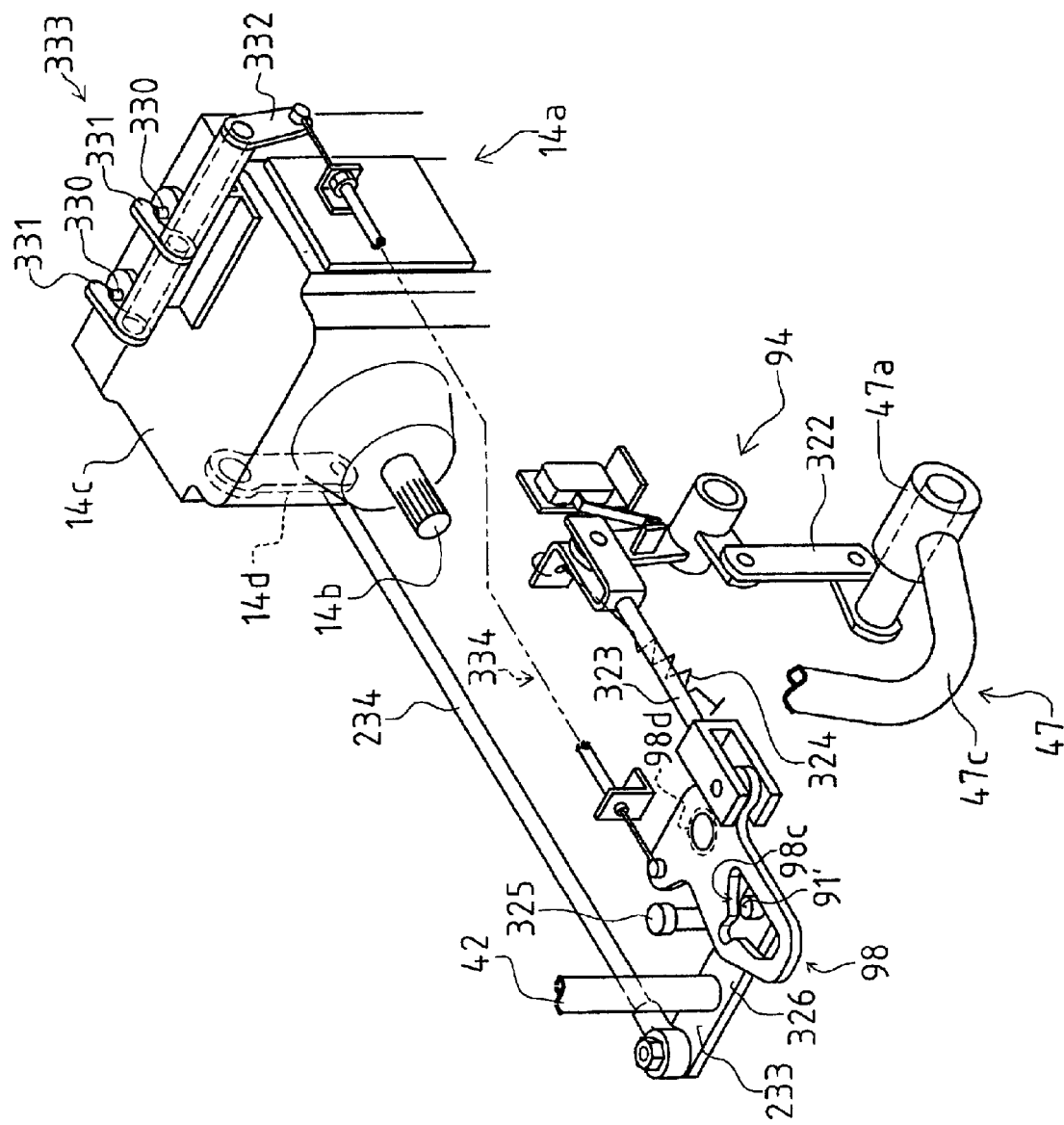
FIG. 39 is a perspective view of FIG. 38.

FIGS. 38 and 39 illustrate an alternative construction for neutral restoring of speed-change lever 41 according to tread of neutral pedal 47. A cam plate 98 is horizontally disposed and rotatably supported above base plate 245 through a pivot 98d. Cam plate 98 is interlockingly connected to neutral pedal 47 through a rod 323, a crank arm 94 and a link rod 322. Cam plate 98 is provided therein with an approximately triangular cam hole 98c.

A restoring arm 326 replacing pin 91 projects from speed-change operation shaft 42. A pin 91' is provided on a top surface of restoring arm 326 so as to be inserted into cam hole 98c of cam plate 98. Thus, cam plate 98 interlocks with swing arm 233.

When neutral pedal 47 is not trod, cam plate 98 is biased by a restoring spring 324 so as to be retained by a stopper 325 upwardly projecting from base plate 245, as shown in FIGS. 38 and 39. At this time, pin 91' is movable in cam hole 98c in the longitudinal direction of tractor 1 so as to allow the rotation of speed-change lever 42 (that is, the handling of speed-change lever 41).

When neutral pedal 47 is trod, rod 323 is pulled backward so as to rotate cam plate 98 along a blank arrow in FIG. 38. Thus, pin 91' is inserted into a narrow portion of cam hole 98c so as to restore speed-change lever 41 to the neutral position forcedly.

Instead of cam plate 98, various cam structures, e.g., a columned cam, may be appreciated.

If there is an error of assembling or adjustment in linkage 260, the neutral restoring of control arm 14d cannot be completed when speed-lever 41 is turned into the neutral position. In this situation, tractor 1 may unexpectedly travel slowly.

In order to solve the problem, a pair of parallel plungers 330 are provided in HST center section 30, as shown in FIGS. 38 and 39. Each of plungers 330 is constructed so as to make oil in corresponding hydraulic-oil-circulation hole 20 escape through check valve 121. Outside HST housing 14c is provided a bypass means 333 comprising a pair of push arms 331 and an input arm 332. Push arms 331 abut against outer heads of respective push arms 331. Input arm 332 is connected to cam plate 98 through a cable 334.

When neutral pedal 47 is trod, the movement of cam plate 98 to rotate restoring arm 326 to its neutral position is transmitted to input arm 332 through cable 334 so as to make both push arms 331 operate to open check valves 121 through plungers 330, thereby making oil bypass between hydraulic-oil-circulation holes 20. Thus, even if control arm 14d is not exactly located at the neutral position, tractor 1 certainly stops.

Then, if trod neutral pedal 47 is released, check valves 121 are closed so as to block the bypass route between hydraulic-oil-circulation holes 20. However, since speed-change lever 41 is located at or in the vicinity of the neutral position, tractor 1 does not start suddenly.

Figure 40:
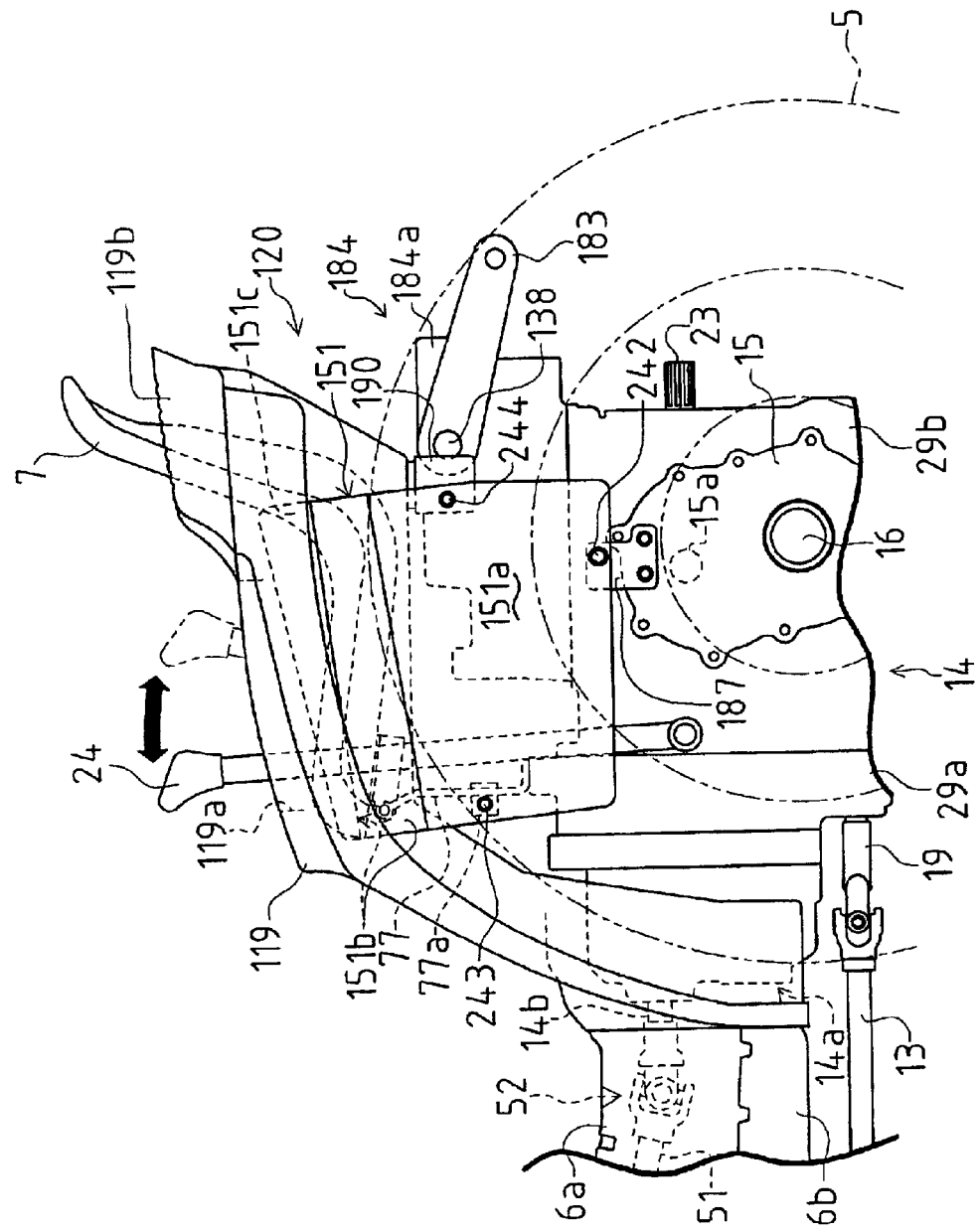
FIG. 40 is an enlarged side view of a fender of the tractor.
Figure 41:
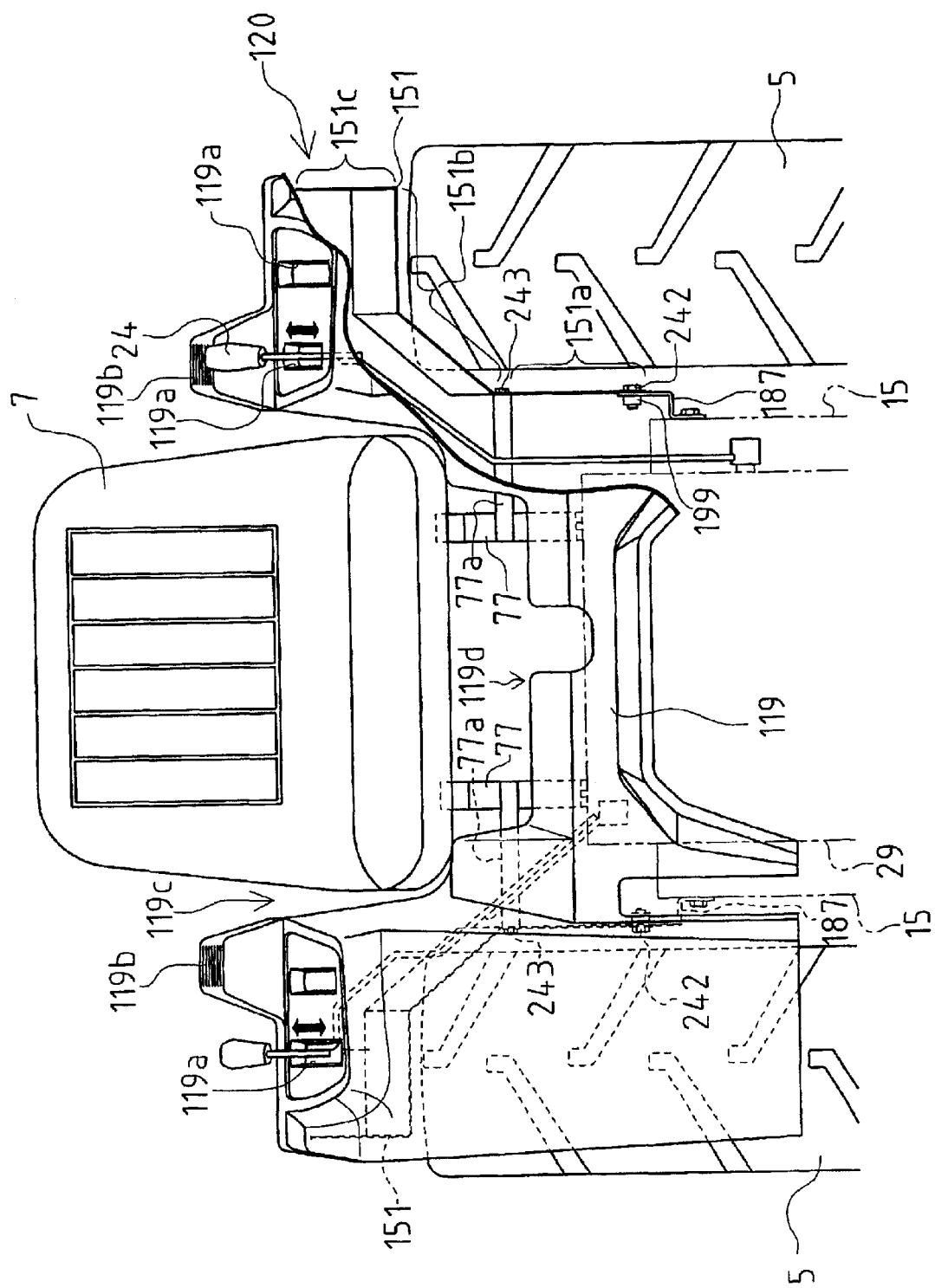
FIG. 41 is a sectional front view of the same.

Referring to FIGS. 40 and 41, fender 120 comprises a main fender body 119 for protecting an operator sitting on seat 7 from mud or water splashed by rear wheels 5. Also, fender 120 comprises left and right mudguard plates 151, each of which is disposed between main fender body 119 and rear wheel 5.

Main fender body 119 is made by blow molding of synthetic resin. As shown in FIG. 41, main fender body 119 is substantially laterally symmetrically shaped. The lateral width of main fender body 119 is substantially designed as the same lateral width of tractor 1.

A laterally intermediate portion of main fender body 119 almost entirely covers the tops of transmission housing 29 and lift housing 184a. Left and right edges of main fender body 119 are laterally pushed out so as to cover respective rear wheels 5. Thus, single main fender body 119 can cover the upper and front portions of both rear wheels 5.

As shown in FIG. 41, an elbow-rest portion 119b projects upward from each of left and right rising edges of main fender body 119. An operator sitting on seat 7 can put his/her elbows on elbow-rest portions 119b. In front of each elbow-rest portions 119b, each of left and right rising edges of main fender body 119 is provided with guide slots 119a in the longitudinal direction of tractor 1, through which various operating levers including sub speed-change lever 24 are guided so as to be rotatable in the longitudinal direction of tractor 1.

Single main fender body 119 covers both rear wheels 5 and provides all guide slots 119a without another part, thereby contributing for reduction of parts.

Referring to the arrangement of seat 7 on main fender body 119, main fender body 119 is formed at its laterally middle portion with a downward recess 119c, as shown in FIG. 41. A hole 119d is largely open at the bottom of recess 119c. Left and right props 77 are fixedly provided upright on the top surface of transmission housing 29 and upwardly passed through hole 119d. A front bottom portion of seat 7 is pivoted on the tops of props 77.

For oil changing or other maintenance works, seat 7 is rotated downwardly forward so as to expose hole 119d, through which transmission 14 and hydraulic lift device 184 below main fender body 119 are accessible.

Various shapes of main fender body 119 made of blown synthetic resin may be easily provided. In this embodiment, observable upper and side portions of main fender body 119 are rather smoothly curved so as to present a fine view. Hiding portion of main fender body 119 is rather squared and formed with optimal ribs for reinforcement.

Each of mudguard plate 151 is a bent steel plate. A vertical plate portion 151a of mudguard plate 151 having a certain vertical length is disposed between transmission housing 29 and corresponding rear wheel 5. A fixture member 187 is fixedly mounted on the top of a side surface of each rear axle casing 15. Mudguard plate 151 is disposed by fixing vertical plate portion 151a to fixture member 187 with bolts 242.

As shown in FIGS. 40 and 41, left and right props 77 are provided upright on transmission 14 so as to support seat 7, as mentioned above. A fixture member 77a is extended laterally outward from an intermediate portion of each of props 77 so as to be fixed to a front portion of vertical plate portion 15 1a of each mudguard plate 151 with a bolt 243. A seatbelt stay 190 having a gate-like front view is fixed on lift housing 184a. A rear portion of vertical plate portion 151a of each mudguard plate 151 is fixed to each of left and right side surface of seatbelt stay 190 with a bolt 244. Thus, vertical plate portion 151a is upwardly extended along an inner end surface of each rear wheel 5.

A portion of each mudguard plate 151 other than vertical plate portion 151a is twice stepped toward the lateral outside of tractor 1, which is passed laterally outward between the top portion of rear wheel 5 and the rising side edge of main fender body 119 so as to form a lateral portion 151b and then bent upward at a certain vertical length so as to form an upward portion 151c.

Lateral portion 151b of each mudguard plate 151 has an area larger than the square region of main fender body 119 in which guide slots 119a are formed. Therefore, each of the left and right regions of main fender body 119 including guide slots 119a is entirely covered at its bottom with lateral portion 151b of each mudguard plate 151. Upward portions 151c of mudguard plates 151 are disposed on left and right outer ends of tractor 1 so as to reinforce plastic main fender body 119.

As shown in FIG. 1, a major portion of mudguard plate 151 hides inward of each rear wheel 5 and main fender body 119, thereby securing a clear side view of tractor 1.

Incidentally, the operation levers including sub speed-change lever 24 are pivoted at their bottom ends on either left or right side surface of transmission 14, as shown in FIGS. 40 and 41. As shown in FIG. 41, each of the operation levers is extended upward in an optimal length (along vertical plate portion 151*a* of mudguard plate 151) and bent so as to be passed laterally outward between lateral portion 151*b* of each mudguard plate 151 and main fender body 119, and then, it is further bent upward so as to be passed through each guide slot 119*a*, thereby being extended upward from main fender plate 119.

Mud and water splashed by rear wheels 5 is touched by main fender body 119 and mudguard plates 151 so as to be dropped, thereby protecting an operator sitting on seat 7 from the mud and water. Also, guide slots 119*a* are protected by lateral portions 151*b* of mudguard plates 151 so as not to allow the splash of mud and water to rise over fender 120 through guide slots 119*a* or to block guide slots 119*a*.

As mentioned above, mudguard plate 151 is a simple bent plate whose cost is economical.

Vertical portion 151*a* of each mudguard plate 151, which is the most inward portion thereof, is more outward than operation levers like sub speed-change lever 24, thereby protecting the operation levers from mud and water splashed by rear wheels 5.

Although the invention has been described in its preferred form with a certain degree of particularity, it is understood that the present disclosure of the preferred form has been changed in the details of construction and the combination and arrangement of parts may be restored without departing form the spirit and the scope of the invention as hereinafter claimed.

What is claimed is:

1. A tractor, comprising:
  a vehicle frame;
  an engine including a flywheel;
  a transmission including an input shaft wherein an axis of said input shaft is laterally offset from a rotary axis of said flywheel towards a side of said transmission;
  a linkage for speed control connected to said transmission on another side of said transmission;
  a first universal joint having a portion coaxially connected to said flywheel;
  a second universal joint having a portion coaxially connected to said input shaft; and
  a transmission shaft disposed laterally slantwise between said first universal joint and said second universal joint.

2. The tractor as set forth in claim 1, further comprising:
  a vibration isolator interposed at least between said flywheel and said first universal joint.

3. The tractor as set forth in claim 1, wherein said input shaft is disposed lower than said rotary axis of said flywheel so that said transmission shaft is disposed vertically slantwise.

4. The tractor as set forth in claim 1, further comprising:
  a vibration isolator interposed at least between either said flywheel and said first universal joint, wherein said input shaft is disposed lower than said rotary axis of said flywheel so that said transmission shaft is disposed vertically slantwise.

5. A tractor, comprising:
  a vehicle frame;
  an engine including a flywheel;
  a first universal joint having a shaft portion;
  a supporter fixed to said flywheel, wherein said shaft portion of said first universal joint penetrates said supporter so as to be coaxially connected to said flywheel;
  an elastic member interposed between said supporter and said first universal joint;
  a transmission including an input shaft;
  second universal joint having a portion coaxially connected to said input shaft; and
  a transmission shaft interposed between said first and second universal joints.

6. The tractor as set forth in claim 5, wherein said supporter is detachably fixed to said flywheel.

7. The tractor as set forth in claim 5, wherein said elastic member is disposed around said supporter.

8. The tractor as set forth in claim 7, further comprising:
  first bolts fastening said elastic member to said flywheel; and
  second bolts fastening said elastic member to said first universal joint, wherein said first and second bolts are alternately arranged around said supporter.

9. The tractor as set forth in claim 5, wherein said input shaft is disposed lower than a rotary axis of said flywheel so that said transmission shaft is disposed vertically slantwise.

10. The tractor as set forth in claim 5, further comprising:
  a linkage for speed control connected to said transmission on a side of said transmission, wherein an axis of said input shaft is laterally offset from an axis of a rotary shaft of said flywheel toward another side of said transmission so that said transmission shaft is disposed laterally slantwise.

11. The tractor as set forth in claim 5, further comprising:
  a linkage for speed control connected to said transmission on a side of said transmission, wherein an axis of said input shaft is disposed lower than a rotary axis of said flywheel and laterally offset from an axis of a rotary shaft of said flywheel toward another side of said transmission so that said transmission shaft is disposed vertically and laterally slantwise.

12. A tractor, comprising:
  a vehicle frame;
  an engine including a flywheel, said engine disposed laterally inward from said vehicle frame;
  a first vibration isolator through which said engine is supported by said vehicle frame, said first vibration isolator disposed upwardly from said vehicle frame and laterally outward from an outer edge of said vehicle frame;
  a transmission including an input shaft;
  a first universal joint having a portion coaxially connected to said flywheel;
  a second universal joint having a portion coaxially connected to said input shaft; and
  a transmission shaft interposed between said first universal joint and said second universal joint.

13. The tractor as set forth in claim 12, further comprising:
  a second vibration isolator interposed between said flywheel and said first universal joint.

14. The tractor as set forth in claim 13, said second vibration isolator comprising:
  an elastic member disposed around said portion of said first universal joint coaxially connected to said flywheel;
  first bolts fastening said elastic member to said flywheel; and
  second bolts fastening said elastic member to said first universal joint, wherein said first and second bolts are alternately arranged around said portion of said first universal joint coaxially connected to said flywheel.

15. The tractor as set forth in claim 13, said second vibration isolator comprising:
- a supporter fixed to said flywheel, wherein a shaft portion of said first universal joint penetrates said supporter so as to be coaxially connected to said flywheel; and
- an elastic member interposed between said flywheel and said first universal joint through said supporter.

16. The tractor as set forth in claim 15, wherein said supporter is detachably fixed to said flywheel.

17. The tractor as set forth in claim 15, wherein said elastic member is disposed around said supporter.

18. The tractor as set forth in claim 17, further comprising:
- first bolts fastening said elastic member to said flywheel; and
- second bolts fastening said elastic member to said first universal joint, wherein said first and second bolts are alternately arranged around said supporter.

19. The tractor as set forth in claim 12, wherein said input shaft is disposed lower than a rotary axis of said flywheel so that said transmission shaft is disposed vertically slantwise.

20. The tractor as set forth in claim 12, further comprising:
- a linkage for speed control connected to said transmission on a side of said transmission, wherein an axis of said input shaft is laterally offset from an axis of a rotary shaft of said flywheel toward another side of said transmission so that said transmission shaft is disposed laterally slantwise.

21. The tractor as set froth in claim 12, further comprising:
- a linkage for speed control connected to said transmission on a side of said transmission, wherein an axis of said input shaft is disposed lower than a rotary axis of said flywheel and laterally offset from an axis of a rotary shaft of said flywheel toward another side of said transmission so that said transmission shaft is disposed vertically and laterally slantwise.

* * * * *